(12) United States Patent
Risser

(10) Patent No.: US 10,424,087 B2
(45) Date of Patent: Sep. 24, 2019

(54) SYSTEMS AND METHODS FOR PROVIDING CONVOLUTIONAL NEURAL NETWORK BASED IMAGE SYNTHESIS USING STABLE AND CONTROLLABLE PARAMETRIC MODELS, A MULTISCALE SYNTHESIS FRAMEWORK AND NOVEL NETWORK ARCHITECTURES

(71) Applicant: Artomatix Ltd., Dublin (IE)

(72) Inventor: Eric Andrew Risser, Sarasota, FL (US)

(73) Assignee: Artomatix Ltd., Dublin (IE)

( * ) Notice: Subject to any disclaimer, the term of this patent is extended or adjusted under 35 U.S.C. 154(b) by 0 days.

(21) Appl. No.: 15/876,011

(22) Filed: Jan. 19, 2018

(65) Prior Publication Data

US 2018/0144509 A1    May 24, 2018

Related U.S. Application Data

(63) Continuation of application No. 15/694,677, filed on Sep. 1, 2017.
(Continued)

(51) Int. Cl.
*G06K 9/00*   (2006.01)
*G06T 11/00*   (2006.01)
(Continued)

(52) U.S. Cl.
CPC ............. *G06T 11/001* (2013.01); *G06T 7/45* (2017.01); *G06T 11/00* (2013.01); *G06T 5/004* (2013.01);
(Continued)

(58) Field of Classification Search
CPC ......... G06T 11/001; G06T 7/45; G06T 5/004; G06T 5/20; G06T 5/40; G06T 2207/20221; G06T 2207/20884
See application file for complete search history.

(56) References Cited

U.S. PATENT DOCUMENTS 9,576,351 B1 *  2/2017  Barzel .................... G06T 11/60
9,922,432 B1    3/2018  Risser
(Continued)

OTHER PUBLICATIONS

International Search Report and Written Opinion for International Application No. PCT/IB2017/055285, Search completed Nov. 17, 2017, dated Jan. 29, 2018, 18 pgs.
(Continued)

*Primary Examiner* — Tom Y Lu
(74) *Attorney, Agent, or Firm* — KPPB LLP

(57) ABSTRACT

Systems and methods for providing convolutional neural network based image synthesis using localized loss functions is disclosed. A first image including desired content and a second image including a desired style are received. The images are analyzed to determine a local loss function. The first and second images are merged using the local loss function to generate an image that includes the desired content presented in the desired style. Similar processes can also be utilized to generate image hybrids and to perform on-model texture synthesis. In a number of embodiments, Condensed Feature Extraction Networks are also generated using a convolutional neural network previously trained to perform image classification, where the Condensed Feature Extraction Networks approximates intermediate neural activations of the convolutional neural network utilized during training.

17 Claims, 25 Drawing Sheets
(17 of 25 Drawing Sheet(s) Filed in Color)

Related U.S. Application Data

(60) Provisional application No. 62/383,283, filed on Sep. 2, 2016, provisional application No. 62/451,580, filed on Jan. 27, 2017, provisional application No. 62/531,778, filed on Jul. 12, 2017.

(51) Int. Cl.
- G06T 7/45 (2017.01)
- G06T 5/00 (2006.01)
- G06T 5/20 (2006.01)
- G06T 5/40 (2006.01)

(52) U.S. Cl.
CPC ...... G06T 5/20 (2013.01); G06T 5/40 (2013.01); G06T 2207/20084 (2013.01); G06T 2207/20221 (2013.01)

(56) References Cited

U.S. PATENT DOCUMENTS

| | | | | |
|---|---|---|---|---|
| 2011/0235905 | A1* | 9/2011 | Yokokawa | H04N 1/40068 382/165 |
| 2013/0120393 | A1* | 5/2013 | Winnemoeller | G06T 11/00 345/441 |
| 2014/0019484 | A1* | 1/2014 | Coppin | G06F 17/30256 707/772 |
| 2018/0068463 | A1 | 3/2018 | Risser | |
| 2019/0043242 | A1 | 2/2019 | Risser | |

OTHER PUBLICATIONS

"Introduction to Wang Tiles", Procedural World, Retrieved from: http://procworld.blogspot.com/2013/01/introduction-to-wang-tiles.html, Jan. 3, 2013, 8 pgs.

Aittala et al., "Reflectance modeling by neural texture synthesis", ACM Transactions on Graphics (TOG), 2016, vol. 35, No. 4, Article 65, 13 pgs.

Ashikhmin, Michael, "Synthesizing Natural Textures", Proceeding I3D '01 Proceedings of the 2001 symposium on Interactive 3D graphics, Mar. 1, 2001, 10 pgs.

Barnes et al., "PatchMatch: A Randomized Correspondence Algorithm for Structural Image Editing", ACM SIGGRAPH 2009, vol. 28, No. 3, Article No. 24, New Orleans, Louisiana, USA, Aug. 3-7, 2009.

Barnes et al., "PatchTable: Efficient Patch Queries for Large Datasets and Applications", ACM Transactions of Graphics (TOG), 2015, vol. 4, No. 4, Article 97.

Bellini et al, "Time-varying weathering in texture space", ACM Trans. Graph., Jul. 2016, vol. 35, No. 4, pp. 141:1-141:11.

Berger et al., "Incorporating long-range consistency in CNN-based texture generation", Jun. 3, 2016, arXiv:1606.01286v1, 17 pgs.

Burt et al., "The Laplacian Pyramid as a Compact Image Code", IEEE Transactions on Communications, Apr. 1983, vol. Com-31, No. 4, pp. 532-540.

Champandard, "Semantic Style Transfer and Turning Two-Bit Doodles into Fine Artworks", Cornell University Library, Mar. 5 2016, pp. 7.

Chang et al., "Automatic Triage for a Photo Series", ACM Transactions on Graphics (TOG), Jul. 2016, 10 pgs.

Chen et al, "Fast Image Processing with Fully-Convolutional Networks", http://vladlen.info/papers/fast-image-processing-with-supplement.pdf, 16 pgs.

Chen et al., "Fast Patch-based Style Transfer of Arbitrary Style", Dec. 13, 2016, arXiv:1612.04337, 10 pgs.

Darabi et al., "Image Melding: Combining Inconsistent Images Using Patch-Based Synthesis", ACM Transactions of Graphics (TOG), Jul. 2012, vol. 31, No. 4, Article 82-1, 10 pgs.

Diamanti et al., "Synthesis of Complex Image Appearance from Limited Exemplars", ACM Transactions of Graphics, Feb. 2015, vol. 34, No. 2, Article 22, 13 pgs.

Efros et al., "Image Quilting for Texture Synthesis and Transfer", In Proceedings of the 28th Annual Conference on Computer Graphics and Interactive Techniques, 20001, ACM, pp. 341-346.

Efros et al., "Texture Synthesis by Non-Parametric Sampling", IEEE International Conference on Computer Vision, 1999, vol. 2, pp. 1033-1038.

Fiser et al., "StyLit: Illumination-Guided Example-Based Stylization of 3D Renderings", ACM Transactions on Graphics, 2016, vol. 35, No. 4, Article 92, 11 pgs.

Gatys et al., "Image Style Transfer Using Convolutional Neural Networks", Jan. 1, 2016, pp. 1-10.

Gatys et al., "Texture Synthesis Using Convolutional Neural Networks", In Advances in Neural Information Processing Systems, 2015, pp. 262-270.

Hacohen et al., "Non-Rigid Dense Correspondence with Applications for Image Enhancement", ACM Transactions on Graphics, vol. 30, No. 4, Aug. 7, 2011, 9 pgs.

He et al., "Deep residual learning for image recognition", arXiv:1512.03385 [cs.Cv], in 2016 IEEE Conference on Computer Vision and Pattern Recognition, Dec. 10, 2015, pp. 770-778.

Heeger et al., "Pyramid-Based Texture Analysis/Synthesis", In Proceedings of the 22nd Annual Conference on Computer Graphics and Interactive Techniques, ACM, 2016, pp. 229-238.

Hertzmann et al., "Image Analogies", In Proceedings of the 28th Annual Conference on Computer Graphics and Interactive Techniques ACM, 2001, pp. 327-340.

Ioffe et al., "Batch Normalization: Accelerating Deep Network Training by Reducing Internal Covariate Shift", Proceedings of the 32nd International Conference on Machine Learning, 2015; arXif:1502.03167, 11 pgs.

Johnson, "Neural-Style", https://github.com/jcjohnson/neural-style, Sep. 1, 2015, 10 pgs.

Johnson et al., "Perceptual Losses for Real-Time Style Transfer and Super-Resolution", arXiv:1603.08155 [cs.CV], Mar. 27, 2016,pp. 694-711.

Kalantari et al., "Learning-Based View Synthesis for Light Field Cameras", ACM Transactions on Graphics (TOG), 2016, vol. 35, No. 6, Article 193, 10 pgs.

Krizhevsky et al., "ImageNet Classification with Deep Convolutional Neural Networks", Advances in Neural Information Processing Systems (NIPS 2012), vol. 25, 2012, pp. 1097-1105.

Kwatra et al., "Graphcut Textures: Image and Video Synthesis Using Graph Cuts", ACM Transactions on Graphics (TOG), 2003, vol. 22, pp. 277-286.

Kwatra et al., "Texture Optimization for Example-Based Synthesis", Journal ACM Transactions on Graphics (TOG)—Proceedings of ACM SIGGRAPH 2005, vol. 24, Issue 3, Jul. 2005, New York, NY, pp. 795-802.

Lefebvre, et al., "Appearance-Space Texture Synthesis", ACM Transactions on Graphics (TOG), Jul. 2006, vol. 25, No. 3, pp. 541-548.

Lefebvre et al., "Parallel Controllable Texture Synthesis", Journal ACM Transactions on Graphics (TOG)—Proceedings of ACM SIGGRAPH 2005, vol. 24, Issue 3, Jul. 2005, New York, NY, pp. 777-786.

Li et al., "Combining Markov Random Fields and Convolutional Neural Networks for Image Synthesis", Jan. 18, 2016, arXiv:1601.04589 [cs.CV] , pp. 2479-2486.

Lukac et al., "Brushables: Example-based Edge=Aware Directional Texture Painting", In Computer Graphics Forum, 2015, vol. 34, No. 7, pp. 257-267.

Lukac et al., "Painting by Feature: Texture Boundaries for Example-Based Image Creation", ACM Transactions of Graphics (TOG). 2013, vol. 32, No. 4, Article 116, 8 pgs.

Olszewski et al., "High-Fidelity Facial and Speech Animation for VR HMDs", ACM Transactions on Graphics (TOG), vol. 35, No. 6, Article 221, 14 pgs.

Pathak et al., "Context Encoders: Feature Learning by Inpainting", Nov. 21, 2016, arXiv:1604.07379, 12 pgs.

Portilla et al., "A Parametric Texture Model Based on Joint Statistics of Complex Wavelet Coefficients", International Journal of Computer Vision, 2000, vol. 40, No. 1, pp. 49-71.

(56) References Cited

OTHER PUBLICATIONS

Risser er al., "Stable and Controllable Neural Texture Synthesis and Style Transfer Using Histogram Losses", Arxiv, Retrieved from: https://arxiv.org/pdf/1701.08893v1.pdf, Jan. 31, 2017, 14 pgs.
Risser et al, "Synthesizing Structured Image Hybrids", ACM Transactions on Graphics (TOG). vol. 29. No. 4. ACM, 2010, 6 pgs.
Ritter et al., "Painting with Texture", Eurographics Symposium on Rendering, 2006, pp. 371-376.
Rong et al., "Jump Flooding in GPU with Applications to Voronoi Diagram and Distance Transform", 2006 ACM Symposium on Interactive 3D Graphics and Games, Mar. 14-17, 2006, Redwood City, CA, USA, pp, 109-116, 228.
Selim et al., "Painting style transfer for head portraits using convolutional neural networks", ACM Transactions on Graphics (TOG), 2016, vol. 35, No. 4, Article 129.
Siddiqui et al., "Hierarchical Color Correction for Camera Cell Phone Images", IEEE Transactions on Image Processing, 2008, vol. 17, No. 11, pp. 2138-2155.
Simonyan et al., "Very Deep Convolutional Networks for Large-Scale Image Recognition", Computer Vision and Pattern Recognition, Apr. 10, 2015, retrieved from https://arxiv.org/abs/1409.1556, 14 pages.
Tsai et al., "Sky is Not the Limit: Semantic-Aware Sky Replacement", ACM Transactions on Graphics (TOG), 2016, vol. 35, No. 4, Article 149, 11 pgs.
Ulyanov et al., "Instance Normalization: The Missing Ingredient for Fast Stylization", Nov. 6, 2017, arXiv:1607.08022, 6 pgs.
Ulyanov et al., "Texture Networks: Feed-forward Synthesis of Textures and Stylized Images", Mar. 10, 2016, arXiv:1603.03417, 16 pgs.
Wei et al., "Fast Texture Synthesis using Tree-structured Vector Quantization", Proceeding SIGGRAPH '00 Proceedings of the 27th Annual Conference on Computer Graphics and Interactive Techniques, Jul. 2000, New York, NY, pp. 479-488.
Wikipedia, "Histogram matching—wikipedia, the free encyclopedia", https://en.wikipedia.org/w/index.php?title=Histogram_matching &oldid=72304801 8, edited May 31, 2016, Printed on Nov. 30, 2017, 2 pgs.
Yan et al., "Automatic Photo Adjustment Using Deep Neural Networks", arXiv:1412.7725v2 [cs.CV] May 16, 2015, 15 pgs.
Yang et al., "High-Resolution Image Inpainting Using Multi-Scale Neural Patch Synthesis", Apr. 13, 2017, arXiv:1611.09969, 9 pgs.
Yu, "Multi-Scale Context Aggregation by Dilated Convolutions", Published as a conference paper at ICLR 2016, pp. 1-13.
Zhu et al., "Generative Visual Manipulation on the Natural Image Manifold", European Conference on Computer Vision, 2016, 597-613.
International Search Report for International Application No. PCT/IB2017/055285, filed Sep. 1, 2017, search completed Nov. 17, 2017, dated Jan. 29, 2018, 5 pgs.
U.S. Appl. No. 62/528,372, entitled Systems and Methods for Providing Convolutional Neural Network Based Non-Parametric Texture Synthesis in Graphic Objects, filed Jul. 3, 2017, 88 pgs.
Written Opinion of the International Searching Authority for International Application No. PCT/IB2017/055285, Opinion completed Nov. 17, 2017, Opinion dated Jan. 29, 2018, 10 pgs.
Agustsson et al. "NTIRE 2017 Challenge on Single Image Super-Resolution: Dataset and Study", The IEEE Conference on Computer Vision and Pattern Recognition (CVPR) Workshops, vol. 3, 2017, 10 pgs.
Almeida et al. "Blind and Semi-Blind Deblurring of Natural Images", IEEE Transactions on Image Processing 19, No. 1 (2010) pp. 36-52.
Arjovsky, "Wasserstein gan," http://github.com/mart inarjovsky/WassersteinGAN (2017), 32 pgs.
Ba et al. "Layer Normalization", arXiv preprint arXiv:1607.06450 (2016), 14 pgs.
Balduzzi et al. "The Shattered Gradients Problem: If resnets are the answer, then what is the question?", Proceedings of the 34th International Conference on MachineLearning, Sydney, Australia, PMLR 70, 2017, 14 pgs.
Cai et al, "DehazeNet: An End-to-End System for Single Image Haze Removal", IEEE Transactions on Image Processing 25, No. 11 (2016) 13 pgs.
Chakrabarti, "A Neural Approach to Blind Motion Deblurring", European Conference on Computer Vision, Springer, Cham, 2016, 15 pgs.
Chen et al. "Fast Image Processing with Fully-Convolutional Networks", International Conference on Computer Vision (ICCV 2017), arXiv:1709.00643, Sep. 2, 2017, 16 pgs.
Chen et al. "Fast Image Processing with Fully-Convolutional Networks", Retrieved from: https://web.stanford.edu/~cqf/papers/Fast_Image_Processing_ICCV2017.pdf, Aug. 12, 2017, 10 pgs.
Choy et al. "3D-R2N2: A Unified Approach for Single and Multi-view 3D Object Reconstruction", arXiv:1604.00449v1 [cs.CV] Apr. 2, 2016, 17 pgs.
Dar et al. "Postprocessing of Compressed Images via Sequential Denoising", IEEE Transactions on Image Processing 25, No. 7 (2016), 14 pgs.
Darabi et al, "Image Melding: Combining Inconsistent Images using Patch-based Synthesis", ACM Trans. Graph., vol. 31, No. 4, 10 pgs.
Dong et al. "Image Super-Resolution Using Deep Convolutional Networks", arXiv:1501.00092v3 [cs.CV] Jul. 31, 2015, 14 pgs.
Eisenacher, et al., "Texture Synthesis From Photographs", Eurographics, 2008, vol. 27, No. 2, 10 pgs.
Foi et al. "Pointwise Shape-Adaptive DCT for High-Quality Denoising and Deblocking of Grayscale and Color Images", IEEE Transactions on Image Processing, vol. 16, No. 5, May 2007, 17 pgs.
Galteri et al. "Deep Generative Adversarial Compression Artifact Removal", arXiv preprint arXiv:1704.02518 (2017), 10 pgs.
Gatys, et al., "Image Style Transfer Using Convolutional Neural Networks", In Proceedings of the IEEE Conference on Computer Vision and Pattern Recognition, 2016, pp. 2414-2423.
Girshick et al. "Deformable Part Models are Convolutional Neural Networks", 2015 IEEE Conference on Computer Vision and Pattern Recognition (CVPR), Jun. 7-12, 2015, Boston, MA, USA, 10 pgs.
Goodfellow, "NIPS 2016 Tutorial: Generative Adversarial Networks", arXiv preprint arXiv:1701.00160, 57 pgs.
Goodfellow et al. "Explaining and Harnessing adversarial examples", Published as a conference paper at ICLR 2015, arXiv:1412.6572, 11 pgs.
Griffin, Joe, "Creating 'world's first' artificial intelligence with imagination", The Irish Times, Retrieved from: https://www.irishtimes.com/business/technology/creating-world-s-first-artificial-intelligence-with-imagination-1.2171794, Apr. 13, 2015, 3 pgs.
Gulrajani et al. "Improved Training of Wasserstein GANs", In Advances in Neural Information Processing Systems, 2017, 11 pgs.
Han et al. "Multiscale Texture Synthesis", Journal ACM Transactions on Graphics (TOG)—Proceedings of ACM SIGGRAPH 2008, vol. 27, Issue 3, Aug. 2008, Article No. 51, New York, NY, 8 pgs.
Hansen et al. "Deblurring images: matrices, spectra, and filtering", vol. 3. SIAM, 2006, 8 pgs.
Hello Tomorrow, "HT 2015—Eric Risser, Artomatix—IT & Security Startup Pitch", YouTube, Retrieved from: https://www.youtube.com/watch?v=fwvLFcKVMF8, Nov. 17, 2015, 1 page.
Ignatov et al. "DSLR-Quality Photos on Mobile Devices with Deep Convolutional Networks", In the IEEE Int. Conf. on Computer Vision (ICCV). 2017, 9 pgs.
Joshi et al. "Image Deblurring using Inertial Measurement Sensors", ACM Transactions on Graphics (TOG) 29, No. 4 (2010), 8 pgs.
Kaspar et al. "Self Tuning Texture Optimization", Eurographics 2015, vol. 34, No. 2, 2015, 11 pgs.
Kawase, Masaki, "Frame Buffer Postprocessing Effects in Double-S.T.E.A.L (Wreckless)", Bunkasha Games, Bunkasha Publishing Co.,Ltd, Presentation from Game Developer's Conference 2003, Mar. 4-8 2003, 52 pgs.
Larsson et al. "Fractalnet: Ultra-deep neural networks without residuals", arXiv preprint arXiv:1605.07648 (2016), 11 pgs.
Ledig et al, "Photo-Realistic Single Image Super-Resolution Using a Generative Adversarial Network", In CVPR, vol. 2, No. 3, 2017, 10 pgs.
Li et al. "Universal Style Transfer via Feature Transforms", Advances in Neural Information Processing Systems (NIPS), 2017, 11 pgs.

(56) References Cited

OTHER PUBLICATIONS

Liang et al. "Real-Time Texture Synthesis by Patch-Based Sampling", ACM Transactions on Graphics, vol. 20, No. 3, Jul. 2001, pp. 127-150.
Liu et al. "Near-Regular Texture Analysis and Manipulation", Proceeding SIGGRAPH '04 ACM SIGGRAPH 2004 Papers, Los Angeles, California, Aug. 8-12, 2004, 9 pgs.
Lomas, Natasha, "Prisma uses AI to turn your photos into graphic novel fodder double quick", TechCrunch, Oath Tech Network, Jun. 24, 2016, Retrieved from: https://techcrunch.com/2016/06/24/prisma-uses-ai-to-turn-your-photos-into-graphic-novel-fodder-double-quick/, 13 pgs.
Mahendran et al. "Understanding Deep Image Representations by Inverting Them", 2015 IEEE Conference on Computer Vision and Pattern Recognition (CVPR), Jun. 7-12, 2015, Boston, MA, USA, 9 pgs.
Matusik et al. "Texture Design Using a Simplicial Complex of Morphable Textures", Proceeding SIGGRAPH '05, ACM SIGGRAPH 2005 Papers, Los Angeles, California, Jul. 31-Aug. 4, 2005, 8 pgs.
Nguyen et al. "Deep Neural Networks are Easily Fooled: High Confidence Predictions for Unrecognizable Images", In Computer Vision and Pattern Recognition (CVPR '15), IEEE, 2015, 20 pgs.
Nikulin et al. "Exploring the Neural Algorithm of Artistic Style", arXiv:1602.07188v2 [cs.CV] Mar. 13, 2016, 15 pgs.
Ren et al. "Single Image Dehazing via Multi-Scale Convolutional Neural Networks", In European conference on computer vision, Springer, Cham, 2016, 16 pgs.
Risser, Eric, "Rendering 3D Volumes Using Per-Pixel Displacement Mapping", Sandbox 2007, Proceedings of the 2007 ACM SIGGRAPH symposium on Video games, San Diego, California, Aug. 4-5, 2007, 7 pgs.
Risser, Eric, "Texture Synthesis Based Hybridisation for Images and Geometry", Thesis, Trinity College Dublin, Oct. 31, 2012, 217 pgs.
Risser, Eric, "The Artomatix Startup Story: Bringing A.I. To the Art World", Vimeo, Retrieved from: https://vimeo.com/209401909, Mar. 16, 2017, 2 pgs.
Risser et al. "Faster Relief Mapping Using the Secant Method", J. Graphics Tools, 12, DOI: 10.1080/2151237X.2007.10129244, Jan. 2007, 4 pgs.
Risser et al. "Synthesizing Structured Image Hybrids", Journal ACM Transactions on Graphics (TOG)—Proceedings of ACM SIGGRAPH 2010, vol. 29, Issue 4, Jul. 2010, Article No. 85, New York, NY, 6 pgs.
Salazar et al. "Fully Automatic Expression-Invariant Face Correspondence", Machine Vision and Applications 25, No. 4, 2014, 27 pgs.
Shi et al. "Real-Time Single Image and Video Super-Resolution Using an Efficient Sub-Pixel Convolutional Neural Network", 2016 IEEE Conference on Computer Vision and Pattern Recognition (CVPR), Dec. 12, 2016, Las Vegas, NV, USA, 10 pgs.
Simonyan et al. "Deep Inside Convolutional Networks: Visualising Image Classification Models and Saliency Maps", arXiv preprint arXiv:1312.6034 (2013), 8 pgs.
Spasojevic et al, "Identifying Actionable Messages on Social Media", In Big Data (Big Data), 2015 IEEE International Conference on (pp. 2273-2281). IEEE, Oct. 2015, 9 pgs.
Springenberger et al. "Striving for Simplicity: The All Convolutional Net", arXiv:1412.6806v3 [cs.LG], Apr. 13, 2015, pp. 1-14.
Sun et al. "Edge-based Blur Kernel Estimation Using Patch Priors", Computational Photography (ICCP), 2013 IEEE International Conference on, IEEE, 2013, 8 pgs.
Svoboda et al, "Compression Artifacts Removal Using Convolutional Neural Networks", arXiv preprint arXiv:1605.00366 (2016), 10 pgs.
Telea, Alexandru, "An Image Inpainting Technique Based on the Fast Marching Method", Journal of Graphics Tools, vol. 9, Issue No. 1, 2004, Published online Apr. 6, 2012, pp. 25-36.
Ulyanov et al. "Instance Normalization: The Missing Ingredient for Fast Stylization", arXiv:1607.08022v2 [cs.CV] Sep. 20, 2016, 6 pgs.
Ulyanov et al. "Texture Networks: Feed-forward Synthesis of Textures and Stylized Images", Proceedings of the 33rd International Conference on Machine Learning, New York, NY, USA, 2016, 9 pgs.
Ustyuzhaninov et al. "Texture Synthesis Using Shallow Convolutional Networks with Random Filters", arXiv:1606.00021v1 [cs.CV] May 31, 2016, 9 pgs.
Veit et al, "Residual Networks Behave Like Ensembles of Relatively Shallow Networks", In Advances in Neural Information Processing Systems, 2016, 9 pgs.
Wei, Li-Yi, "Deterministic Texture Analysis and Synthesis using Tree Structure Vector Quantization", Proceedings XII Brazilian Symposium on Computer Graphics and Image Processing,1999, Oct. 17-20, 1999, Campinas, Brazil, Brazil, 7 pgs.
Wei, Li-Yi, "Tile-Based Texture Mapping on Graphics Hardware", Graphics Hardware (2004), The Eurographics Association 2004, 10 pgs.
Wei et al. "Inverse Texture Synthesis", Proceeding SIGGRAPH '08 ACM SIGGRAPH 2008 papers, Article No. 52, Los Angeles, California, Aug. 11-15, 2008, 14 pgs.
Wei et al. "Order-Independent Texture Synthesis", Stanford Computer Science TR-2002-01, 2002, 9 pgs.
Wei et al. "State of the Art in Example-based Texture Synthesis", Eurographics 2009, Star, State of the Art Report, 25 pgs.
Wei et al. "Texture Synthesis over Arbitrary Manifold Surfaces", Proceeding SIGGRAPH '01 Proceedings of the 28th annual conference on Computer graphics and interactive techniques, Aug. 2001, New York, NY, 6 pgs.
Wong et al. "A document image model and estimation algorithm for optimized JPEG decompression", IEEE Transactions on image processing 18, No. 11 (2009), pp. 2518-2535.
Wu et al. "Feature Matching and Deformation for Texture Synthesis", Journal ACM Transactions on Graphics (TOG)—Proceedings of ACM, SIGGRAPH 2004, vol. 23, Issue No. 3, Aug. 2004, 4 pgs.
Ying et al. "Texture and Shape Synthesis on Surfaces", Rendering Techniques 2001, pp. 301-312, 13 pgs.
Yosinski et al. "Understanding Neural Networks Through Deep Visualization", Published in the Deep Learning Workshop, 31st International Conference on Machine Learning, Lille, France, 2015, 12 pgs.
Yu et al. "Multi-Scale Context Aggregation by Dilated Convolutions", ICLR 2016 Conference Paper, arXiv:1511.07122v3, submitted Nov. 23, 2015, last revised Apr. 30, 2016, 13 pgs.
Zagoruyko et al. "Learning to Compare Image Patches via Convolutional Neural Networks", 2015 IEEE Conference on Computer Vision and Pattern Recognition (CVPR), Jun. 7-12, 2015, Boston, MA, USA, 9 pgs.
Zeiler et al. "Visualizing and Understanding Convolutional Networks", ECCV 2014, Part I, LNCS 8689, 2014, 16 pgs.
Zelinka et al. "Jump Map-Based Interactive Texture Synthesis", ACM Transactions on Graphics, vol. 23, No. 4, Oct. 2004, 33 pgs.
Zelinka et al. "Towards Real-Time Texture Synthesis with the Jump Map", Thirteenth Eurographics Workshop on Rendering (2002), The Eurographics Association, 2002, 7 pgs.
Zhang et al. "Compression artifact reduction by overlapped-block transform coefficient estimation with block similarity", IEEE Transactions on Image Processing, 22 (12), pp. 4613-4626.
Zhang et al. "CrescendoNet: A New Deep Convolutional Neural Network with Ensemble Behavior", arXiv preprint arXiv:1710.11176 (2017), 10 pgs.
Zhang et al. "Image Restoration Using Joint Statistical Modeling in Space-Transform Domain", IEEE Trans. Circuits Syst. Video Techn. 24, No. 6 (2014), 14 pgs.
Zhang et al. "Synthesis of Progressively-Variant Textures on Arbitrary Surfaces", Journal ACM Transactions on Graphics (TOG)—Proceedings of ACM SIGGRAPH 2003, vol. 22, Issue 3, Jul. 2003, pp. 295-302.
Zhao et al. "Loss Functions for Neural Networks for Image Processing", arXiv:1511.08861v2 [cs.CV] Jun. 14, 2016, 16 pgs.

(56) References Cited

OTHER PUBLICATIONS

International Preliminary Report on Patentability for International Application PCT/IB2017/055285, Report issued Mar. 5, 2019, 11 pages.
Barnes et al., "The Generalized PatchMatch Correspondence Algorithm", European Conference on Computer Vision, Spring, Berlin, Heidelberg, 2010, 14 pages.

* cited by examiner

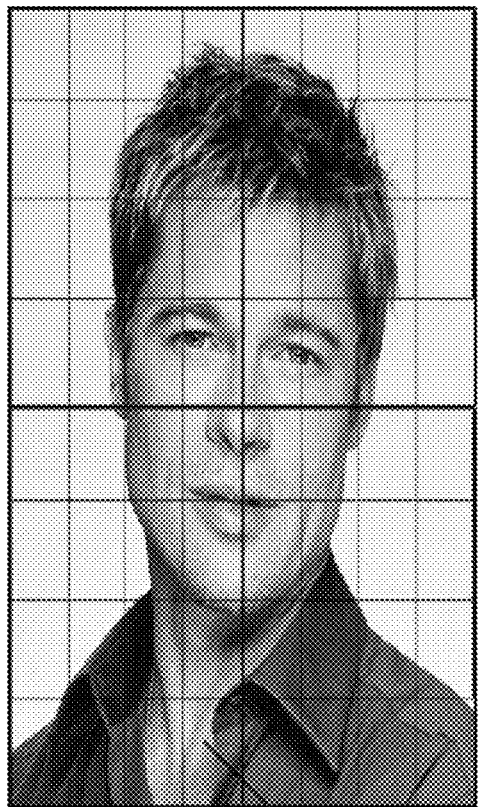
901  902
Fig. 9

Fig. 14

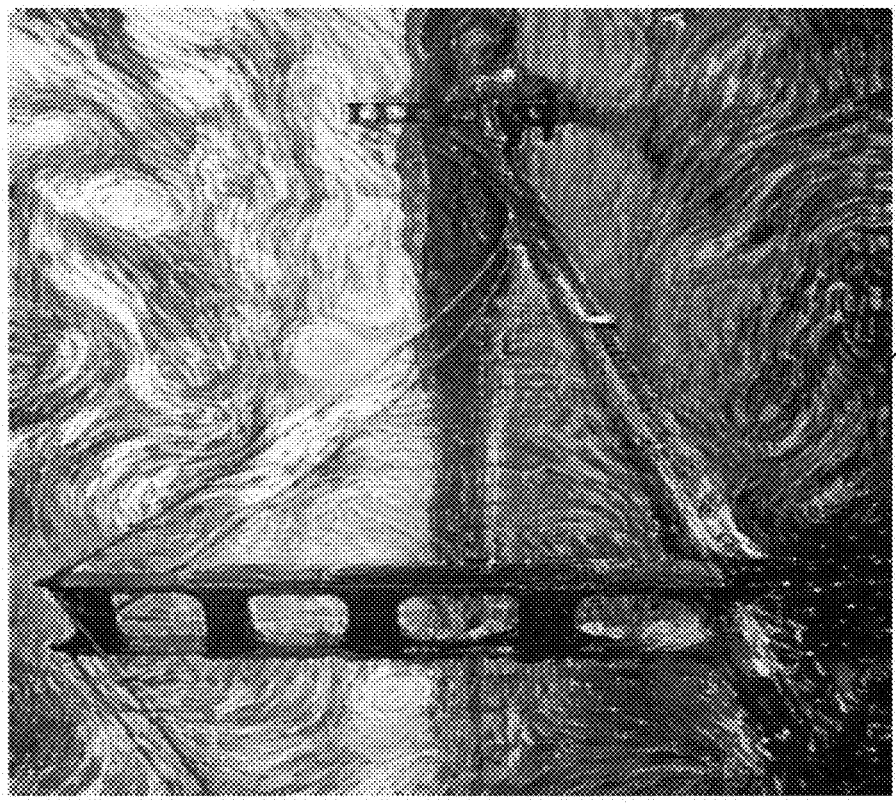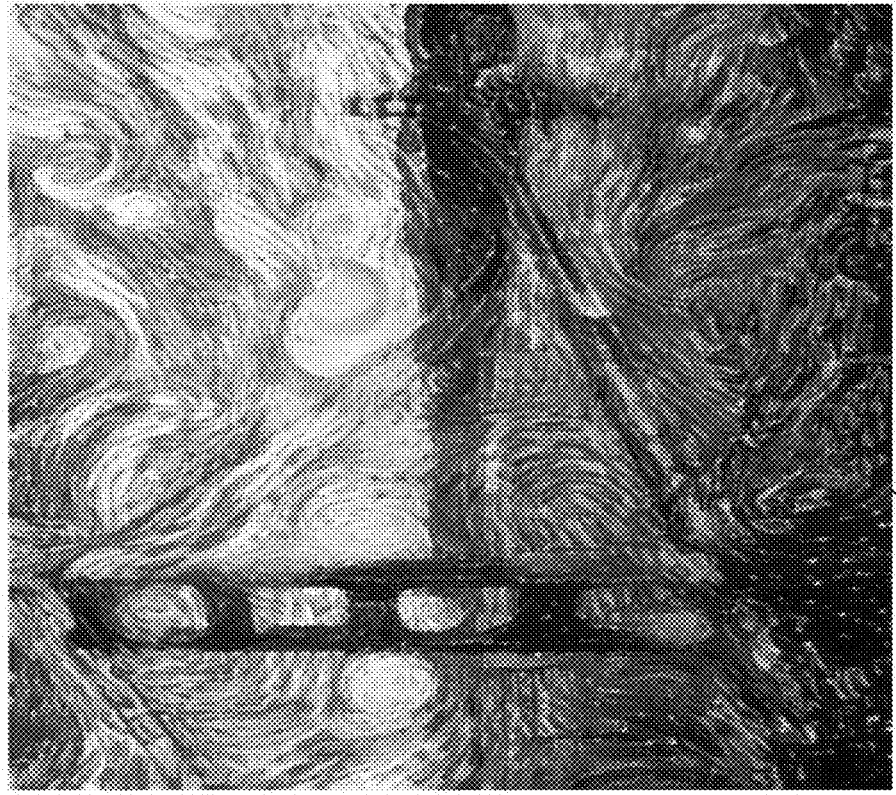
Fig. 19

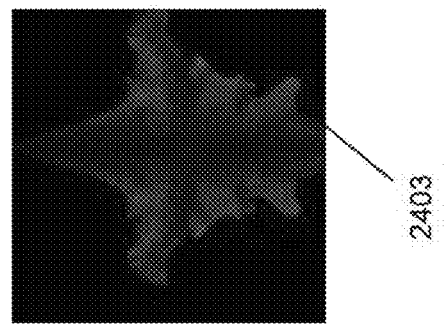
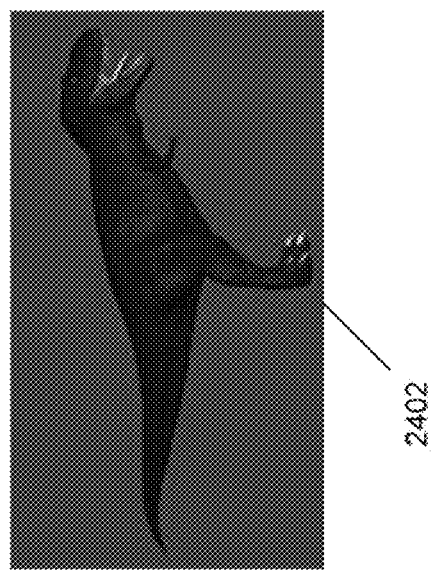
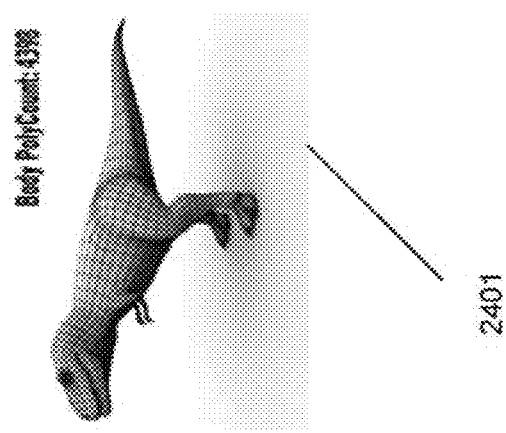
Fig. 24

SYSTEMS AND METHODS FOR PROVIDING CONVOLUTIONAL NEURAL NETWORK BASED IMAGE SYNTHESIS USING STABLE AND CONTROLLABLE PARAMETRIC MODELS, A MULTISCALE SYNTHESIS FRAMEWORK AND NOVEL NETWORK ARCHITECTURES

CROSS REFERENCED APPLICATION

This application is a continuation of U.S. patent application Ser. No. 15/694,677, filed Sep. 1, 2017 and claims priority to U.S. Provisional Application Ser. No. 62/383,283, filed Sep. 2, 2016, U.S. Provisional Application Ser. No. 62/451,580, filed Jan. 27, 2017, and U.S. Provisional Application Ser. No. 62/531,778, filed Jul. 12, 2017. The contents of each of these applications are hereby incorporated by reference as if set forth herewith.

FIELD OF THE INVENTION

This invention generally relates to image synthesis and more specifically relates to image synthesis using convolutional neural networks based upon exemplar images.

BACKGROUND

With the growth and development of creative projects in a variety of digital spaces (including, but not limited to, virtual reality, digital art, as well as various industrial applications), the ability to create and design new works based on the combination of various existing sources has become an area of interest. However, the actual synthesis of such sources is a hard problem that raises a variety of difficulties.

SUMMARY OF THE INVENTION

Systems and methods for providing convolutional neural network based image synthesis are disclosed. In many embodiments, processes for providing CNN-based image synthesis may be performed by a server system. In accordance with several embodiments, the processes may be performed by a "cloud" server system. In still further embodiments, the processes may be performed on a user device.

One embodiment is a system for generating a synthesized image including desired content presented in a desired style includes one or more processors, memory readable by the one or more processors. The system in accordance with some embodiments of the invention includes instructions stored in the memory that when read by the one or more processors direct the one or more processors to receive a source content image that includes desired content for a synthesized image, receive a source style image that includes a desired texture for the synthesized image, determine a localized loss function for a pixel in at least one of the source content image and the source style image, and generate the synthesized image by optimizing a value of a pixel in the synthesized image to a content loss function of a corresponding pixel in the content source image and a style loss function of a corresponding pixel in the source style image wherein at least one of the corresponding pixels is the pixel that has a determined localized loss function and one of the content loss function and the source loss function is the determined localized loss function.

In another embodiment, the localized loss function is represented by a Gram matrix.

In a further embodiment, the localized loss function is represented by a covariance matrix.

In still another embodiment, the localized loss function is determined using a Convolutional Neural Network (CNN).

In a still further embodiment, the optimizing is performed by back propagation through the CNN.

In yet another embodiment, the localized loss function is determined for a pixel in the source style image.

In a yet further embodiment, the instructions to determine a localized loss function for a pixel in the source style image direct the one or more processors to receive a mask that identifies regions of the style source image, determine a group of pixels including the pixel that are included in one of the plurality of regions identified by the mask, determine a localized loss function for the one of the plurality of regions from the groups of pixels included in the one of the plurality of regions, and associate the localized loss function with the pixel.

In another additional embodiment, the instructions to determine a localized loss function for a pixel in the source style image direct the one or more processors to group the pixels of the source style image into a plurality of cells determined by a grid applied to the source style image, determine a localized loss function for the one of the plurality of cells that has a group of pixels that include the pixel, and associate the determined localized loss function of the one of the plurality of cells with the pixel.

In a further additional embodiment, the instructions to determine a localized loss function for a pixel in the source style image direct the one or more processors to determine a group of neighbor pixels for a pixel in the source content image, determine a group of corresponding pixels in the source style image associated with the group of neighbor pixels in the source content image wherein each of the group of corresponding pixels corresponds to one of the group of neighbor pixels and includes the pixel, and determine a local loss function for the group of corresponding pixels.

In another embodiment again, the localized loss function is determined for a pixel in the source content image.

In a further embodiment again, the instructions to determine a localized loss function for a pixel in the source content image direct the one or more processors to receive a mask that identifies regions of the source content image, determine a group of pixels including the pixel that are included in one of the plurality of regions identified by the mask, determine a localized loss function for the one of the plurality of regions from the groups of pixels included in the one of the plurality of regions, and associate the localized loss function with the pixel.

In still yet another embodiment, the instructions to determine a localized loss function for a pixel in the source style image direct the one or more processors to group the pixels of the source content image into a plurality of cells determined by a grid applied to the source style image, determine a localized loss function for the one of the plurality of cells that has a group of pixels that include the pixel, and associate the determined localized loss function of the one of the plurality of cells with the pixel.

In a still yet further embodiment, the instructions to determine a localized loss function for a pixel in the source style image direct the one or more processors to determine a global content loss function for the source content image from the pixels of the source content image, determine a weight for the pixel indicating a contribution to a structure in the source content image, and apply the weight to the global content loss function to determine the localized loss function for the pixel.

In still another additional embodiment, the weight is determined based upon a Laplacian pyramid of black and white versions of the source content image.

In a still further additional embodiment, a localized loss function is determined for a pixel in the source content image and a corresponding pixel in the source style image.

In still another embodiment again, the optimization uses the localized loss function for the pixel in the source content image as the content loss function and the localized loss function of the pixel in the source style image as the style loss function.

In a still further embodiment again, pixels in the synthesized image begin as white noise.

In yet another additional embodiment, each pixel in the synthesized image begins with a value equal to a pixel value of a corresponding pixel in the source content image.

In a yet further additional embodiment, the optimizing is performed to minimize to a loss function that includes the content loss function, a style loss function, and a histogram loss function.

In yet another embodiment again, a method for performing style transfer in an image synthesis system where a synthesized image is generated with content from a source content image and texture from a source style image includes receiving a source content image that includes desired content for a synthesized image in the image synthesis system, receiving a source style image that includes a desired texture for the synthesized image in the image synthesis system, determining a localized loss function a pixel in at least one of the source content image and the source style image using the image synthesis system, and generating the synthesized image using the image synthesis system by optimizing a value of a pixel in the synthesized image to a content loss function of a corresponding pixel in the content source image and a style loss function of a corresponding pixel in the source style image wherein at least one of the corresponding pixels is the pixel that has a determined localized loss function and one of the content loss function and the source loss function is the determined localized loss function.

In a yet further embodiment again, the localized loss function is represented by a Gram matrix.

In another additional embodiment again, the determining of a localized loss function for a pixel in the source style image includes receiving a mask that identifies regions of the style source image in the image synthesis system, determining a group of pixels including the pixel that are included in one of the plurality of regions identified by the mask using the image synthesis system, determining a localized loss function for the one of the plurality of regions from the groups of pixels included in the one of the plurality of regions using the image synthesis system, and associating the localized loss function with the pixel using the image synthesis system.

In a further additional embodiment again, the determining a localized loss function for a pixel in the source style image comprises grouping the pixels of the source style image into a plurality of cells determined by a grid applied to the source style image using the image synthesis system, determining a localized loss function for the one of the plurality of cells that has a group of pixels that include the pixel using the image synthesis system, and associating the determined localized loss function of the one of the plurality of cells with the pixel using the image synthesis system.

In still yet another additional embodiment, determining of a localized loss function for a pixel in the source style image includes determining a group of neighbor pixels for a pixel in the source content image using the image synthesis system, determining a group of corresponding pixels in the source style image associated with the group of neighbor pixels in the source content image wherein each of the group of corresponding pixels corresponds to one of the group of neighbor pixels and includes the pixel using the image synthesis system, and determining a local loss function for the group of corresponding pixels using the image synthesis system.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 9 is an illustration of conceptual images of cells in two input images in a style transfer process using uniform regions in accordance with an embodiment of the invention.

FIG. 14 is an illustration of two input images that provide an example of the operation of a style transfer process using a global content loss function in accordance with an embodiment of the invention.

FIG. 19 is an illustration of images generated by a style transfer process using localized content loss functions in accordance with an embodiment of the invention.

FIG. 24 is an illustration of a textured mapped model and components used to form the textured mapped model using a filter process in accordance with an embodiment of the invention.

DETAILED DISCUSSION

Figure 1:
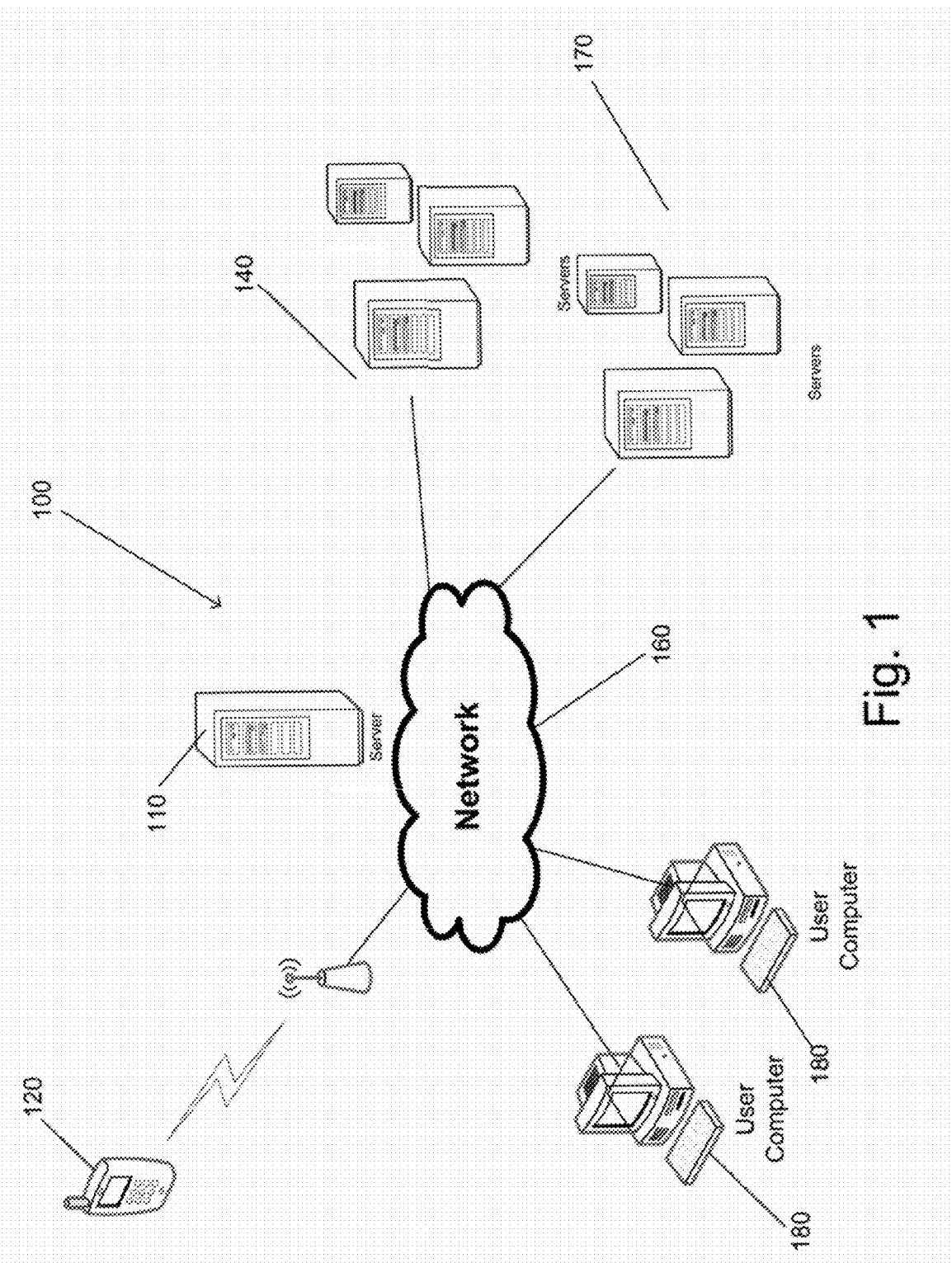
FIG. 1 is an illustration of various devices that may perform one or more processes to provide Convolutional Neural Network (CNN) based image synthesis in accordance with an embodiment of the invention.

Turning now to the drawings, systems and methods for providing Convolutional Neural Network (CNN) based image synthesis in accordance with some embodiments of the invention are described. In many embodiments, processes for providing CNN-based image synthesis may be performed by a server system. In accordance with several embodiments, the processes may be performed by a "cloud" server system. In still further embodiments, the processes may be performed on a user device.

In accordance with many embodiments, the loss functions may be modeled using Gram matrices. In a number of embodiments, the loss functions may be modeled using covariance matrices. In accordance with several embodiments, the total loss may further include mean activation or histogram loss.

In accordance with sundry embodiments, a source content image, including desired structures for a synthesized image and a source style image, including a desired texture for the synthesized image, are received. A CNN may be used to determine localized loss functions for groups of pixels in the source content and/or source style images. The localized content and/or localized style loss functions may be used to generate a synthesized image that includes the content from the source content image and the texture from the source style image. In accordance with many embodiments, an optimization process may be performed to optimize pixels in a synthesized image using the localized content loss function of a corresponding pixel from the source content image and/or the localized style loss function of a corresponding pixel from the source style image. In accordance with a number of embodiments, the optimization may be an iterative optimization that is performed by back propagation through a CNN, or through a purely feed-forward process. In a number of embodiments, a specific pyramid-stack hybrid CNN architecture based on some combination of pooling, strided convolution and dilated convolution is used for image synthesis. As can readily be appreciated, the specific CNN architecture utilized in image synthesis is largely dependent upon the requirements of a given application.

In accordance with certain embodiments, the CNN-based image synthesis processes may perform aging of an image. In accordance with many embodiments, CNN-based image synthesis processes may be used to perform continuous weathering by continually modifying the parametric model. In accordance with a number of embodiments, the CNN-based image synthesis processes may be used to perform weathering by controlling the weathering through a "painting by numbers" process. In accordance with several embodiments, CNN-based image synthesis processes may be used to perform continuous multiscale aging. In accordance with many embodiments, CNN-based image synthesis processes may be used to perform aging by transferring weathering patterns from external exemplars.

In accordance with sundry embodiments, CNN-based image synthesis processes may combine optimization and feedforward parametric texture synthesis for fast high-resolution synthesis. In accordance with many embodiments, CNN-based image synthesis processes may be used to perform super image super resolution (SISR) for rending. In accordance with a number of embodiments, CNN-based image synthesis processes may combine parametric and non-parametric-non-CNN synthesis within a pyramid framework.

In several embodiments, dilated convolution neural networks can be utilized to synthesize image hybrids. Image hybridization involves starting from a set of several source images within a category and mixing them together in a way that produces a new member of that category. In a number of embodiments, image hybridization is performed using either an optimization or feedforward based synthesis strategy. In either case, a key aspect of the image hybridization is to generate new activations at different levels of the network which combine the activation features extracted from the input images into new hybrid configurations.

Processes in accordance with many embodiments of the invention integrate an on-model synthesis approach into the CNN approach. The goal of processes in accordance with some embodiments of the invention is to provide an on-model texture synthesis scheme that allows the user to supply a fully textured model as the input exemplar instead of just a texture, and apply that texture from the model onto a different untextured model. In many embodiments, the processes produce textures that conform to geometric shapes and the feature contents of that texture are guided by the underlying shape itself. This results in image synthesis that can be applied on top of already textured meshes, and can also produce appearance transfer from one textured mesh onto another.

In a number of embodiments, a specific class of artificial neural networks that can be referred to as Condensed Feature Extraction Networks are generated from CNNs trained to perform image classification. Systems and methods in accordance with many embodiments of the invention generate Condensed Feature Extraction Networks by utilizing an artificial neural network with a specific number of neurons to learn a network that approximates the intermediate neural activations of a different network with a larger number (or the same number) of artificial neurons. In several embodiments, the artificial neural network that is utilized to train a Condensed Feature Extraction Network is a CNN. In certain embodiments, the computation required to generate outputs from the Condensed Feature Extraction Network for a set of input images is reduced relative to the CNN used to train the Condensed Feature Extraction Networks.

Systems and methods for providing CNN-based image synthesis are described in more detail below.

Systems for Providing Convolutional Neural Network Based Image Synthesis

A system that provides CNN-based image synthesis in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 may be a group of one or more server computer systems communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services including (but not limited to) virtualized server systems. In accordance with various embodiments of this invention, processes for providing CNN-based image synthesis processes and/or systems may be provided by one or more software applications executing on a single server system and/or a group of server systems communicating over network 160.

Users may use personal devices 180 and 120 that connect to the network 160 to perform processes for providing CNN-based image synthesis in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" or "wireless" network connection. The mobile device 120 connects to network 160 using a wireless connection. A wireless connection is a connection that may use Radio Frequency (RF) signals, Infrared (IR) signals, or any other form of wireless signaling to connect to the network 160. In FIG. 1, the mobile device 120 is a mobile telephone. However, mobile device 120 may be a mobile phone, a Personal Digital Assistant (PDA), a tablet, a smartphone, or any other type of device that connects to network 160 via wireless connection in accordance with various other embodiments of the invention. In accordance with some embodiments of the invention, the processes for providing CNN-based image synthesis may be performed by the user device. In several other embodiments, an application being executed by the user device may capture or obtain the two or more input images and transmit the captured image(s) to a server system that performs the processes for providing CNN-based image synthesis. In accordance with a number of embodiments where one or more of the images is captured by the user device, the user device may include a camera or some other image capture system that captures the image.

The specific computing system(s) used to capture images and/or processing images to perform CNN-based image synthesis often is largely dependent upon the requirements of a given application and should not be considered as limited to any specific computing system(s) implementation(s). Computing systems and processes for performing CNN based image synthesis are discussed further below.

Example of Processing Systems

Figure 2:
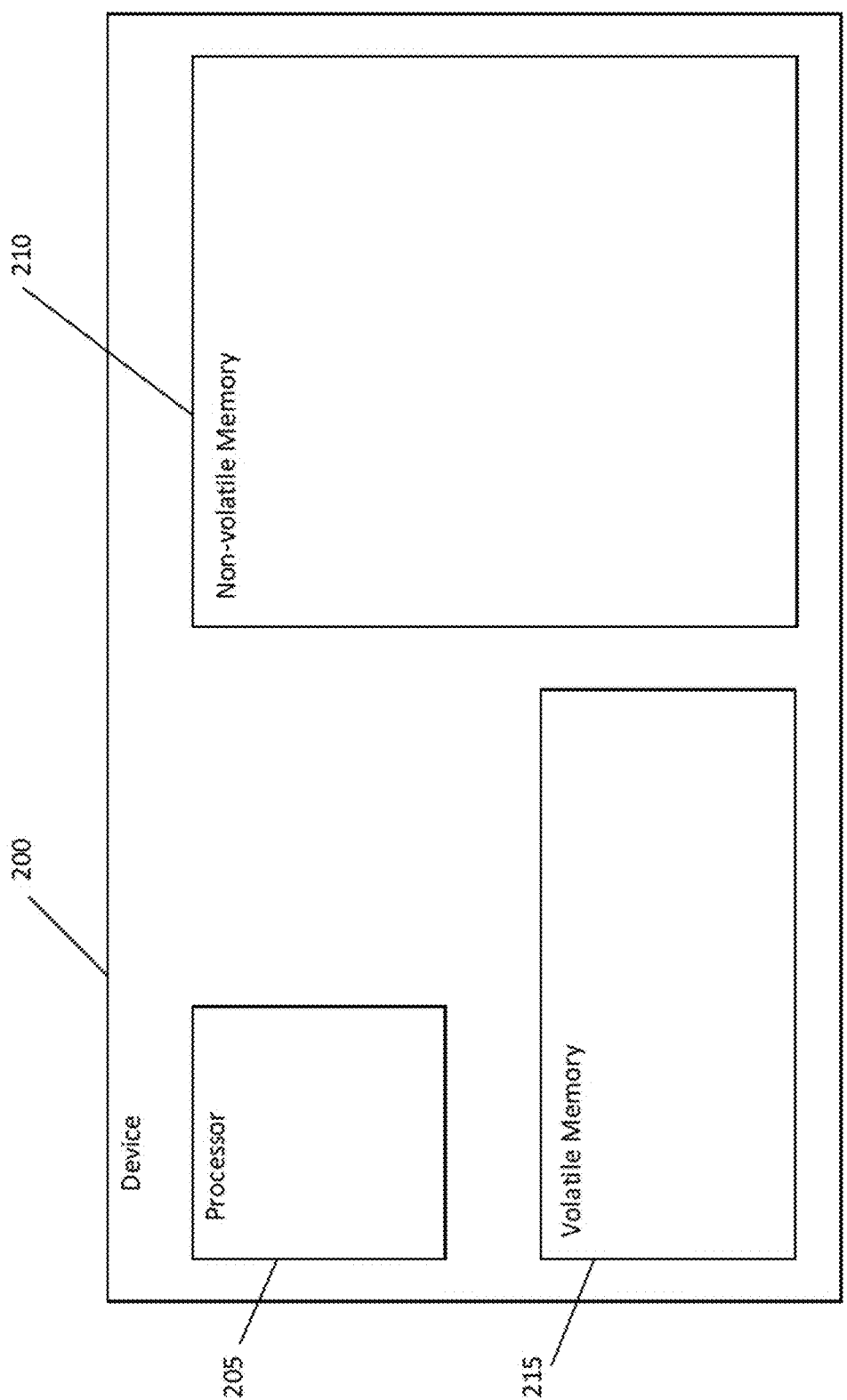
FIG. 2 is an illustration of components of a processing system in a device that executes one or more processes to provide CNN-based image synthesis using localized loss functions in accordance with an embodiment of the invention.

An example of a processing system in a device that executes instructions to perform processes that provide CNN-based image synthesis in accordance with an embodiment of the invention is shown in FIG. 2. One may recognize that a particular processing system may include other components that are omitted for brevity without departing from various embodiments of the invention. The processing device 200 includes a processor 205, a non-volatile memory 210, and a volatile memory 215. The processor 205 may be a processor, microprocessor, controller or a combination of processors, microprocessors and/or controllers that perform instructions stored in the volatile memory 215 and/or the non-volatile memory 210 to manipulate data stored in the memory. The non-volatile memory 210 can store the processor instructions utilized to configure the processing system 200 to perform processes including processes in accordance with particular embodiments of the invention and/or data for the processes being utilized. In accordance with some embodiments, the processing system software and/or firmware can be stored in any of a variety of non-transient computer readable media appropriate to a specific application. A network interface is a device that allows processing system 200 to transmit and receive data over a network based upon the instructions performed by processor 205. Although an example of processing system 200 is illustrated in FIG. 2, any of a variety of processing systems in the various devices may be configured to provide the methods and systems in accordance with various embodiments of the invention.

Convolutional Neural Network Based Image Synthesis

CNNs can be powerful tools for synthesizing similar but different version of an image or transferring the style of one image onto the content of another image. Recently, compelling results have been achieved through parametric modeling of the image statistics using a deep CNN. An example CNN used for image style transfer is described by Leon Gatys in a paper entitled, "Image Style Transfer Using Convolutional Neural Networks" that may be obtained at www.cv-foundation.org/openacess/content_cvpr_2016/papers/Gatys_Image_Style_Transfer_CV PR_2016_paper.pdf. In particular, CNN-based image synthesis processes are particularly suited for performing texture synthesis and style transfer.

In particular, CNN-based image synthesis systems may perform texture synthesis in the following manner: A CNN image synthesis system receives an input source texture, S, and synthesizes an output texture, O. S and O are passed through a CNN such as VGG that generates feature maps for the activations of the first L convolutional layers of the CNN. For purposes of this discussion, the activations of the first L convolutional layers are denoted as $S_1 \ldots S_L$ and $O_1 \ldots O_L$. A loss gram over the layers, which preserves some properties of the input texture by means of a Gram matrix can be expressed as:

$$\mathcal{L}_{gram} = \sum_{l=1}^{L} \frac{\alpha_l}{|S_l|^2} \|G(S_l) - G(O_l)\|_F^2 \quad (1)$$

where $A_l$ are user parameters that weight terms in the loss, |•| is the number of elements in a tensor, F is the Frobenius norm, and the Gram matrix G(F) is defined over any feature map F as an $N_l \times N_l$ matrix of inner products between pairs of features:

$$G_{ij}(F) = \sum_{k} F_{ik} F_{jk} \quad (2)$$

$F_{i,j}$ refers to feature i's pixel j within the feature map. The synthesized output image O is initialized with white noise and is then optimized by applying gradient descent to equation (1). Specifically, the gradient of equation (1) with respect to the output image O is computed via backpropagation.

CNN-based image synthesis processes that perform style transfer synthesis operate in a similar manner to the texture synthesis process described above. However, a CNN-based image synthesis system receives a content image, C, and a style image, S, that are used to generate a styled image, O. All three images are passed through a CNN, such as a VGG, that gives activations for the first L convolutional layers denoted as $C_1 \ldots C_L$, $S_1 \ldots S_L$, $O_1 \ldots O_l$. The total style transfer loss combines the losses for the style image ($\mathcal{L}_{gram}$) and the content image ($\mathcal{L}_{content}$):

$$\mathcal{L}_{transfer} = \mathcal{L}_{gram} + \mathcal{L}_{content} \quad (3)$$

The content loss is a feature distance between content and output that attempts to make output and content look similar:

$$\mathcal{L}_{content} = \sum_{l=1}^{L} \frac{\beta_l}{|C_l|} \|C_l - O_l\|_F^2 \quad (4)$$

Where $\beta_l$ are user weight parameters, the output image O is initialized with white noise and optimized using a gradient descent.

As such, CNN-based image synthesis processes performing style transfer may use an iterative optimization process to cause the white noise image of the synthesized image to incrementally begin to resemble some user-specified combination of the source content and style images.

In accordance with many embodiments of the invention, a CNN backpropagation training procedure may be used as the iterative optimization process to turn the white noise or content image into an image that combines features of the content and style images. During backpropagation training procedures performed in accordance with a number of embodiments, the iterative optimization process can be directed by a loss function (equation 4) that the backpropagation training procedure is trying to minimize. In accordance with several embodiments, the loss function is calculated as the difference between parametric models encoding the style of a style image and the image being synthesized. In addition, in some embodiments of this invention, a content loss can be included as well, where the content loss is some distance metric between raw neural activations calculated for the content image and the image being synthesized. If a style loss is used without a content loss and the image being synthesized starts from noise, then the resulting operation is texture synthesis. If a style loss is used without content loss and the image being synthesized starts from the content image, then the resulting operation is style transfer. If both style and content loss are used then the operation will always be style transfer.

In accordance with various other embodiments of the invention, other image processing applications including, but not limited to, image hybridization, super-resolution upscaling and time-varying weathering, could be achieved using the same CNN framework but using different loss functions.

CNN-based image synthesis processes in accordance with certain embodiments of the invention may use loss functions to direct the optimization process in various synthesis processes that may be performed. However, CNN-based image synthesis processes in accordance with particular embodiments of this invention use a collection of stable loss functions for the CNN-based image synthesis to achieve various results. In accordance with some embodiments, CNN-based image synthesis processes use multiple stable loss functions for texture synthesis and style transfer. Thus, multiple stable loss functions for the style transfer including loss functions for the style and content are addressed separately below.

Problems with the Use of Gram Matrices

Figure 3:
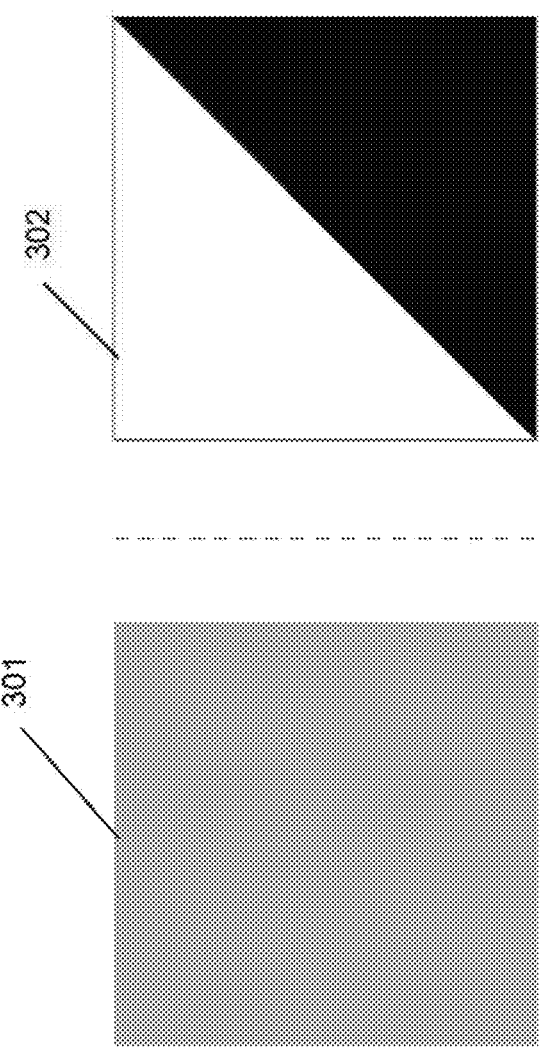
FIG. 3 is an illustration of images showing the instability in a Gram matrix.

A problem that can be experienced when using Gram matrices as loss functions in style transfer is that the results are often unstable. The cause of the instability is illustrated in FIG. 3. In FIG. 3, an input image 301 has a uniform distribution of intensities with a mean of $\mu_1 = \frac{1}{2} \approx 0.707$ and a standard deviation of $\sigma_1 = 0$. An output image 302 has a non-uniform distribution with a mean of $\mu_2 = \frac{1}{2}$ and a standard deviation of $\sigma_2 = \frac{1}{2}$. If interpreted as the activation of a feature map with one feature, these two distributions have equivalent non-central second moments of $\frac{1}{2}$, and equal Gram matrices. The problem is that there are many distributions that result in an equivalent Gram matrix. However, the Gram matrices do not match image intensities. Instead, Gram matrices match feature activations, i.e. feature maps, after applying the activation functions but the same argument applies: activation maps with quite different means and variances can still have the same Gram matrix.

The problem arises because a Gram matrix is statistically related to neither the mean nor covariance matrices. Instead, a Gram matrix is related to a matrix of non-central second moments. To show this, a feature activation map, F, with m features, is used as an example. For brevity, "feature map activations" are simply referred to as "features," such that a "feature" refers to the result of applying an activation function. The statistics of the features in the feature map F can be summarized by using an m dimensional random variable X to model the probability distribution of a given m-tuple of features. The random vector of features X can be related to the feature map F. For example, the Gram matrix, G(F), may be normalized by the number of samples n to obtain a sample estimator for the second non-central mixed moments $E[XX^T]$. As such, the terms (normalized) "Gram matrix" and $E[XX^T]$ may be used interchangeably in the following discussion even though one is actually a sampled estimator of the other.

In the following argument, $$\frac{1}{n}G(F) = E[XX^T]$$

and the mean feature is defined as $\mu=E[X]$. By a general property of covariance matrices, $\Sigma(X)=E[XX^T]-\mu\mu^T$, $\Sigma$ indicates a covariance matrix. After rearranging, the following equation results:

$$E[XX^T]=\Sigma(X)+\mu\mu^T \quad (5)$$

In the case where there is only one feature, m=1, equation (5) becomes:

$$\frac{1}{n}G(F) = E[X^2] = \sigma^2 + \mu^2 = \|(\sigma, \mu)\|^2 \quad (6)$$

Where $\sigma$ is the standard deviation of feature X. For a feature map, $F_1$ for the input source image, and a feature map, $F_2$, for the synthesized output image that have respective feature distributions $X_1$, $X_2$, means $\mu_1$, $\mu_2$, and standard deviations $\sigma_1$, $\sigma_2$, the features maps will have the same Gram matrix if the following condition for equation (6) holds:

$$\|(\sigma_1,\mu_1)\|=\|(\sigma_2,\mu_2)\| \quad (7)$$

As such, an infinite number of 1D feature maps with different variances but equal Gram matrices may be created. This is not optimal for image synthesis. Specifically, this means that even if a Gram matrix is held constant, the variance $\rho_2^2$ of the synthesized texture map can freely change (with corresponding changes to the mean, $\mu_2$, based on equation (7)). Conversely, the mean, $\mu_2$, of the synthesized texture map can freely change (with corresponding changes to the variance, $\sigma_2^2$). This property often leads to the instabilities. For simplicity, it can be assumed that a CNN may be flexible enough to generate any distribution of output image features. To generate an output texture with a different variance (e.g. $\sigma_2 \ll \sigma_1$) but equal Gram matrix, equation (6) can be solved for $\mu_2$ to obtain $\mu_1 = \sqrt{\sigma_1^2+\mu_1^2-\sigma_2^2}$. This is shown in FIG. 3 where the distribution $X_1$ of the image 301 has $$\mu_1 = \frac{1}{\sqrt{2}}$$

and $\sigma_1=0$ and the image 302 has larger standard deviation of $\sigma_2=\frac{1}{2}$.

In the multidimensional case where m>1, if there is no correlation between features, the m separate cases of the previous 1D scenario. Thus, while maintaining the same Gram matrix, all of the variances can be changed, as long as a corresponding change to the mean is made. This can lead to instabilities in variance or mean. However, in the multidimensional scenario, typically there are correlations between features. The following example illustrates this point. In this example, an input feature map $F_1$, has an input feature random vector $X_1$, a mean $\mu$, and covariance matrix $\Sigma(X_1)$. To generate a set of output feature random vectors $X_2$ with an equal Gram matrix but different variance, an affine transformation is applied to the input random feature vector $X_1$ to obtain a transformed random vector of output features activation $X_2=AX_1+b$, where A is an m×m matrix, and b is an m vector. The Gram matrices $X_1$ and $X_2$ are set equal to one another using equation (5) above to obtain:

$$E[X_2X_2^T]=A\Sigma(X_1)A^T+(A\mu+b)(A\mu+b)^T=E[X_1X_1^T]=\Sigma(X_1)+\mu\mu^T. \quad (8)$$

The variances of the output random feature activation vector $X_2$ may be constrained along the main diagonal of its covariance matrix so that the variances are equal to a set of "target" output image feature activation variances. The remains may be an unknown variable in the transformation matrix A, and vector b may be determined using closed form solutions of the resulting quadratic equations. However, these equations are often long and computationally intensive to solve. Yet, it does show that there are more unknowns than equations. Thus, it is possible to generate an output distribution $X_2$ with different variances that the input feature distribution $X_1$, but with the same Gram matrix. Specifically, there are m(m+3)/2 constraints due to equation (8) (there are m(m+1)/2 constraints due to the upper half of the symmetric matrix, plus m constraints for the known output feature variances).

Covariance and Mean Loss

In accordance with sundry embodiments of the invention, due to the Gram matrix stability issues identified above, CNN-based image synthesis processes use a covariance matrix instead of a Gram matrix to guide the synthesis process. Covariance matrices are similar to Gram matrices but do not share the same limitation. By subtracting off the mean activation before computing inner products, covariance matrices explicitly preserve statistical moments of various orders in the parametric model. By this we explicitly refer to the mean of all feature vectors as the first order moment and to the co-activations of feature vectors centered around their mean as second order moments.

Replacing Gram matrices with Covariance matrices can stabilize the synthesis process for some textures, however, subtracting the mean can affect the desired features to be reproduced during the synthesis process in undesirable ways. To counteract this effect, we introduce an additional loss term for mean activations.

This new parametric model allows the covariance loss and means loss to drive the synthesis. This can make the combined loss for texture synthesis:

$$L_{texture}=L_{covariance}+L_{mean}+L_{tv} \quad (12)$$

The replacement of the Gram matrix with a Covariance matrix may improve but does not decisively solve the stability issues inherent in texture synthesis and/or style transfer. However, the covariance matrix may be a powerful method for describing image style in a stable form when the texture being parameterized is highly stochastic and can be represented as a single cluster in feature space. It may still be a problem that many textures and most natural images contain multiple clusters. In other words, these textures or natural images contain a combination of multiple distinct textures. When an input texture exhibits multiple feature space clusters and the cluster centers are far apart from each other, a covariance matrix may exhibit the same unstable behavior as a Gram matrix. The reason for the unstable behavior is that the center between multiple clusters ensures that every cluster will be un-centered and, thus, will not exhibit stable mathematical properties.

Although CNN-based image synthesis processes that use covariance loss and/or mean loss in accordance with various embodiments of the invention are described above, other processes that use covariance loss and mean loss in accordance with various other embodiments of the invention that add, combine and/or remove steps as necessitated by the requirements of particular systems and/or processes are possible.

Histogram Losses

Due to the multiple cluster problem, processes in accordance with a number of embodiments of the invention may use Histogram loss as described above to achieve consistently high-quality results. In accordance with several embodiments, the multiple cluster problem may be dealt with by using an automatic clustering process on the feature vectors to identify different textures in an image. The clustering process could transform the image so that each cluster is centered around its mean. However, the use of an automatic clustering process may introduce a number of additional problems. For example, if different linear transforms are applied to different regions of the image in a discrete way, seam lines may appear along the borders between different texture clusters. To deal with these seams, processes in accordance with many embodiments of the invention interpolate the transform between clusters. The interpolation may be more difficult than simply adding a histogram loss that has been shown to solve the same problem as discussed above.

In accordance with particular embodiments of the invention, the instability of Gram or Covariance matrices is addressed by explicitly preserving statistical moments of various orders in the activations of a texture. In accordance with many embodiments, an entire histogram of feature activations is preserved. More specifically, systems and processes in accordance with a number of embodiments augment synthesis loss with m additional histogram losses, one for each feature in each feature map. Additionally, systems and processes in accordance with several embodiments incorporate a total variation loss that may improve smoothness in the synthesized image.

As such, the combined loss for texture synthesis in CNN-based image synthesis processes in accordance with some embodiments of the invention is:

$$\mathcal{L}_{texture}^{(ours)} = \mathcal{L}_{gram} + \mathcal{L}_{histogram} + \mathcal{L}_{tv} \quad (9)$$

where Lgram can be interchanged with Lcovariance arbitrarily. However, it can be slightly subtle to develop a suitable histogram loss. For example, a naive approach of directly placing $L_2$ loss between histograms of the input source texture image S and output synthesized image O has zero gradient almost everywhere and does not contribute to the optimization process.

As such, CNN-based image synthesis processes in accordance with many embodiments of the invention use loss based on histogram matching. To do so, the synthesized layer-wise feature activations are transformed so that their histograms match the corresponding histograms of the input source texture image S. The transformation can be performed once for each histogram loss encountered during backpropagation.

To do so, CNN-based image synthesis processes in accordance with a number of embodiments of the invention use an ordinary histogram matching technique to remap the synthesized output activation to match the input source image activations. In such a technique, $O_{ij}$ represents the output activations for a convolutional layer i and feature j, and $O'_{ij}$ represents the remapped activations. The technique may compute a normalized histogram for the output activations $O_{ij}$ and match it to the normalized histogram for the activations of input source image S to obtain the remapped activations $O'_{ij}$. This technique is then repeated from each feature in the feature map to determine a Frobenius norm distance between $O_{ij}$ and $O'_{ij}$. The loss of the histograms may be expressed as:

$$\mathcal{L}_{histogram} = \sum_{l=1}^{L} \gamma_l \|O_l - R(O_l)\|_F^2 \quad (10)$$

Where $O_i$ is the activation map for feature map I and $R(O_i)$ is the histogram remapped activation map, and $\gamma_l$ is a user weight parameter that controls the strength of the loss. As $R(O_i)$ has zero gradient almost everywhere, it can be treated as a constant for the gradient operator. Thus, the gradient of equation (10) can be computed by realizing $R(O_i)$ into a temporary array $O'_l$ and computing the Frobenius norm loss between $O_i$ and $O'_i$.

Although CNN-based image synthesis processes that use histogram loss in accordance with various embodiments of the invention are described above, other processes that provide histogram loss in accordance with various other embodiments of the invention that add, combine and/or remove steps as necessitated by the requirements of particular systems and/or processes are possible.

Application of Histogram Loss to Style Transfers

Style transfer is a broadening of texture synthesis. In texture synthesis, an input texture is statistically resynthesized. Style transfer is similar with the additional constraint that the synthesized image O should not deviate too much from a content image C. To do so, CNN-based image synthesis processes that perform style transfer in accordance with sundry embodiments of the invention include both a per-pixel content loss and a histogram loss in the parametric synthesis equation such that the overall loss becomes:

$$\mathcal{L}_{transfer}^{(ours)} = \mathcal{L}_{gram} + \mathcal{L}_{histogram} + \mathcal{L}_{content} + \mathcal{L}_{tv} \quad (11)$$

where Lgram is interchangeable with Lcovariance for the purposes of our algorithm.

Although CNN-based image synthesis processes that use histogram loss to perform style transfer in accordance with various embodiments of the invention are described above, other processes that use histogram loss to perform style transfer in accordance with various other embodiments of the invention that add, combine and/or remove steps as necessitated by the requirements of particular systems and/or processes are possible.

Automatic Tuning of Parameters

CNN-based image synthesis processes in accordance with some embodiment automatically determine parameters for the processes performed. The parameters may include, but are not limited to, the coefficients $\alpha_1$ in the Gram/Covariance loss equation (1), $\beta_1$ in the content loss of equation (4), $\gamma_l$ in the histogram/mean loss equation (1) and $\omega$ that is multiplied against the total variation loss.

Automatic tuning processes in accordance with many embodiments of the invention are inspired by batch normalization that tunes hyper-parameters during a training process to reduce extreme values of gradients. The parameters may also be dynamically adjusted during the optimization process. In accordance with a number of embodiments, the dynamic tuning can be performed with the aid of gradient information. During backpropagation, different loss terms $L_i$, may be encountered. Each loss term $L_i$ has an associated parameter $c_i$ that needs to be determined ($c_i$ is one of the parameters $\alpha_l$, $\beta_l$, $\gamma_l$, and $\omega$). A backpropagated gradient $g_i$ may first be calculated from the current loss term as if $c_i$ were 1. However, if the magnitude of $g_i$ exceeds a constant magnitude threshold $T_i$, then the gradient $g_i$ may be normalized so that its length is equal to $T_i$. Magnitude thresholds of 1 can be used for all parameters except for the coefficient $\alpha_l$ of the Gram/Covariance loss, which may have a magnitude threshold of 100 in accordance with several embodiments. As can readily be appreciated, magnitude thresholds and/or other constraints can be specified as appropriate to the requirements of a given application.

Although CNN-based image synthesis processes that perform automatic tuning in accordance with various embodiments of the invention are described above, other processes that provide automatic tuning in accordance with various other embodiments of the invention that add, combine and/or remove steps as necessitated by the requirements of particular systems and/or processes are possible.

Multiscale Pyramid Based Synthesis

Figure 4:
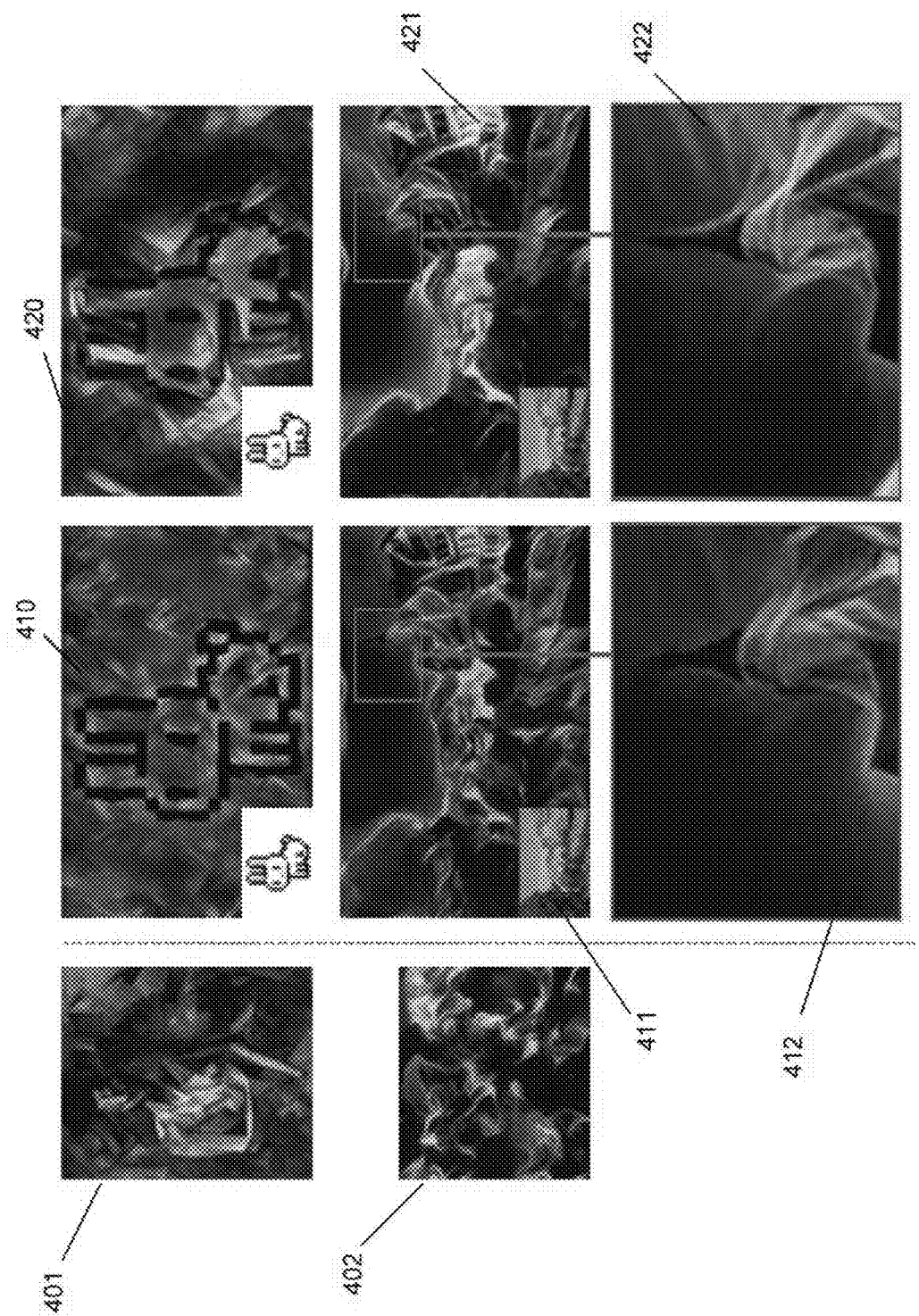
FIG. 4 is an illustration of images showing a comparison of results of texture synthesis performed in accordance with various embodiments of the invention with and without the use of pyramids.

CNN-based image synthesis processes in accordance with certain embodiments include manual and automatic control maps that were previously used in non-parametric approaches. To achieve this, processes in accordance with many embodiments perform a coarse-to-fine synthesis using image pyramids. In accordance with a number of embodiments, a ratio of two is used between successive image widths in the pyramid. A comparison of results of texture synthesis performed in accordance with various embodiments of the invention with and without the use of pyramids are shown in FIG. 4. In FIG. 4, images 401 and 402 are the style images and images 410-411 and 420-421 are the content images. Images 410 and 411 were generated without the use of pyramids and images 420 and 421 were generated with the use of pyramids. Images 410 and 420 show that pyramids blend coarse scale style features with content features better. Images 411 and 421 may show that pyramids transfer coarse scale features better and reduce CNN noise artifacts. Images 412 and 422 are magnified from images 411 and 421, respectively, and may show noise artifacts (in image 412) and better transfer of coarse-scale features (in image 422).

Figure 5:
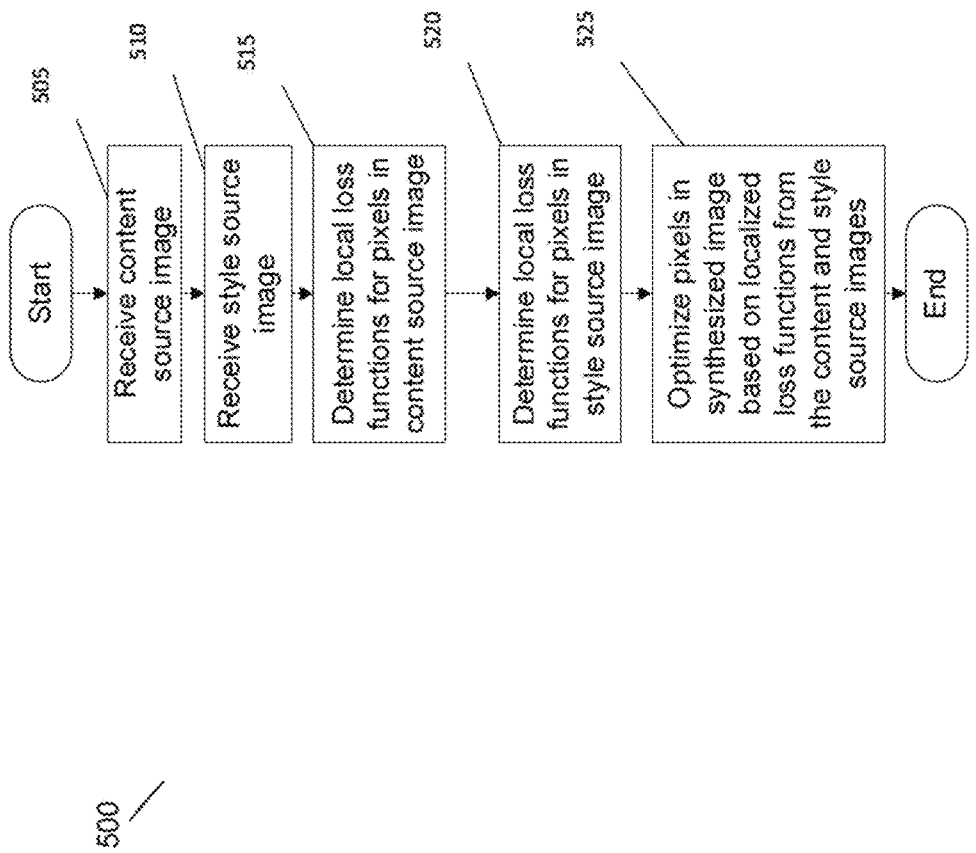
FIG. 5 is an illustration of a flow diagram of a process for providing CNN-based image synthesis that performs style transfer using localized loss functions in accordance with an embodiment of the invention.

Processes for Providing Convolutional Neural Network Based Image Synthesis Using Localized Loss Functions A process for providing CNN-based image synthesis that performs style transfer using localized loss functions in accordance with an embodiment of the invention is shown in FIG. 5. In process 500, a source content image and a source style image are received (505, 510). The source content image includes the structures that are to be included in a synthesized image and the source style image includes a texture that is to be applied to the synthesized image. The process 500 determines localized content loss functions for groups of pixels in the source content image (515) and/or localized style loss functions for groups of pixels in the source style image (520). In accordance with some embodiments, the localized content loss functions and/or localized style loss functions may be generated using a CNN. The determinations of the localized content and/or style loss functions based upon various groupings of the pixels in accordance with various embodiments of the invention are described below. Process 500 performs an optimization process using the localized content loss functions and/or localized style loss functions to cause the pixels in the synthesized image to form an image with a desired amount of content from the content source image and a desired amount of texture from the source style image (525). In accordance with certain embodiments, the optimization process may be an iterative optimization process that is performed until a desired result is achieved. In accordance with many embodiments, the iterative optimization process may be performed by a backpropagation through a CNN iterative optimization processes in accordance with various embodiments of the invention are described in more detail below.

Although processes for providing convolutional neural network based image synthesis by performing style transfer using localized loss functions in accordance with various embodiments of the invention are discussed above, other processes may be modified by adding, removing, and/or combining steps of the described processes as necessitated by system and/or process requirements in accordance with various embodiments of the inventions.

Localizing Style Losses

Style loss functions reproduce the textural component of the style image. Thus, a global style loss function may be transformed into a stationary representation (i.e. the representation is a culmination of the local patches of texture independent of the location of each local patch in the image). A global style loss function approach may generate the global style loss function by applying the source style image to a CNN, gathering all activations for a layer in a CNN and building a parametric model from the gathered activations of the layer. An optimization process may then be used to cause the loss function of one image to appear statistically similar to the loss function of another image by minimizing the error distance between the parametric model of the loss functions of the two images (which act as a statistical fingerprint that is being matched).

Figure 6:
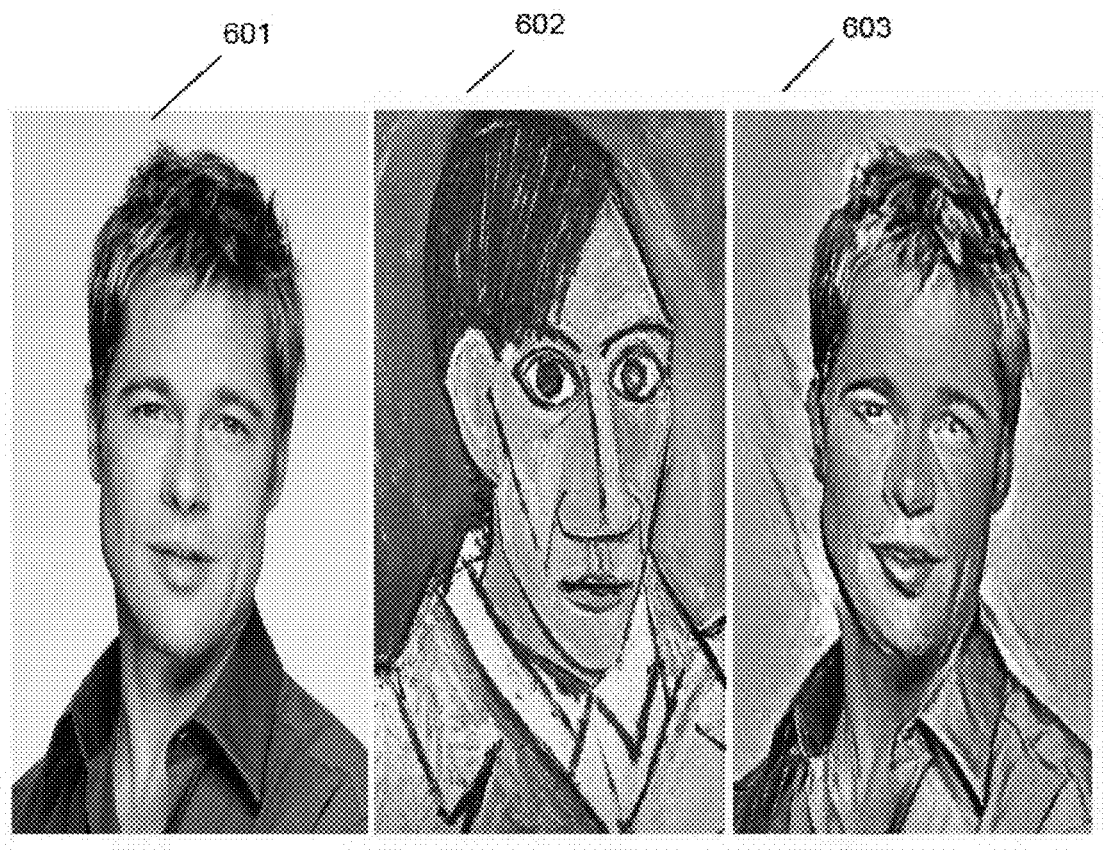
FIG. 6 is an illustration of two input images and a resulting image from a style transfer process of the two input images using localized style loss functions in accordance with an embodiment of the invention.

A style transfer approach using a global style loss function may lead to unimpressive results as shown by the images illustrated in FIG. 6. In FIG. 6, Brad Pitt's image 601 is matched to an image of Picasso's self-portrait 602. In the resulting image 603, the overall style of the painting in the image 602 is transferred including the individual brush strokes, the general color palette and the overall look. This makes the image 603 look similar to the image 602. However, the individual features that compose the face are not transferred. Thus, Brad Pitt's eyes, nose and mouth do not look like Picasso's corresponding features.

In accordance with sundry embodiments of the invention, a collection of strategies designed to transform the style of an image locally rather than globally may be performed. However, the various strategies used in the various embodiments involve a similar core idea of using a collection of parametric models representing local loss functions in either one or both of the source content image and the source style image, as opposed to using a single parametric model for each image. Each of the parametric models of an image summarize specific features in the image and are distinct and/or unique from the other parametric models in the collection of matrices for the image. The application of local loss functions may vary greatly between the various embodiments, depending on a desired degree of locality. Thus, each of the models may represent very large regions of the image in accordance with some embodiments when it is desired to have very little locality. Alternatively, the models may each represent smaller groups down to an individual pixel in accordance with particular embodiments of the invention where a very high degree of locality is desired.

Region-based Style Transfers

Figure 7:
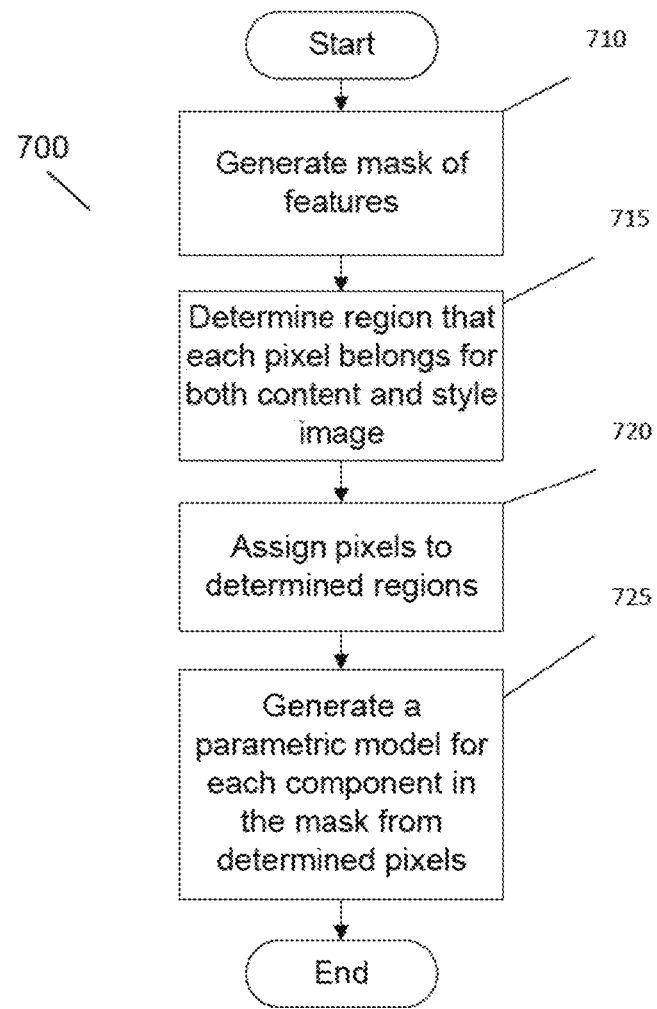
FIG. 7 is an illustration of a flow diagram of a process for generating region-based loss functions in accordance with an embodiment of the invention.

Region-based style transfer may be used in accordance with some embodiments of the invention. A process for generating a region-based loss function in accordance with an embodiment of the invention is shown in FIG. 7. A process 700 may generate a mask with one or more regions for both of the source content and source style images (710). In accordance with various embodiments, the regions may be determined by a user and received as a manual input of the user into the system. In accordance with many embodiments, processes may generate the regions of the mask through a neighbor matching process and/or other similar process for structure identification. The process 700 applies the masks to each image and determines a region of the mask associated with each pixel in each of the images (715). The process 700 assigns each pixel to the region determined to be associated with the pixel (720). The process 700 then generates parametric models for each of the identified regions of the masks from the pixels associated with the regions (725) and may add the generated parametric model for each region to an array of matrices stored in memory.

Figure 8:
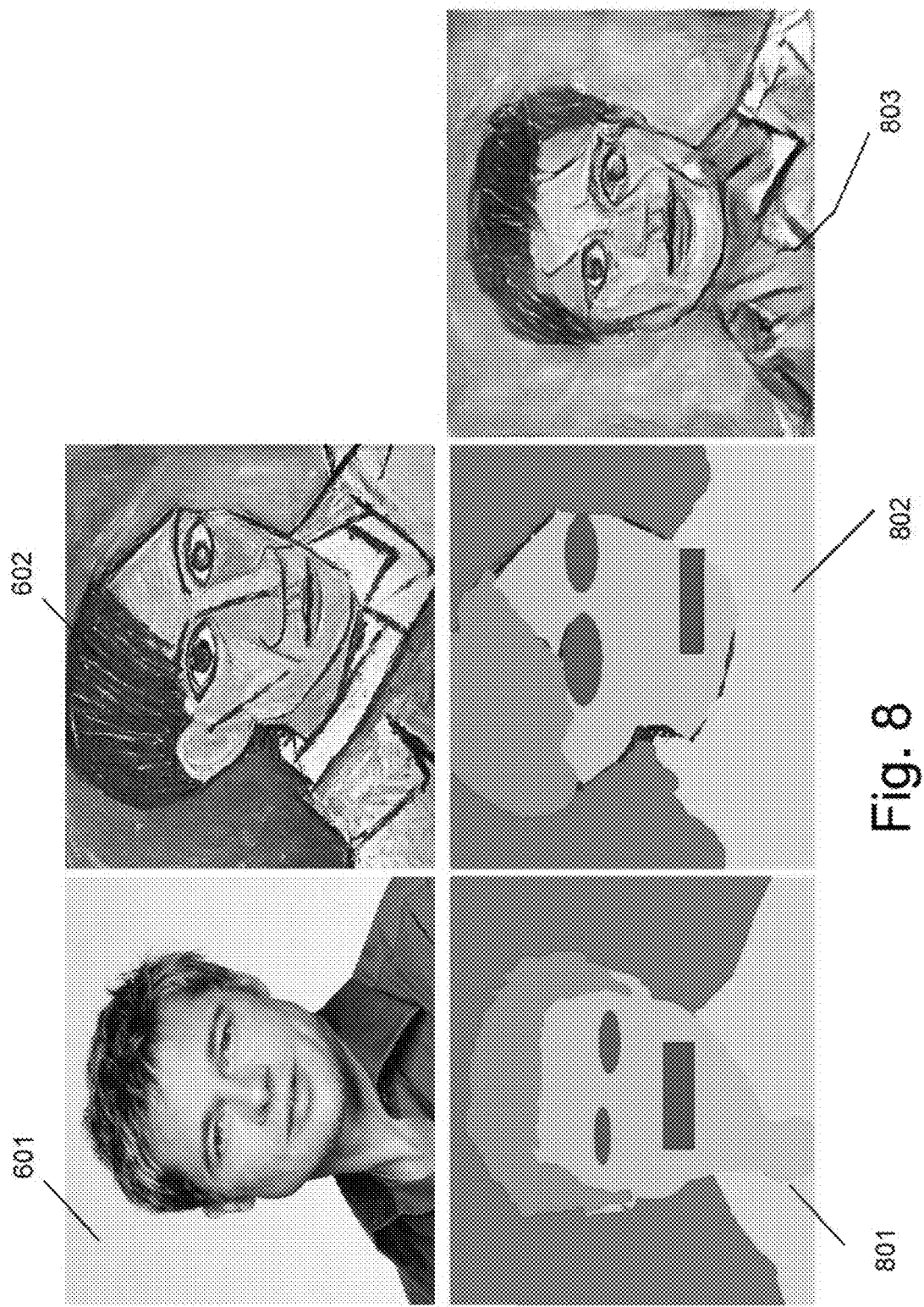
FIG. 8 is an illustration of conceptual images showing masks of regions for two input images used in a style transfer process using region-based loss functions in accordance with an embodiment of the invention.

In accordance with many embodiments, the mask value of each pixel may be used to index the pixel into the proper parametric model in the array for use in the style transfer process described above. Images that illustrate a region-based style transfer process performed on the images of Brad Pitt and Picasso's self-portrait 601 and 602 in accordance with an embodiment of the invention are shown in FIG. 8. In region-based style transfer, distinct features of an image can be clustered together. As shown by image 802, Picasso's portrait from image 602 is segmented into a few distinct regions. For example, the eyes may be one region with the lips, nose, hair, skin shirt and background each being in their own regions. A mask 802 may be applied over image 602 to identify the region that contains each pixel in the image 602. Likewise, a mask shown in image 801 may be applied to the image 601 of Brad Pitt to identify the pixels that belong to each of the identified regions of the image 601.

Although processes that provide region-based loss functions in accordance with various embodiments of the invention are described above, other processes that provide region-based loss functions in accordance with various other embodiments of the invention that add, combine and/or remove steps as necessitated by the requirements of particular systems and/or processes are possible.

Uniform Segments Style Transfer

Figure 10:
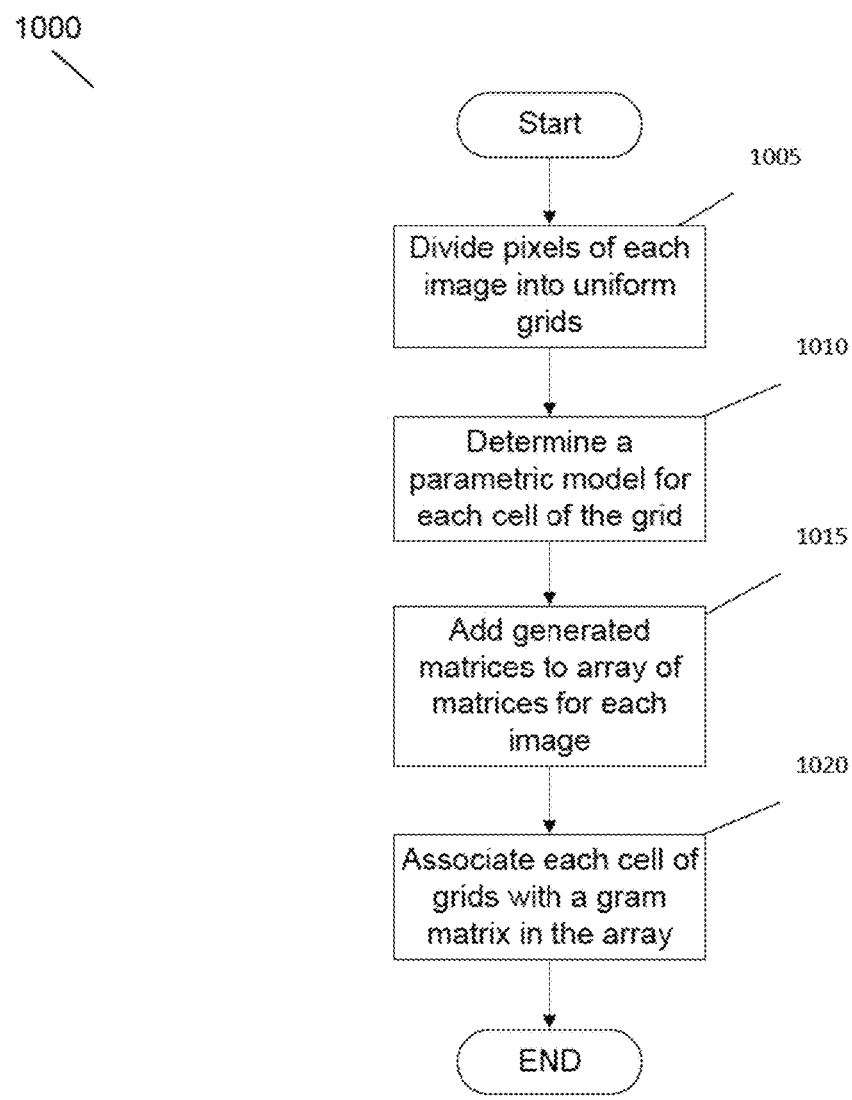
FIG. 10 is an illustration of a flow diagram of a process for generating localized loss functions in a style transfer process using uniform regions in accordance with an embodiment of the invention.

In accordance with a number of embodiments of the invention, a uniform segment style transfer process may be performed. In uniform segment style transfer, the images are divided into uniform segments. The images of Brad Pitt and Picasso's self-portrait divided into uniform segments in accordance with an embodiment of the invention that uses uniform segments are shown in FIG. 9. A process for performing uniform style transfer in accordance with an embodiment of the invention is shown in FIG. 10. As shown in images 901 and 902 of FIG. 9, a process 1000 of FIG. 10 divides each image into a grid of regions or cells (1005). In particular, images 901 and 902 are divided into grids of 8×8 cells in the shown embodiment. However, any number of cells may be used in grids, for example 16×16 and 20×20 grids, in accordance with various other embodiments of the invention. Each cell is associated with an individual parametric model of a localized loss function (1010). In many embodiments, the generated parametric models can be added (1015) to an array of models for each image. In accordance with some embodiments, an individual parametric model may be associated (1020) with groups of cells that are determined by similarity of the cells or by some other manner.

Figure 11:
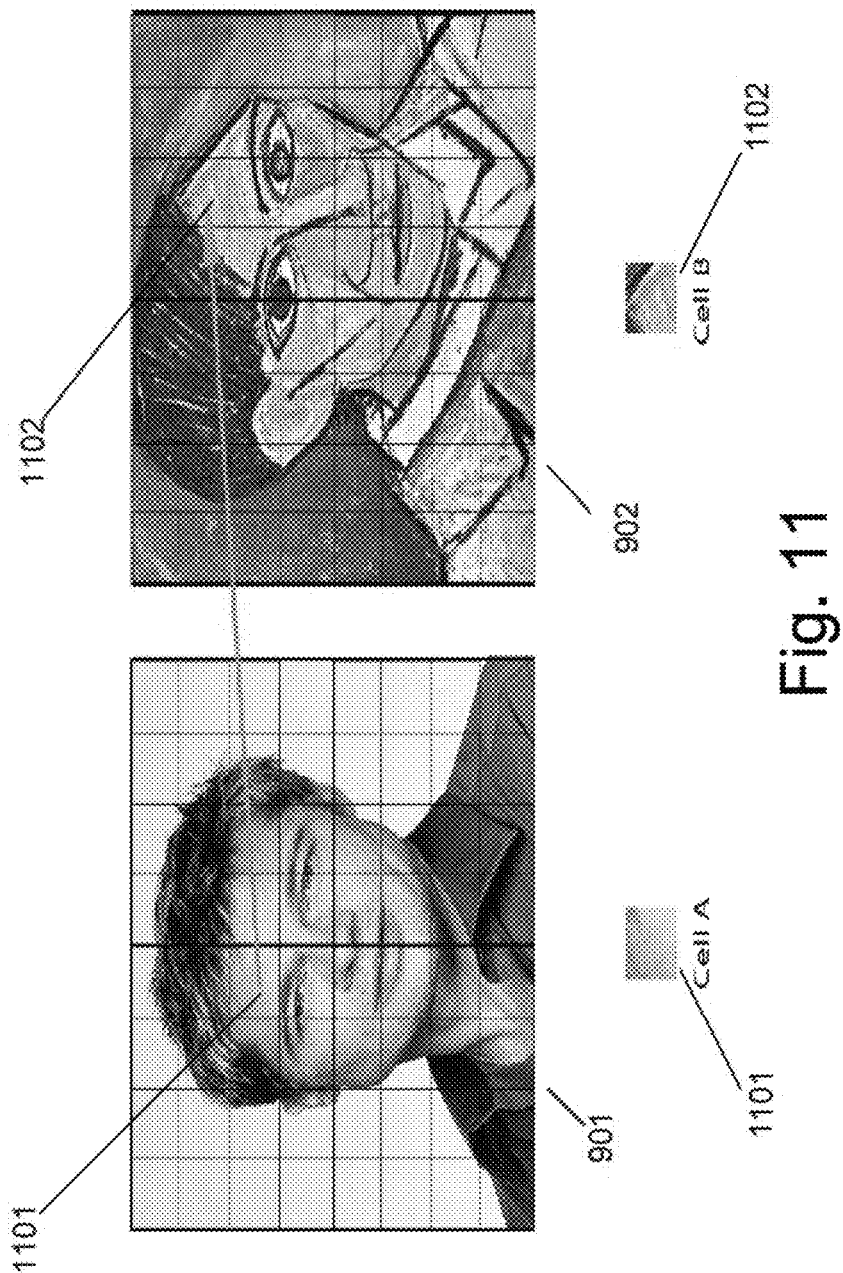
FIG. 11 is an illustration of a comparison of similar cells in two input images in a style transfer process using uniform regions in accordance with an embodiment of the invention.

After the parametric models are generated, the parametric models may be used as a descriptor for nearest neighbor matching of the pixels in associated cell(s). The nearest neighbor matching binds cells together so that each cell in the content image is optimized more closely resemble a cell in the style image that is determined to most closely approximate the cell as shown in FIG. 11. In FIG. 11, a cell 1101 in the image 901 is optimized to a cell 1102 in the image 902. In accordance with some embodiments, one or more cells in the style image that most closely approximate a cell in the content image may be identified by determining the cell(s) in the style image that has a minimum $L_2$ distance between its parametric model and the parametric model of the cell in the content image. In accordance with certain embodiments, the optimizing processes for all of the cells in the content image are performed in parallel.

Although processes that provide uniform segment style transfer in accordance with various embodiments of the invention are described above, other processes that provide segment-based style transfer in accordance with various other embodiments of the invention that add, combine and/or remove steps as necessitated by the requirements of particular systems and/or processes are possible.

Per Pixel Style Transfer

Figure 12:
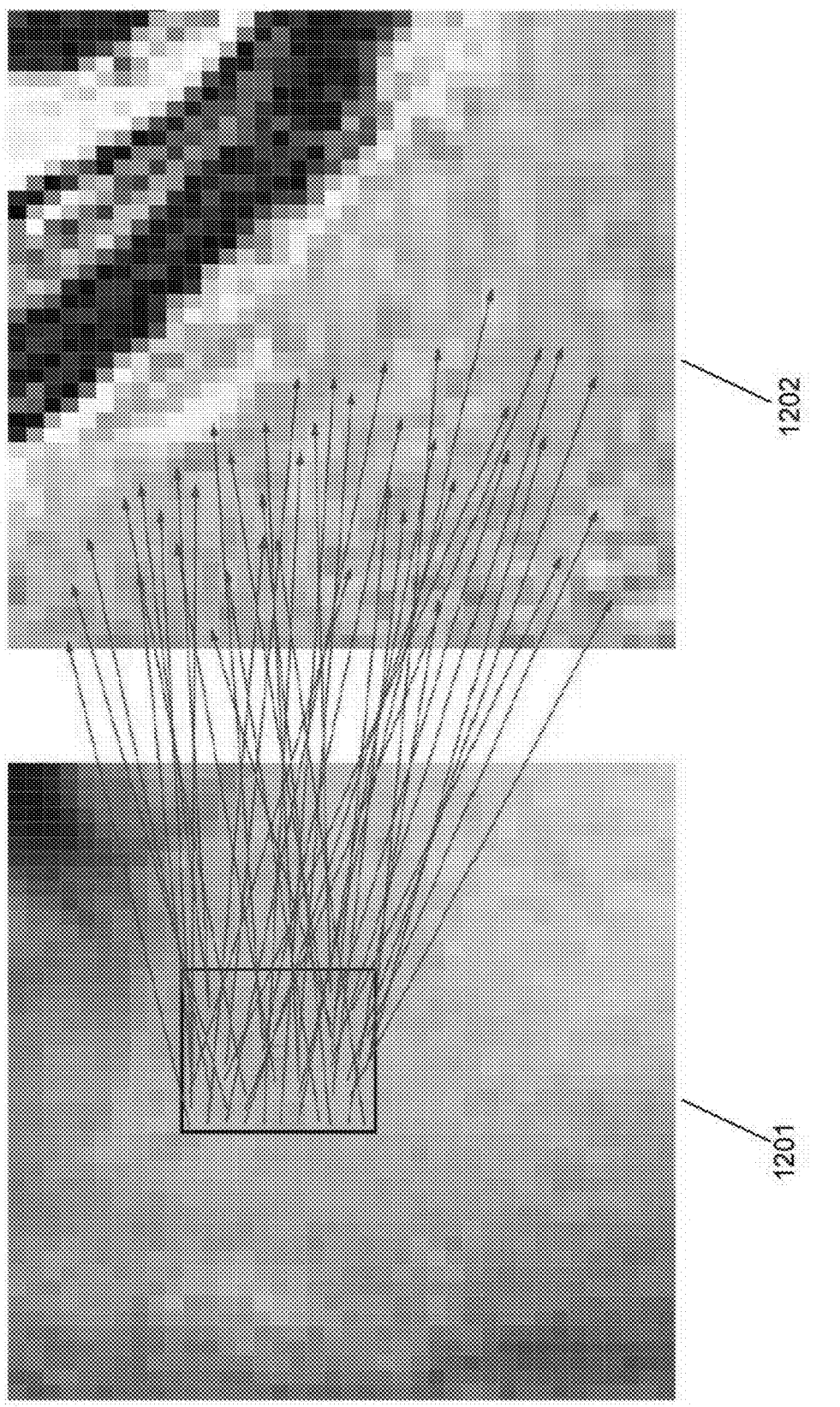
FIG. 12 is an illustration of a comparison of similar pixels in two input images in a style transfer process using a per pixel loss transfer in accordance with an embodiment of the invention.
Figure 13:
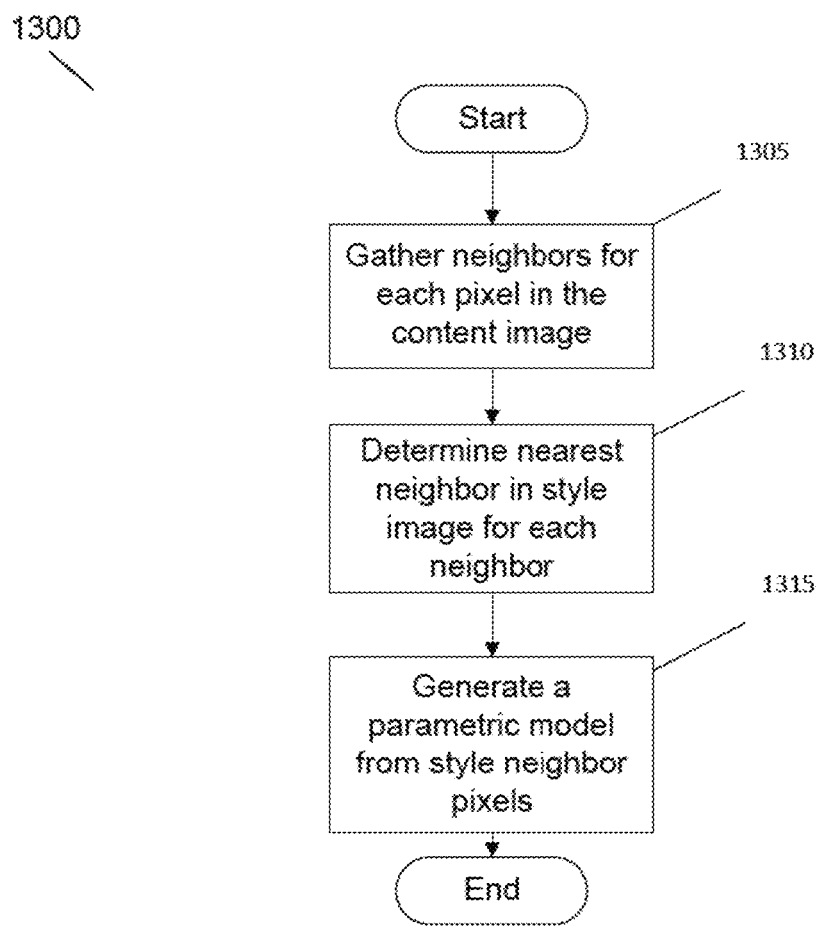
FIG. 13 is an illustration of a process for generating localized style loss functions for a style transfer process using per pixel loss transfer in accordance with an embodiment of the invention.

In accordance with particular embodiments of the invention, each pixel is a local region. Images that show the association between pixels in a source content image and a source style image in accordance with a certain embodiment of this invention are shown in FIG. 12. In accordance with many embodiments, a parametric model of a localized style loss function is generated for each pixel in the content image cell 1201 and the style image cell 1202. A process for generating localized style loss functions in accordance with an embodiment of the invention is shown in FIG. 13. The process 1300 includes gathering a neighborhood of pixels surrounding each particular pixel in the source content image (1305). A group of pixels in the source style image that are associated with the neighbor pixels of each particular pixel is determined (1310). In accordance with sundry embodiments, a pre-computed nearest neighbor set may be used to associate each pixel in the content image with a pixel in the source style image. The group of pixels in the source style image associated with the neighborhood of each particular pixel is used to generate the parametric model of the localized style loss function that the particular pixel is optimized toward (1315).

Although processes that provide per pixel-based style transfer in accordance with various embodiments of the invention are described above, other processes that provide per pixel-based style transfer in accordance with sundry embodiments of the invention that add, combine and/or remove steps as necessitated by the requirements of particular systems and/or processes are possible.

From the above descriptions of the various transfer strategies, one may see that regional segment style transfer is simple and fast compared to the other transfer strategies. However, the regional segment style transfer can be imprecise, whether a human or a CNN is used to determine how the parametric models are generated. The cell transfer can differ from the regional transfer in that many more parametric models are generated and the matrices themselves are used to determine the correspondence of features. The per pixel approach is typically the most precise and the slowest possible transfer strategy because the amount of computations needed is increased by generation of a parametric model for each particular pixel from patches of pixels around the particular pixel. The increase in computations stems from the fact that in the other approaches each of the pixels in an image contribute to one parametric model and in the per pixel approach each pixel contributes to the parametric model of each of the neighboring pixels. Furthermore, it is noted that various other embodiments may select certain other manners in determining local regions to refine the trade-off between speed and/or memory versus accuracy.

Localizing for Content Loss

In accordance with particular embodiments, content loss can be used for the transfer process instead of style loss. The difference is that style loss attempts to be stationary and content loss does not. For purposes of this discussion, stationary means that the location of a pixel is the main factor influencing what the pixel should look like. The content loss function can be simple in accordance with some embodiments in that the L2 (or Euclidian) distance is summed for each pixel in the synthesized image to each pixel at the same location in the content image.

The goal of content loss, on the other hand, is to reproduce the "structure" of the content image (image 1401 of FIG. 14 showing the Golden Gate Bridge) while allowing the non-structural aspects of the image to mutate towards resembling the style image (image 1402 of FIG. 14 showing Starry Night). In accordance with other known transfer processes, one may assume that the deeper layers of the network represent the higher order image features, so by maintaining a low error between content and synthesis deeper in the network but allowing the style to be optimized at the shallow layers, a balance is reached between the style and content. However, these processes often do not regularly provide compelling results.

Figure 15:
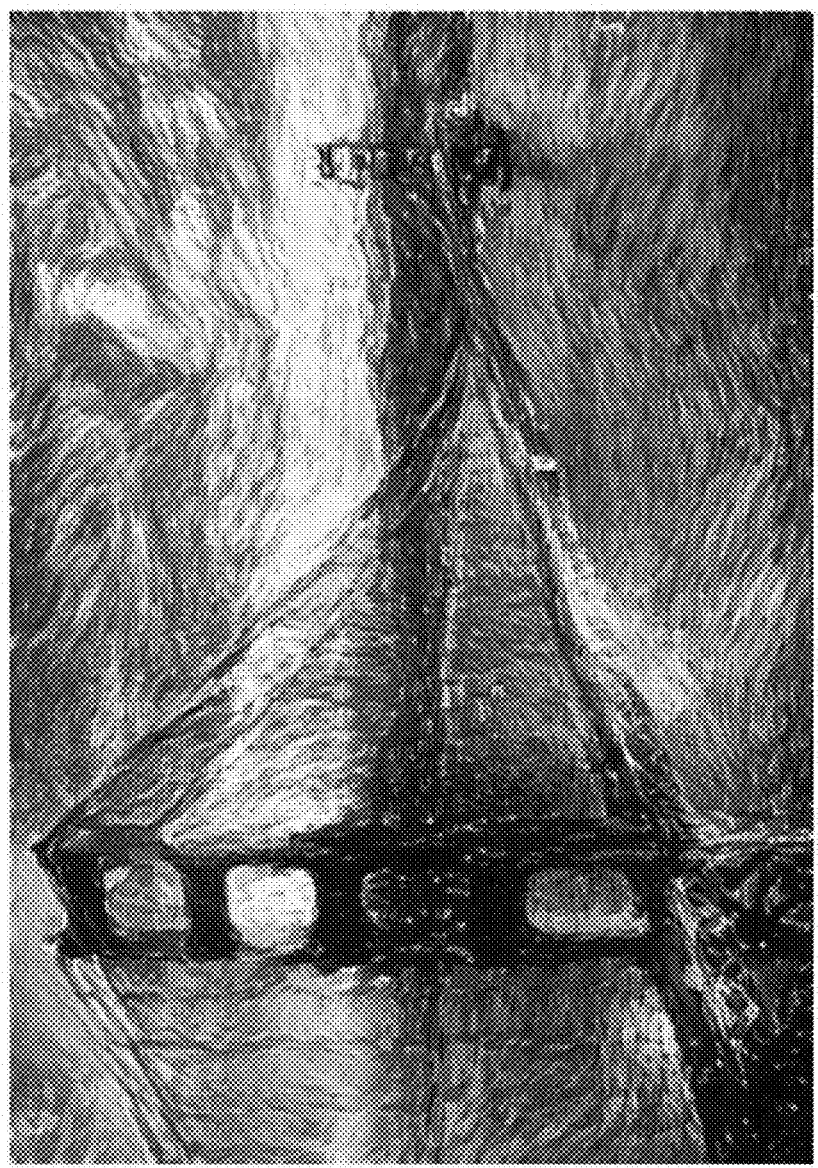
FIG. 15 is an illustration of a resulting image from the style transfer from the two input images of FIG. 14 performed by a style transfer process using global content loss in accordance with an embodiment of the invention.

A problem with using a global content loss in a style transfer process may be that all of the regions of the content image may not be equally as important in terms of key shapes and structures in the image. For instance, in FIG. 15, image 1501 of the Golden Gate Bridge, the low-importance content features including the low frequency sky and ocean are given a high enough content loss to overpower the style contribution and stop large, swirly clouds and stars from forming. In parallel, the high-importance content features including the bridge are largely being distorted by the style image. This makes the high-importance content features lose fine scale qualities such as the cable stretching from tower to tower. Furthermore, the tower in the background is more distorted than the larger tower in the foreground because the tower in the background is smaller in terms of image size. However, the tower in the background is not less important than the tower in the foreground in terms of content as the tower is a key structure in the image.

Figure 16:
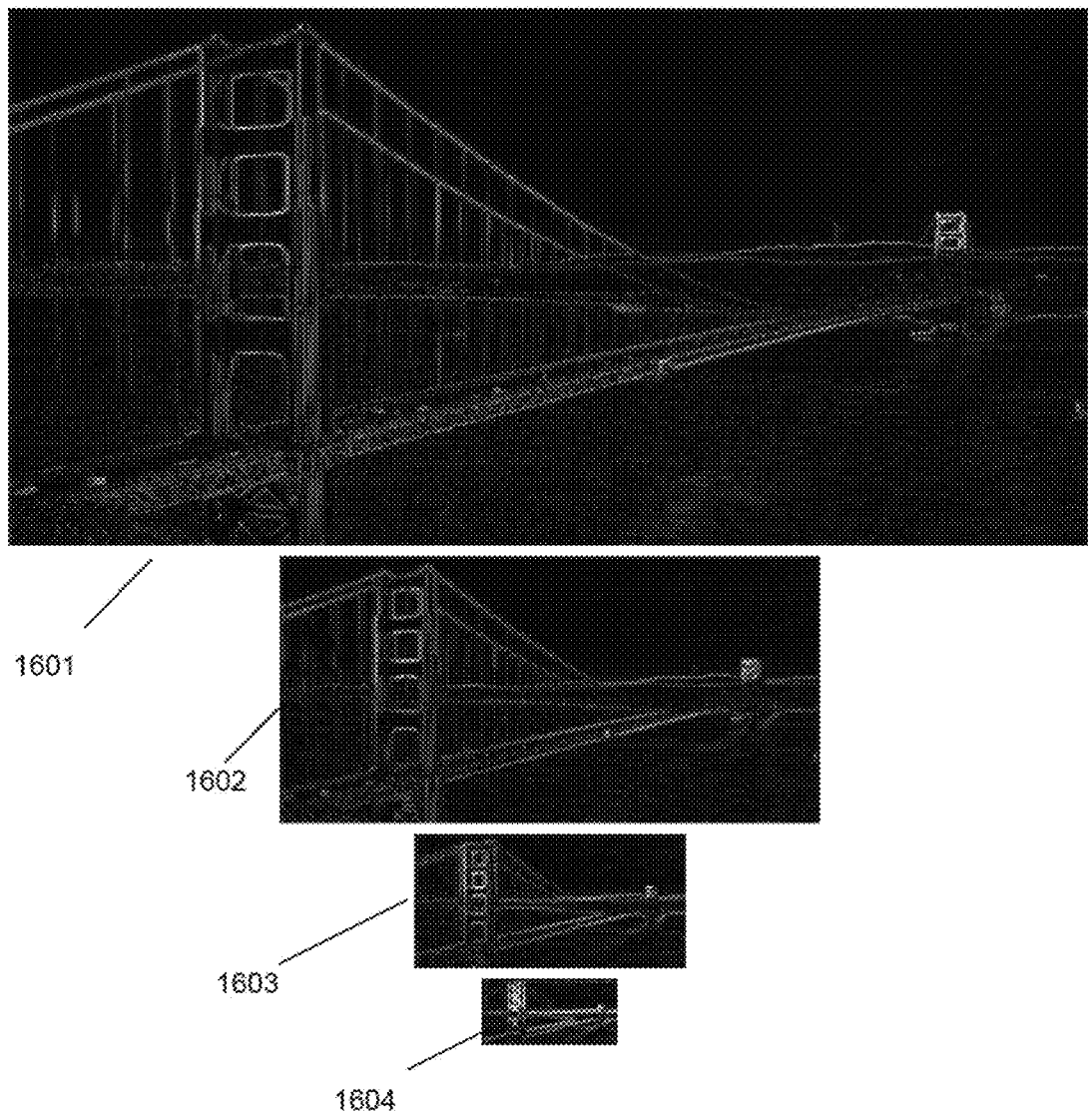
FIG. 16 is an illustration of a Laplacian Pyramid of images derived from a content source image from FIG. 14 used in a style transfer process using local content loss in accordance with an embodiment of the invention.

Style transfer processes that use localized content loss functions in accordance with some embodiments of the invention may provide weights to each pixel based on the amount that the pixel contributes to a key shape or structure in the image. However, "content" can be a poorly defined concept with respect to art as "content" is subjective and can be subject to personal interpretation. As such, the process for localizing content loss in accordance with some embodiments of the invention is based on the following observations about "content." For the purposes of determining the contribution of a pixel to content, one may observe that flat, low frequency regions of an image generally do not contribute to the content of the image (for purposes of human perception) while high frequency regions generally are important contributors to the content. Therefore, style transfer processes in accordance with many embodiments of the invention may use a Laplacian Pyramid of black and white versions of the content image (Images 1601-1604 in FIG. 16) to determine content loss weights for each pixel in the image being synthesized where the high frequency pixels (whiter pixels) have a higher influence on content than low frequency pixels (darker pixels).

Alternatively, convolutional neural networks (CNNs) trained on image classification tend to learn kernels at the deeper levels of the network that recognize shapes which are structurally meaningful to humans. Therefore, the magnitude of feature vectors produced from the content image deep in the network can also be used as a scaling factor for the content loss itself.

Figure 17:
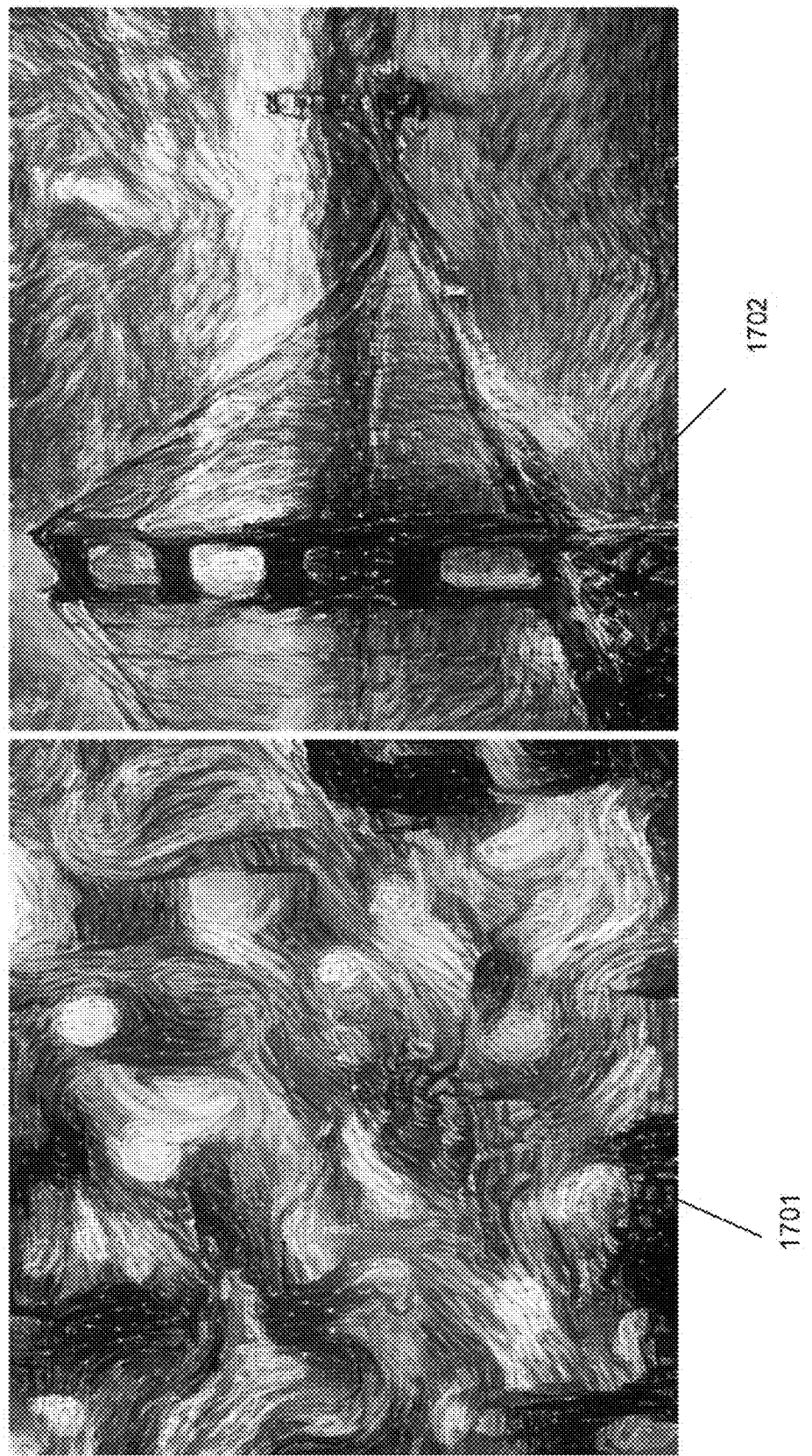
FIGS. 17 and 18 are illustrations of images produced by style transfer processes using global loss functions in accordance with certain embodiments of this invention.

The difference between the use of global style loss and global content loss is shown by the images shown in FIG. 17. An image 1701 shows an image generated using global style loss and an image 1702 shows an image generated using global content loss starting from noise and use the respective global loss functions to generate the final image. The image 1701 illustrates global style loss with no content loss producing a "texturized" version of the style image (Starry Night). Image 1702, on the other hand, introduces global content loss to the texturized version and the texturized version of Starry Night is reshaped into the form of the Golden State Bridge but with the flaws identified above.

Figure 18:
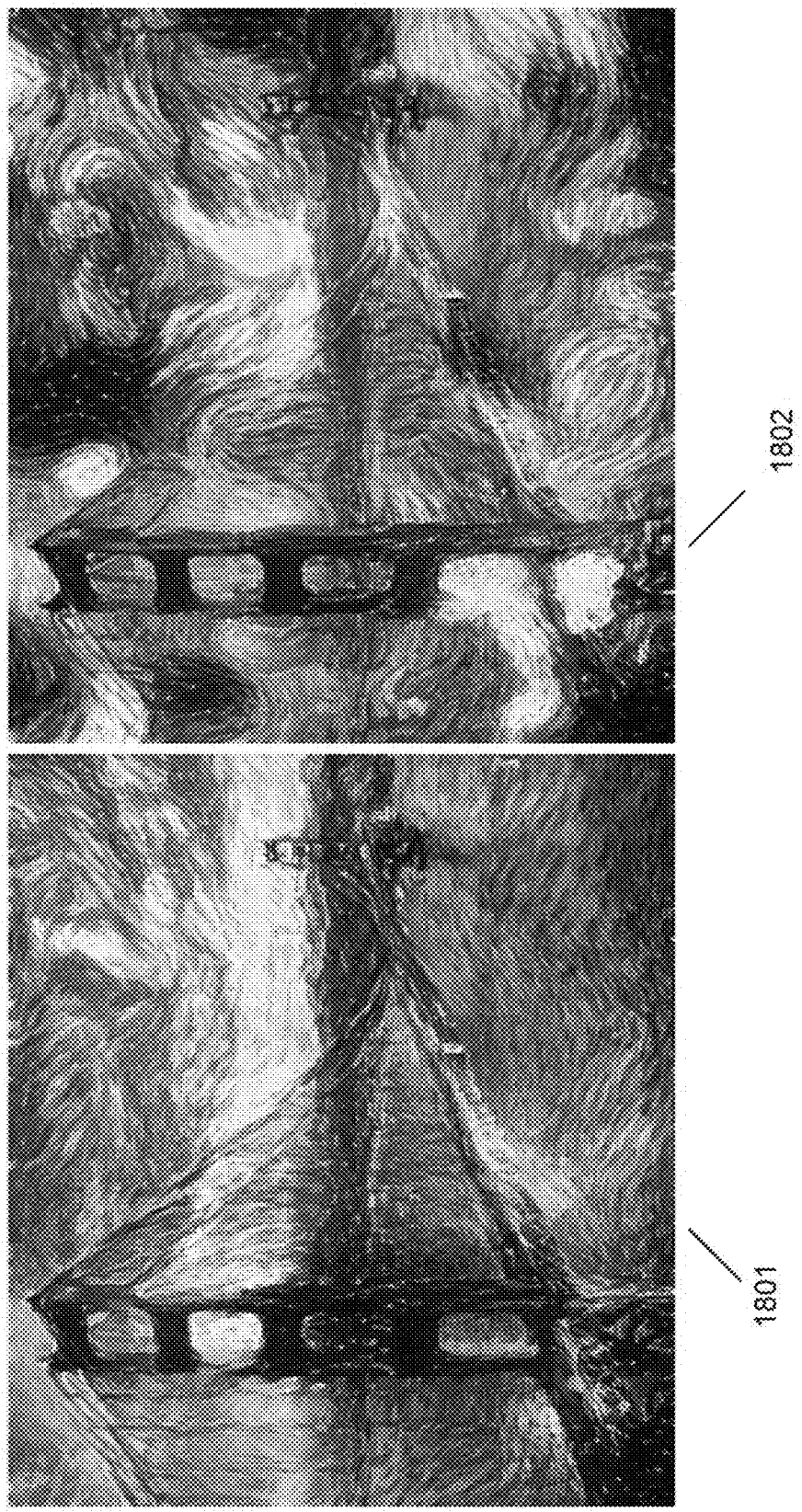

The difference between the use of a global content loss functions and the use of localized content loss functions determined using a Laplacian Pyramid in accordance with a certain embodiment of the invention is shown in FIG. 18. An image 1801 is the same as the image 1702 and introduces global content loss to the texturized version of the image, and an image 1802 introduces local content loss based upon a Laplacian Pyramid to the texturized version instead of the global content loss. The features in the image 1802 emerge (i.e. the bridge and the land) while the rest of the image reproduces the texture of Starry Night more accurately.

Although previous processes may start from noise, noise does not have to be the starting point in some embodiments of this invention. The logic of starting from noise may be that noise often produces a slightly different version of the transfer each time.

In accordance with a number of embodiments of the invention, CNN backpropagation may be used to provide a style transfer process using global and/or local content loss. The use of CNN backpropagation can allow the image to be thought of as a point in a super-high dimensional space (a dimension for each color channel in each pixel of the image). The optimization process is a gradient descent optimization that pulls an image at that point through the image's high dimensional space toward a new point that is within a small region of the high dimensional space that is considered "good output." The force that pulls the image may be the combined loss function for style and content as well as optimizing towards a local minimum of the function, depending on where the noise commences in this space. Alternatively, the optimization process may be started from the content image instead of noise in accordance with a number of embodiments. Using the standard approach, the use of the content image to start may not offer an advantage because the content loss may begin from an optimal position and play a more aggressive "tug of war" against the style loss resulting in an image that has more content and less style. In summary, when starting from noise, both loss functions (content and style) are often very bad and move together toward a mutually optimal choice for most of the processes whereas, when starting from the content image, the two loss functions are often fighting against each other during the entire process, and that may return a less than pleasing result.

The use of content loss in style transfer processes in accordance with particular embodiments of the invention has certain advantages that known style transfer processes typically have previously overlooked. If the content loss is removed from the function leaving only style loss, a texturized version of the image (as shown in FIG. 19, image 1901) is generated with the subtle difference that the content image (i.e. the starting point in high dimensional space) exists in a local minimum within the space of all possible versions of the texturized version of the style image. As such, starting at the content image and removing the content loss causes the process to start at a point in space that is the content image and move away from this point in the high dimension space to a point that is pure style, but the process arrives at a local minimum that represents both style and content in a much better localized ratio than is typically produced by known processes as shown in an image 1901 of FIG. 19.

The image 1901 was generated by starting at the content image of the Golden Gate Bridge and then optimizing using only style loss so that the image mutated to better resemble "Starry Night" until the process reached a local minimum. This produces better results than previously known style transfer processes. However, the results may be improved by re-introducing localized content loss instead of global content loss that results in image 1902. This approach addresses the problem of removing content loss completely by trying to reach a local minimum in the optimization process that does not cause key structures (e.g. the cables on the bridge and the tower in the background) to be mutated too much by the style loss and lose the distinguishing characteristics of these structures. By re-introducing local content loss in accordance with some embodiments of the invention, the mutation of structurally important aspects of the content too far in the style direction may be reduced leading to an optimization process that reaches a more desirable local minimum.

Localized style and content loss are also applicable within a feedforward texture synthesis and style transfer algorithm and are not limited to an optimization framework using backpropagation.

Although processes that provide style transfer using global and/or local content loss in accordance with various embodiments of the invention are described above, other processes that provide style transfer using global and/or local content loss in accordance with various other embodiments of the invention that add, combine and/or remove steps as necessitated by the requirements of particular systems and/or processes are possible.

Localized Style Loss for Artistic Controls

In accordance with sundry embodiments of the invention, CNN-based image synthesis processes separate multiple textures in an image into multiple models to determine localized loss. To do so, processes in accordance with many embodiments receive an index mask for the source texture or style image and an index mask for the synthesized image. In accordance with a number of embodiments, each mask is input by a user. Each mask may include M indices. This may sometimes be referred to as a "painting by numbers" process.

Figure 20:
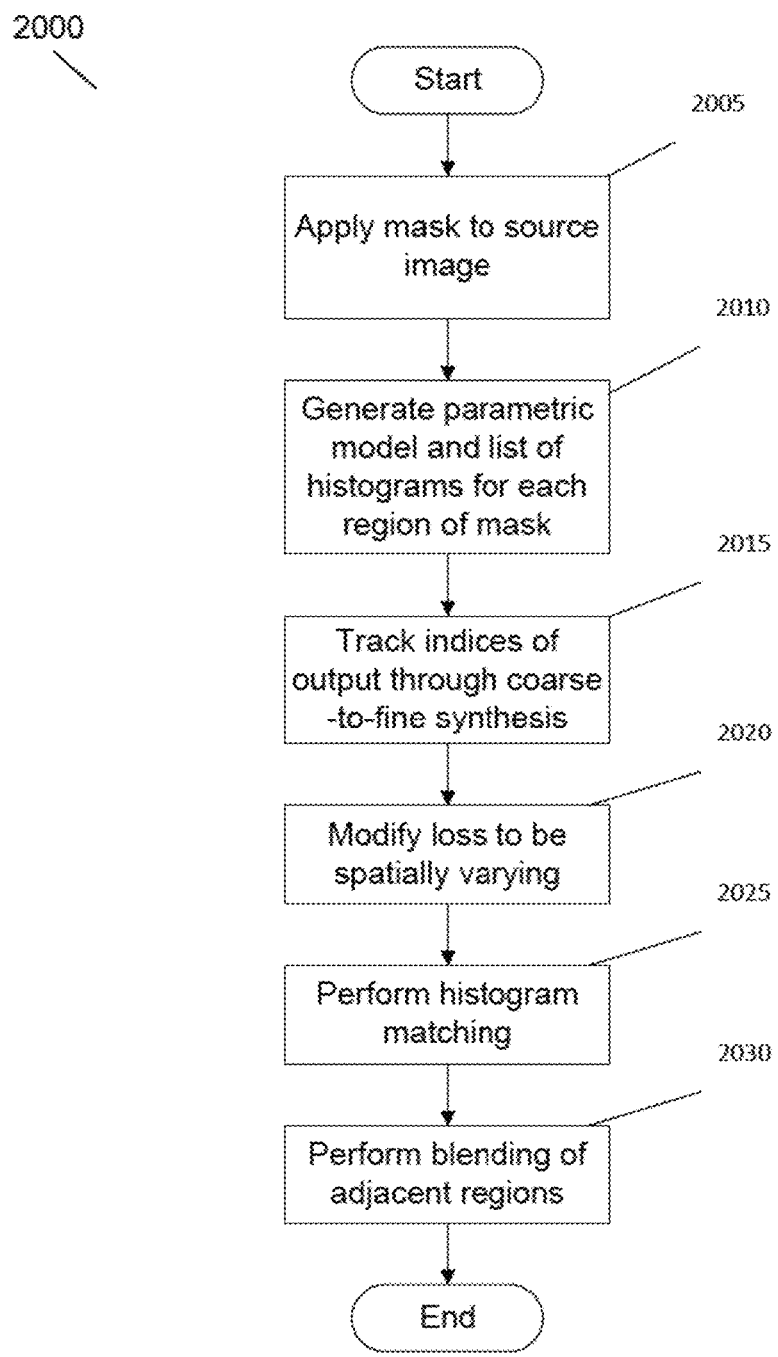
FIG. 20 is an illustration of a flow diagram of a process for determining localized loss using masks in accordance with an embodiment of the invention.

A process for determining localized loss using masks in accordance with an embodiment of the invention is shown in FIG. 20. A process 2000 applies the mask for the source image to the source image to determine the pixels that belong to each of the M indices (2005) and the mask to the synthesized image to determine the pixels that belong to each of the M indices of the synthesized mask. A parametric model is generated for each of the M indices of the source style mask from the pixels that belong to each of the M matrices (2010). The indices of the synthesized output may be tracked though an image pyramid for coarse-to-fine synthesis (2015). During synthesis, the previous losses are modified to be spatially varying (2020). In accordance with many embodiments, spatially varying Gram/Covariance matrix and histogram losses may be imposed where the style Gram/Covariance matrices and histograms vary spatially based on the output index for the current pixel. Histogram matching is then performed (2025). In accordance with several embodiments, the histogram matching may be performed separately in each of the M regions defined by the indexed masks. Blending of adjacent regions may then be performed (2030). In accordance with a number of embodiments, the bending of adjacent regions can be automatically performed during backpropagation.

Figure 21:
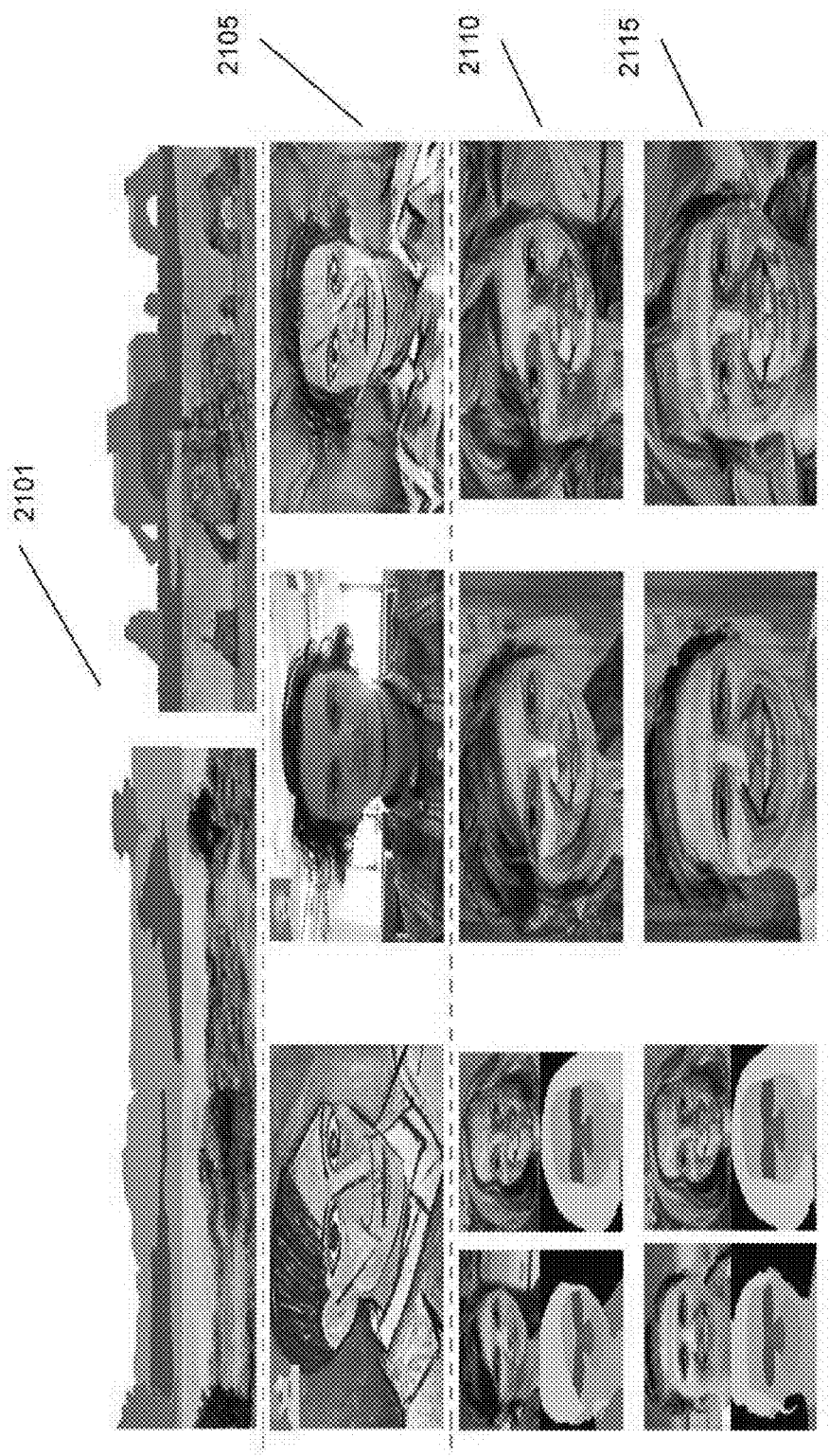
FIG. 21 is an illustration of images synthesized in accordance with some embodiments of the invention and images generated using other processes.

In accordance with certain embodiments of CNN-based image synthesis, it is important to note that often the style and content source images contain sets of textures that are semantically similar and should be transferred to each other. An example of this is shown in FIG. 21. FIG. 21 also shows images synthesized in accordance with particular embodiments of the invention and images generated using other processes. In FIG. 21, images 2101 an example of controllable parametric neural texture synthesis. Original images are on the left, synthesis results on the right; corresponding masks are above each image. Rows of images 2105, 2110 and 2115 are examples of portrait style transfer using painting by numbers. Rows of images 2110 and 2115 show style transfer results for an embodiment of the invention on the far right as compared to images generated by another process in middle. The images can show that processes in accordance with some embodiments of the invention may preserve fine-scale artistic texture better. However, processes in accordance with certain embodiments of the invention may also transfer a bit more of the person's "identity," primarily due to hair and eye color changes.

Implementation Details of CNN Based Image Synthesis Systems that Use Histograms

In accordance with sundry embodiments of the invention, the CNN used may be a VGG-19 network pre-trained on the ImageNet dataset. In accordance with many embodiments, layer Rectified Linear Unit (relu) 1_1, relu 2_1, relu 3_1 and relu 4_1 may be used for Gram losses. The histogram losses may be computed only at layers relu 1_1 and relu 4_1 in a number of embodiments. Content loss is computed only at relu 4_1 In accordance with several embodiments. Furthermore, the total may only be performed on the first convolutional layer to smooth out noise that results from the optimization process.

In accordance with particular embodiments, the images are synthesized in a multi-resolution process using an image pyramid. During synthesis, the process begins at the bottom of the pyramid that can be initialized to white noise, and after each level is finished synthesizing, a bi-linear interpolation is used to upsample to the next level of the pyramid.

Although CNN-based image synthesis systems in accordance with various embodiments of the invention are described above, other configurations of the CNN-based systems that add, modify and/or remove portions of the CNN in accordance with various embodiments of the invention are possible.

Controlling Age Appearance within Parametric Models

The apparent realism and/or quality of a synthesized image can be improved by applying synthetic weathering. Textures that display the characteristics of some weathering processes may incorporate a collection of multiple textures consolidated into one weathered texture. As such, CNN-based image synthesis processes in accordance with some embodiments of the invention may provide a new approach for controlling the synthesis of these complex textures without having to separate the textures into different parametric models. This may be achieved by directly controlling the synthesis process by strategically waxing and waning specific parameters in the model to create new outputs that express different ratios of desired features to control the appearance of age for certain textures.

Identifying Age Features within Exemplar Images

A separate but entangled problem to controlling age appearance during synthesis is first identifying which features in the input exemplar image display characteristics of age and to what degree. In accordance with sundry embodiments, user-created masks that delineate feature age may be received and used to identify the features. Processes in accordance with many embodiments may use an automatic clustering approach to segregate different textures. Still other processes in accordance with a number of embodiments may use a patch-based method that uses the average feature distance between a patch and its K nearest neighbors as a metric for "rarity" that may be interpreted as age. This method is based on the assumption that features created by the weathering process are highly random and have a low chance of finding a perfect match caused by the same process. However, there may be a limitation in the patch-based approach when a texture has rare features that are not a product of age, such as knots in wood. In accordance with several embodiments, a CNN may be trained to learn and identify weathered features for a multitude of weathering types.

Processes for Controlling Aging

Once weathered regions in an image have been identified, CNN-based image synthesis processes in accordance with particular embodiments of the invention can extract a parametric model for each region. The desired age can be produced as a linear combination of the separate models. In the simplest case, weathering may just be an interpolation between a Young and Old parametric model as follows:

$$P_{age} = Y^*(1-\text{age}) + O^*(\text{age}) \quad (13)$$

Figure 22:
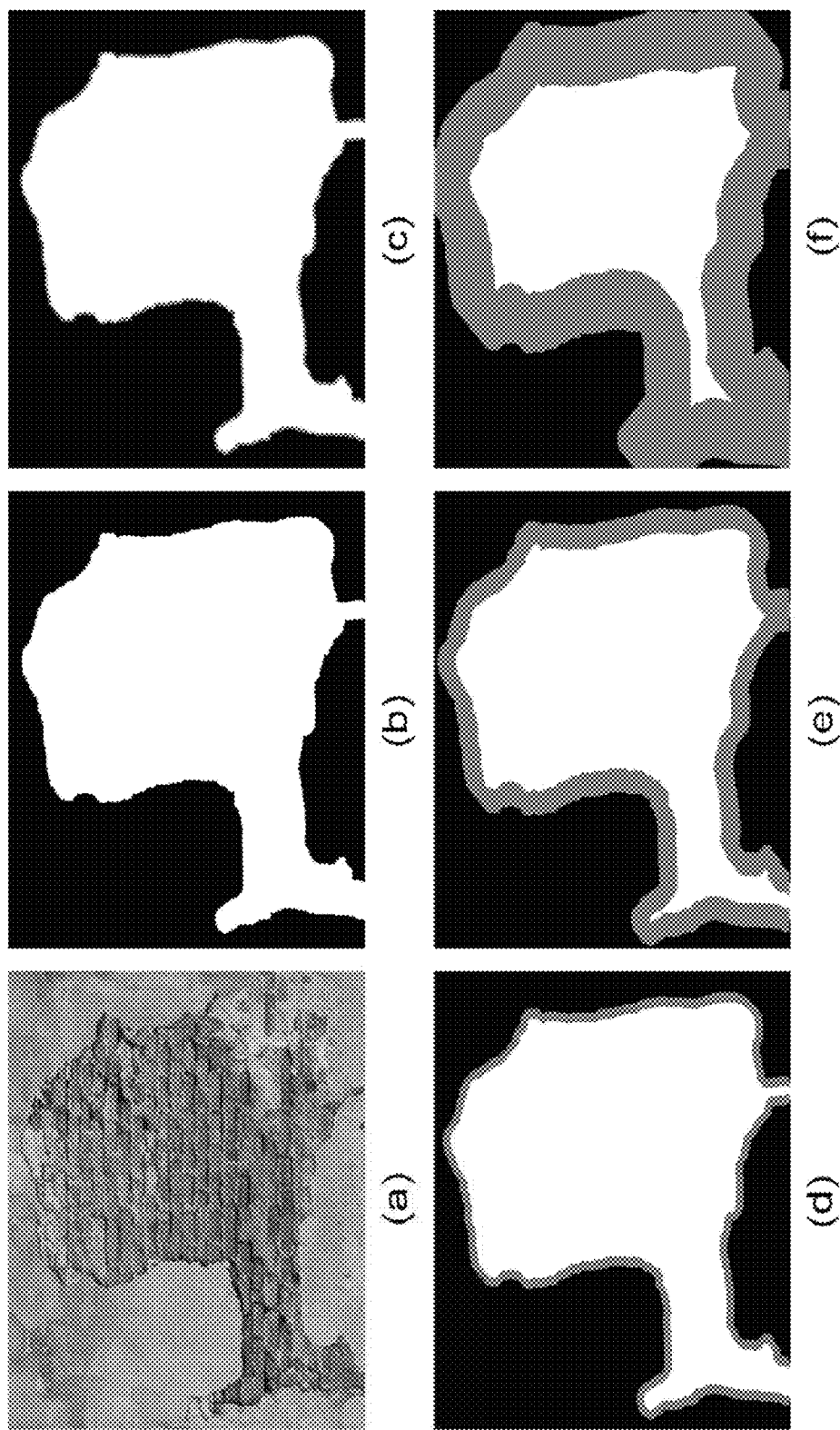
FIG. 22 is an illustration of images of masks used in an aging process in accordance with an embodiment of the invention.

This naive approach cannot generate fully young or fully old textures due to the large receptive fields common in CNN architectures mixing the two parametric models. To circumvent this problem, processes in accordance with many embodiments may introduce a "transition" parametric model built from the bordering pixels between young and old regions. To do so, processes in accordance with a number of embodiments of the invention may dynamically generate masks for each layer of the network corresponding to the receptive field. Examples of a mask are shown in FIG. 22 where black is used to delineate the young model, white for the old model and grey for the transition model. With specific regard to FIG. 22, (a) indicates an input texture image, (b) indicates a mask delineating young and old textures, (c)-(f) indicate different receptive fields measured in terms of layers of rectified linear units for the Gram losses in texture synthesis and style transfer. The aging process in accordance with some embodiments then may become a two-step process where, first, Young to Transition is synthesized and then Transition to Old is synthesized. This strategy works for textures that completely change from one material to a completely different material as the textures age. However, weathering often damages or deforms a young material rather than transforming it into a completely different material (e.g. scratching, cracking, peeling). Therefore, it is typical that a young model should not contain old features, but the old model should contain young features. In this scenario, the old and transition regions may be combined into a single combined parametric model.

Aging processes in accordance with many embodiments of the invention may use a simple strategy for determining whether the transition and old models should be combined or not. The strategy is based upon the observations that when generating the transition masks as shown in FIG. 22, the transition region becomes larger for deeper layers of the network. Therefore, if at some layer in the network the transition region completely replaces either a young or an old region, the processes assign that region into transition model at all layers of the network. Thus, the transition region can effectively "annex" other features if the features are too small to justify having their own parametric model.

Given the introduction of a third "transition" model, the equation (12) above no longer suffices. In addition to the three-model system, processes in accordance with a number of embodiments may extend the algorithm to account for an arbitrary number of parametric models for complex aging scenarios. When more than two age models are present, there are two equally appropriate synthesis strategies. First, each parametric model can have an age assigned to it between 0 and 1.

In the first strategy used by processes in accordance with a number of embodiments of the invention, a list of N parametric models is sorted by age value from smallest to largest giving N−1 pairs of models to linearly interpolate between. These interpolations are sequentially chained such that the youngest model is the Y model and the next youngest is the O model. Once the old texture is fully synthesized, set the Y model to the O model and replace the O model with the next youngest model. The process may then iterate until all of the parametric models have been processed.

In the second strategy used by a few embodiments, all N parametric models may be combined in parallel. This results in a single parametric model that is a combination of an arbitrary number of models in any proportion.

Although CNN-based image synthesis processes that perform aging in accordance with various embodiments of the invention are described above, other processes that perform aging in accordance with various other embodiments of the invention that add, combine and/or remove steps as necessitated by the requirements of particular systems and/or processes are possible.

Continuous Weathering

Once a new texture is synthesized at a starting age, it can be a simple process to continue the optimization while iteratively replacing the combined parametric model to reflect a new age. CNN-based image synthesis processes in accordance with particular embodiments of the invention may use this approach to synthesize smoothly varying animations from one age to another. Since a new parametric model for texture or "style" is introduced, and the optimization process starts from a prior model that represents the desired content, this process can be considered a special type of style transfer process where the style transfer process is a useful way to frame the problem.

One complication to note is that changing the parametric model can cause a subtle mutation of features that should otherwise be static. While the ultimate goal is to replace young features with old ones, it is also possible for the young features to mutate into new but equally young-looking features due to the parametric model being in flux. In addition, old features may continue to optimize once they are synthesized, breaking the illusion of an aging process. In order to stabilize non-transitional features, processes in accordance with many embodiments introduce a new component, a multi-target localized content loss.

In the most basic case, there are only young and old regions in a texture. In order to avoid the continuous mutation effect, these processes may introduce a new content loss strategy that applies different targets to local regions. These processes may begin by first synthesizing a full image for each of the two parametric models to be used as multiple content images. For each local point in the synthesis image, the processes may dynamically choose which content loss to apply based on a "parametric heat map." To generate the parametric heat map, the mean of a parametric model is subtracted from each pixel of the model and the co-activations to form a covariance matrix for that individual feature. In accordance with a number of embodiments, this may be performed in the rectified linear units for the Gram losses in texture synthesis and style transfer for layer 4 (relu_4) of the VGG-19 network. Next, the $L_2$ distance between this covariance matrix and the covariance matrix component of the young and old parametric models is found for each pixel. The parametric model that has the lowest error can be used to compute the content loss for the pixel using the corresponding content image. Alternatively, processes in accordance with a few embodiments implement this approach by generating a new single content image by choosing pixels from the different content images using the lowest error mask. As can readily be appreciated, the specific approach that is pursued is typically dependent upon the requirements of a given application.

Controlling Weathering Through "Painting by Numbers"

Continuously updating a single parametric model can lead to natural weathering patterns. However, it is difficult to manually control this process. As an alternative weathering approach, processes in accordance with sundry embodiments extend the painting by numbers strategy presented above where masks are directly drawn or procedurally generated which direct young, old and transition textures to different regions of the synthesis image over time. The ability to procedurally control a weathering process may be important for many textures where different regions can be affected by different environmental conditions in a 3D scene.

Although CNN-based image synthesis processes that control weathering through "painting by numbers" in accordance with various embodiments of the invention are described above, other processes that control weathering through "painting by numbers" in accordance with certain embodiments of the invention that add, combine and/or remove steps as necessitated by the requirements of particular systems and/or processes are possible.

Continuous Multiscale Aging

Figure 23:
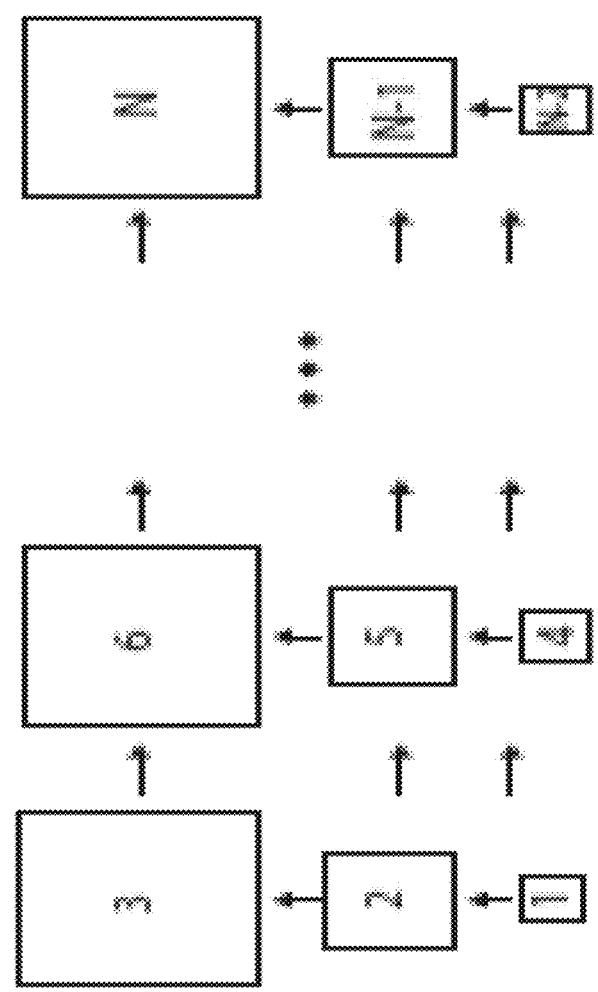
FIG. 23 is an illustration of a synthesis order in a multiscale pyramid framework in accordance with an embodiment of the invention.

In accordance with sundry embodiments, CNN-based image synthesis processes re-purpose style transfer to generate a continuous and progressive aging/de-aging process in a multiscale pyramid framework. Style transfer may be considered an extension to texture synthesis in which a second content image is introduced to guide the optimization process. Processes in accordance with many embodiments use the same concept to synthesize time sequences in a multiscale pyramid framework. These processes may bootstrap the animation by synthesizing the first frame in the sequence using the strategy described above. After the first frame is generated, subsequent frames can be created by using the frame before as a prior frame. As such, at any given point in time, two image pyramids are stored in memory, the pyramid for the previous frame and the pyramid for the current frame being synthesized. The synthesis order is illustrated in FIG. 23. As the multiple image sizes may be synthesized in parallel, processes in accordance with a number of embodiments may store an optimizer state for each pyramid level. When synthesizing the first frame in the sequence, the base of the pyramid may use white noise as a prior frame to start the synthesis and then each subsequent pyramid level starts from the final result of the previous level that is bi-linearly re-sized to the correct resolution.

For all subsequent frames synthesized, a new image pyramid may be synthesized. In accordance with a number of embodiments, the first level of the new pyramid uses the first level of the previous frame as a prior image. For higher layers in the pyramid, the same layer from the previous frame is used as a prior image and a content loss is introduced by re-sizing the previous layer in the same frame, this content image can be seen as a blurry version of the desired result. This process is conceptually illustrated in FIG. 23 where image 5 is synthesized using image 2 as a prior and image 4 is re-sized and used as a content image to guide the process. By synthesizing a sequence of images in this manner CNN-based image synthesis processes in accordance with some embodiments achieve the same benefits as synthesizing a single image using the pyramid strategy. However, the fidelity of larger structures may be improved, noise artifacts may be reduced and synthesis speed may be improved.

Although CNN-based image synthesis processes that perform continuous multiscale aging in accordance with various embodiments of the invention are described above, other processes that perform continuous multiscale aging in accordance with various other embodiments of the invention that add, combine and/or remove steps as necessitated by the requirements of particular systems and/or processes are possible.

Transferring Weathered Patterns from External Exemplars

Arguably, it is more useful sometimes to transfer the weathering effects of one material "W" onto another material "C." This is a more difficult problem as the parameters within W that represent aged features must be completely extracted and isolated from the parameters that encode the underlying texture. The only way to do this accurately is to give every pixel a high fidelity age scoring. While, other systems may be able to accomplish this through a nearest neighbor search, this approach is too coarse and approximate to accurately transfer weathering. Also, some of these other processes may rank pixels based on how unique the pixels are within the image. To perform transferring of weathering patterns in accordance with several embodiments of the invention, pixels may also need to be ranked based on which distinct features they contribute to and by how much.

CNN-based image synthesis processes in accordance with particular embodiments can accomplish this using the heat-map approach presented in the previous section on continuous weathering. However, rather than finding the best match among all parametric models, Processes performing weather transfer keep a separate $L_1$ distance score between each parametric model. Thus, these processes may discriminate on a pixel-by-pixel basis to determine the pixels in a weathered region that contribute to the actual age artifacts and to what degree. Given a region of image W with age features as well as transition features and the resulting parametric model, the goal is to remove any features that are not the desired "aged" features and replace these features in the correct proportion with the target parametric model of C.

To do so, processes in accordance with many embodiments normalize an $L_1$ distance to each parametric model between 0 and 1 and invert the result so that a region in the synthesized image that strongly matches with a parametric model will receive a score close to 1 and regions that do not match receive a score closer to 0. For a parametric model that should be removed from the mixture, processes in accordance with a number of embodiments compute a mean activation of the model (note, co-activations are not used for this process as the features become very difficult to detangle). For each pixel, the processes may multiply the mean activation by the local $L_1$ distance to that parametric model and subtract it from the activations at this target pixel to remove those features in their correct proportion from neural activations of the pixels. The processes may take the mean activations from the new parametric model from image C and multiply it by the same $L_1$ distance to determine an activation value. The activation value is then added to the target pixel in W to replace the young features in the original image with young features from a new image where the weathered features are being introduced. After the texture has been updated, the processes can now perform weathering on image W using the processes described above.

Although CNN-based image synthesis processes that transfer weathered patterns from external exemplars in accordance with various embodiments of the invention are described above, other processes that transfer weathered patterns in accordance with various other embodiments of the invention that add, combine and/or remove steps as necessitated by the requirements of particular systems and/or processes are possible.

Combining Optimization and Feedforward Parametric Texture Synthesis for Fast, High Resolution Syntheses Neural network-based texture synthesis processes can be grouped into two categories based on their underlying algorithmic strategy. These include optimization-based and feedforward-based approaches. Optimization-based approaches often produce superior quality but may be computationally expensive. This often makes these processes impractical for real world applications. Feedforward-based approaches were developed as a fast alternative to optimization. This is achieved by moving the computational burden to the training phase rather than at run time. While being fast, feedforward approaches are typically poor in quality and inflexible. The first feedforward approach baked the transformation for a single texture into each network. Later, several methods introduced the idea that multiple texture transformations could be baked into a single network. One such method introduced the idea of interpolating between these styles by matching the statistics of deep neural activations from some content image to those of a style image. In addition to baking style transformations into a network, another strategy has been to train an auto-encoder that uses the standard fixed pre-trained VGG network as an encoder with a decoder that is trained to invert VGG. Style transfer can be achieved by directly modifying the activation values produced by the encoder so that they better match the style image. One approach is to replace each feature vector from the content with its nearest neighbor in the style. Impressive results can be achieved by transforming the content activations to better mimic the style activations through a whitening color transform (WCT), which is a linear transformation that is capable of matching covariance statistics. While these methods have greatly improved the flexibility and quality of feedforward methods, they can still be inferior to optimization.

CNN-based image synthesis processes in accordance with some embodiments of the invention use a coarse-to-fine multiscale synthesis strategy for neural texture synthesis. These processes can achieve significant speedup over previous optimization methods by performing a majority of iterations on small images early in the process and the further the processes move up the pyramid, the less iterations are used to maintain the already established structure. The use of multiscale pyramid based synthesis is not only computationally cheaper as the processes move up the pyramid, but the problem formulation actually changes. Rather than performing texture synthesis or style transfer, the problem changes to Single Image Super Resolution (SISR) that takes an additional parametric texture model to help guide the up-resolution process.

As such, CNN-based image synthesis processes in accordance with many embodiments of the invention may utilize the optimization-based approach described above up until an arbitrary threshold (for example, around the 512×512 pixel size image, varies depending upon the requirements of a given application) and then switch to an arbitrary feedforward approach utilizing VGG encoding/decoding with activation transforms along the way. Switching synthesis algorithms as the processes move up the pyramid can have additional benefits beyond speed. Some CNN-based texture synthesis processes are only capable of generating RGB color textures, a standard that has been obsolete in the video game and movie industries for nearly 20 years. Color textures have been replaced by "Materials" which consist of several maps encoding the fine scale geometry of the surface as well as parameters that direct how light interacts with each pixel. By utilizing a nearest neighbor search from the previous pyramid level to the most similar feature in the style exemplar, the encoder/decoder process in accordance with a number of embodiments can both up-resolution the previous synthesis level while also decoding the entire material. While it may be possible to train a new auto-encoder to process color images along with normal maps, roughness maps, etc. this process would have to be done for every possible combination of maps. This may be costly and awkward. This approach may provide a more flexible and elegant solution.

Extending this concept to the arbitrary case, a method in accordance with several embodiments of the invention generates arbitrary material formats applied to any synthesis operation including, but not limited to, texture synthesis, time-varying weathering, style transfer, hybridization and super resolution. This synthesis strategy involves using some color texture generated using another process as input. In addition, an exemplar material is given as input, where this material contains at least one map that is similar in appearance and purpose as the input color map. The input color map is then used as a guide to direct the synthesis of the full material. This is done through a nearest neighbor search where a pixel/patch is found in one of the maps in the material that is similar to a pixel/patch in the input color image. The pointer map resulting from the nearest neighbor search directs how to re-arrange all maps within the material and then each can be synthesized using this same new guiding structure.

These processes may be additionally attractive for style transfer because they are fully feedforward and the full resolution image can easily be broken up into deterministic windows that can be synthesized separately and stitched back together. This allows processes in accordance with particular embodiments to synthesize arbitrarily sized images with minimal engineering.

Although CNN-based image synthesis processes that combine optimization and feed forward processes in accordance with various embodiments of the invention are described above, other processes that combine optimization and feed forward processes in accordance with various other embodiments of the invention that add, combine and/or remove steps as necessitated by the requirements of particular systems and/or processes are possible.

SISR for Renderings

In accordance with certain embodiments, a style transfer process used to perform SISR may have applications for rendering. SISR is an ill-posed problem where many high-resolution images can be downsampled to the same low-resolution result. This one-to-many inversion is especially bad at reproducing texture because it targets inverting to an average of all the possible higher resolution images. The latest trend in SISR is to train very deep (i.e. many layered) artificial neural networks on a large dataset using adversarial training. The high capacity of the deep network in conjunction with the adversarial training is meant to help reduce the loss of texture features.

Recent advances in rendering algorithms as well as advances in high-resolution displays has resulted in an associated rise in rendering costs. The problem is that that there are more pixels and each pixel is more expensive to render. In particular, the recent jump from 1080p to 4 k rendering has left many animation houses incapable of meeting market needs. For small studios, the costs may be restrictive. For large and famous studios, rendering at 4 k may also be challenging.

However, when rendering a movie or other video content, frames typically do not change significantly from one frame to the next. Therefore, it can be assumed that the parametric model or high-resolution texture statistics extracted from one frame are probably also appropriate for guiding similar but slightly different frames. Processes in accordance with some embodiments perform a video up-resolution strategy where the video content is rendered at a low resolution (LR). From the LR source, the processes cluster frames together based on their feature statistics. The mean frame from each cluster is determined and rendered at high resolution (HR). The processes then perform the same guided LR to HR synthesis as proposed for video streaming, with the one important difference that in video streaming the HR statistics for each frame are known whereas for rendering similar HR statistics are shared across multiple frames.

Although CNN-based image synthesis processes that perform SISR for rendering in accordance with various embodiments of the invention are described above, other processes that perform SISR for rendering in accordance with various other embodiments of the invention that add, combine and/or remove steps as necessitated by the requirements of particular systems and/or processes are possible.

Combining Parametric and Non-Parametric-Non-CNN Synthesis within Pyramid Frameworks Based on the processes described above, CNN-based image synthesis processes in accordance with many embodiments of the invention can use a nearest neighbor search between patches in the synthesized result to determine the most similar patches in the input exemplar in order to create a bridge between parametric CNN-based texture synthesis frameworks and many established non-parametric texture synthesis methods that do not require a neural network to operate. The ability to tether a neural network approach on low-resolution images with non-neural network based methods higher in the synthesis pyramid can represent a "best of both worlds" solution between the two strategies. CNN-based approaches, especially parametric methods may be better at producing creative new features at the cost of speed, memory and image quality (these methods may contain many noise artifacts). Non-parametric models that do not rely on neural networks tend to shuffle around patches directly from the input exemplar. As such, these approaches exhibit the inverse of these behaviors. They are fast, low memory approaches that largely match the fine details of the input. However, they are not as powerful at creating new shapes and features.

Although processes that combine parametric and non-parametric-non-CNN synthesis within a pyramid framework in accordance with various embodiments of the invention are described above, other processes that combine parametric and non-parametric-non-CNN synthesis within a pyramid framework in accordance with various other embodiments of the invention that add, combine and/or remove steps as necessitated by the requirements of particular systems and/or processes are possible.

Although the present invention has been described in certain specific aspects, many additional modifications and variations would be apparent to those skilled in the art. It is, therefore, to be understood that the present invention may be practiced otherwise than specifically described, including various changes in the implementation without departing from the scope and spirit of the present invention. Thus, embodiments of the present invention should be considered in all respects as illustrative and not restrictive.

Dilated Network Architecture

The examples disclosed above have largely been agnostic to network architecture and are transversal to many Convolutional Neural Network (CNN) architectures. However, in addition to the examples above, the system in accordance with several embodiments of the invention implements a new network architecture for image synthesis that is particularly well suited to the problem.

In accordance with some embodiments of the invention, a combination of Pooling Layers, Strided Convolution Layers and Dilated Convolution Layers are used to arrange neurons into a hierarchical multiscale relationship. Typically, image synthesis algorithms utilize pooling layers and sometimes strided convolution layers in order to form an image pyramid structure within the neural network architecture. Typically, only one such strategy is used throughout the network architecture. Recent work in image segmentation has achieved performance improvements utilizing a dilated convolutional network (https://arxiv.org/pdf/1511.07122.pdf—the disclosure of which related to dilated convolutional networks is hereby incorporated by reference herein in its entirety), with a follow-up work showing that dilated convolution can also be used to learn image filters (http://vladlen.info/papers/fast-image-processing-with-supplement.pdf—the disclosure of which related to dilated convolutional networks is hereby incorporated by reference herein in its entirety).

Dilated convolution is a similar concept to image stacks, first introduced for the purposes of image processing using signal and statistics based methods and later adapted for texture synthesis (Sylvain Lefebvre and Hugues Hoppe. 2005. Parallel controllable texture synthesis. *ACM Trans.*

*Graph.* 24, 3 (July 2005), 777-786—the disclosure of which related to dilated convolutional networks is hereby incorporated by reference herein in its entirety). The image stack is a collection of image pyramids sampled from a single image at regular translation intervals. Image stacks were developed to address the problem that the image pyramid data structure leads to discretization errors, e.g. the same input image when translated could lead to very different downsampled results. The image stack is effectively a translation invariant alternative to image pyramids. It also follows that other types of symmetry transformations could also lead to similar discretization artifacts, e.g. two otherwise identical images would produce very different averages at coarser levels of an image pyramid.

Other solutions to this problem include, but are not limited to, using a collection of image pyramids at different translations of an input image. An image stack can extend this concept to the most extreme conclusion where every possible image pyramid configuration is extracted from the original image, and then packed together efficiently so that all redundant data is removed. The efficient packing can be achieved using a "quadtree pyramid," which was originally developed to accelerate an Approximate Nearest Neighbor (ANN) search utilizing KD-Trees. However, an image stack re-orders the data into a tightly packed image where features remain coherent across scale levels. The same data structure was actually first introduced a few years earlier by Masaki Kawase during a Game Developers Conference lecture for the purpose of blurring an image (slides published online by GDC, https://www.gamedev.net/forums/topic/615132-dof-basic-steps/Slides 15-18—the disclosure of which related to dilated convolutional networks is hereby incorporated by reference herein in its entirety).

In an image pyramid structure, each level of the pyramid is typically half the resolution in each dimension as the previous level. In an image stack structure, each level is the same resolution as the previous level. In an image pyramid, samples are typically averaged together or combined in some way using a convolution kernel with a stride of 1, used uniformly at every pyramid level. In an image stack, samples are typically averaged together or combined in some way using a convolution kernel with a stride of $2^{level}$ where level is the number of scale factors relative to the original image. This can be thought of as analogous to a downscaling transition in an image pyramid. In summary, image pyramids both downsample and subsample an image. While downsampling is a desirable operation, subsampling rarely is. Image stacks get around this problem by downsampling without subsampling.

The same data structures and hierarchical relationships used for an image pyramid and an image stack can also be used for convolutional network architectures that utilize pooling layers or strided convolution as well as dilated convolution. As such, the advantages/disadvantages of using a stack versus a pyramid in an image processing framework are transversal and carry over to a convolutional neural network architecture. Replacing pooling or strided convolution with a dilated convolution will often yield superior image synthesis results.

Previous image synthesis methods using a Convolutional Neural Network have used some kind of pooling or dilated convolution strategy, thus they typically go through some form of subsampling operation followed by a supersampling operation. In the optimization based framework, the feed-forward pass is a subsampling pyramid operation as higher order features are extracted deeper in the network, then the generation of the new image is a supersampling process through backpropagation as gradients traverse upwards through the network to the higher resolution shallow layers. In a feedforward architecture, many approaches are typically some form of auto-encoder or cascading image pyramid, both of which utilize some form of subsampled data and attempt to supersample it during the synthesis process. In many embodiments of the invention, network architectures designed for image synthesis, which may rely on pooling or strided convolution to do downsampling, can be improved by using a dilated convolution architecture instead. Therefore, the system in accordance with several embodiments of the invention makes use of dilated alternatives to such network architectures, as dilation is often a superior form of downsampling for image synthesis operations. In addition, where a synthesis strategy also relies on the use of image pyramids (typically Gaussian pyramids) of the input data for additional multiscale synthesis, the system in accordance with some embodiments of the invention uses an image stack to replace the image pyramid (typically a Gaussian stack).

The dilated network strategy is particularly well suited for auto-encoders where the decoder network is a layer-wise inverter of the encoder network (i.e. each layer in the encoder has a "mirror" layer in the decoder which inverts that layer as accurately as possible). This particular network architecture is desirable for fast image synthesis because the encoder side of the network can distill an image into its most meaningful features, which can be modified in some way by another algorithm (e.g. including, but not limited to, a whitening transform, histogram match, or nearest neighbor search). The newly updated values can then be inverted by the decoder in order to produce a new image. This synthesis strategy is attractive because it's much faster and more memory efficient than an optimization based approach. It is however very difficult to implement because inverting a network that includes pooling is very difficult (historically literature has always used a pre-trained VGG network as the encoder). Inverting pooling layers typically leads to blurring or other such supersampling artifacts. Systems in accordance with many embodiments of the invention implement a dilated architecture as an alternative, which is easy and more accurate to invert on a layer-by-layer basis. In many embodiments, a whitening transform, multiscale NNS search or histogram matching algorithm can continue to be applied to features at each network layer as they progress through the decoder.

Note that dilation shares the same drawback as the image stacks, it is a memory inefficient way to encode data, especially deeper in the network. Previous texture synthesis approaches utilizing image stacks were generally limited to 256×256 pixels in resolution due to the high memory demands. However, conventional images may have much higher pixel resolutions (e.g., up to or exceeding a 8192× 8192 pixel resolution). The size of these images can make the image stack representation too memory demanding.

Instead, processes in accordance with some embodiments of the invention combine pooling or strided convolution layers at the shallow end of a convolutional neural network architecture with dilated convolution layers deeper in the network. This "hybrid" network architecture exhibits the properties of a pyramid network up to a specific depth in the network and then switches to the properties of a dilated stack. From a memory viewpoint, this is attractive because large images quickly get condensed into much smaller images for the majority of the network. This is also a good compromise from an image processing viewpoint because the deeper layers of the network encode the complex shapes and patterns and thus need the highest resolution. Shallow layers of the network only encode simple shapes and textures and don't require the same degree of network capacity. This new network architecture can be visualized as an image stack with a pyramid sitting on top of it.

Although a specific pyramid-stack hybrid convolutional neural network architecture based on some combination of pooling, strided convolution and dilated convolution is used for image synthesis in a number of examples discussed above, in several embodiments of the invention, the pyramid-stack hybrid may be modified in a variety of ways, including (but not limited to) adding, removing, and/or combining components of the stack.

Image Hybridization

Starting from a set of several source images within the same category, systems and methods in accordance with many embodiments of the invention can hybridize, or mix them together in a way that produces a new member from that category. This is a follow-up work to Risser, Eric, et al. "Synthesizing structured image hybrids." *ACM Transactions on Graphics (TOG)*. Vol. 29. No. 4. ACM, 2010. the disclosure of which is hereby incorporated by reference in its entirety. While this work is based on the same theories as the original approach, this version of image hybridization is re-designed from the ground up in order to utilize convolutional neural networks both for image description and as the machinery for performing synthesis. The three key observations for image hybridization are:

(1) instead of taking a small sample from an infinite plane of texture and synthesizing more of that infinite plane, grab a small sample across an infinite set within a "category" and synthesize more instances of that category, (2) structure exists across scales and should be observed across scales, and (3) manifesting structure from noise is difficult, so don't break structure in the first place.

CNN based image synthesis is an ideal approach for hybridizing images due to the CNN's ability to learn and identify complex shapes and structures across multiple scales. Unlike other image synthesis methods which can be improved by dilated convolution, but do not require it, hybridization is likely to produce poor results and artifacts if deeper layers of the CNN are subsampled. Therefore, the input images can be passed in a feedforward manner through a dilated convolutional neural network to produce deep neural activations that have a 1-to-1 mapping with input image pixels.

The logic behind using a stack as opposed to a pyramid is that when performing coarse to fine synthesis, the texture built at a coarse level largely influences whether a local or global minimum will be found. When a sub-optimal choice is made at the coarse level of the synthesis pyramid, synthesis will get stuck in a local min, so it is important to be very careful when synthesizing at the coarse level, in order to achieve a good result. When doing stochastic texture synthesis, there are many local mins that are all very similar to the global min, so this is less of a concern. When doing image hybridization though, most local minima are significantly worse than the global minimum and a small set of local minima surrounding the global minimum. This can be tied to breaking versus preserving the global structure of the image.

The reason why stacks typically preserve global structure as opposed to pyramids is very simple. Imagine the same picture of a face in image A and image B. The only difference is that image B is transposed along the x axis. When turning A and B into pyramids, the right eye is subsampled into a single pixel at a coarse level. The same eye in image B, however, is spread across two pixels which also have features surrounding the eye, thanks to the transposed position drastically changing the quantization in the pyramid. When synthesizing the texture at a coarse level, there are no good nearest neighbor matches between image A and B, the center of the eye is represented by a pixel in image A but image B only has the right and left sides of the eye as candidates to be linked to. While it's theoretically possible to recover the eye feature at finer levels, this is a much harder problem and in practice rarely happens. By using a stack, the system in accordance with many embodiments of the invention avoids quantization and maintains the maximum number of features to compare, drastically increasing the chance of finding good matches. To bootstrap the synthesis process, choose one of the input images at random and pass it feedforward through a network. Unlike the first step that extracts feature vectors for each exemplar, synthesis itself does not strictly require a dilated architecture. Dilated versus strided convolution have their own benefits and weaknesses and are compared below. The important thing to note is that the same convolution kernels used for extracting exemplar features typically must also be used during synthesis. Luckily, a dilated architecture can be thought of as a collection of pyramid architectures, so the same set of kernels can be used in either strategy. Many of the examples described herein refer to VGG-19 feature kernels pre-trained on the ImageNet dataset, however one skilled in the art will recognize that convolutional kernels from any network architecture trained on any dataset may be applied in accordance with various embodiments of the invention.

Hybridization, unlike other image synthesis operations, is a non-parametric process that relies on finding similar matching features between input and output images and building new images by re-combining sets of exemplar features into new configurations while tracking the global feature error between these new features being mixed and the original input features that they were derived from. Note that hybridization can be performed in either an optimization or feedforward based synthesis strategy. In either case, the key aspect of image hybridization is to algorithmically generate new activations at different levels of the network which combine the activation features extracted from the input images into new hybrid configurations. Before we describe how these new hybrid configurations are generated, we'll identify how they are used to synthesize new images.

When performing optimization based synthesis, an input image (typically noise, but it could be anything) is iteratively updated to minimize some loss function. The "hybrid loss" function is the summed L2 distance between each pixel in the current image being synthesized and the hybrid activation maps at a given layer. This is the same strategy as the "content loss" described above, however, whereas the content loss was taken directly from an input image, the "hybrid loss" is a new activation map that is generated by recombining activation features taken from different input images. In the original image synthesis work, content loss is only used at RELU4_1, so that it does not overpower style loss at shallow layers of the network. Hybridization in accordance with a number of embodiments of the invention incorporates a style loss in order to perform style transfer combined with hybridization all in one operation. Alternatively, in several embodiments, the basic hybridization algorithm assumes that there is no style loss. Therefore, hybrid loss can be used at multiple layers in the network. Feedforward networks on the other hand do not perform an optimization process turning one image into another, instead they transform an image into a new image. Therefore, using the dilated auto-encoder network described above, the encoder portion is run on all input images, their features are hybridized in the middle of the network using another process, and then this hybridized set of activation values are inverted by the decoder. Note that in both optimization and feedforward synthesis, the results of hybridizing deep features in the network can be passed up to shallow layers and then become further hybridized through another hybridization step.

In order to describe the process in which activation maps are reconfigured to produce hybrid activation maps, it is helpful to first introduce the concept of feature space. The idea behind feature space is that similar visual features in the image will map to points in feature space that are close to each other in terms of Euclidean distance, while very different looking features will be very far away from each other. The neural network in accordance with some embodiments of the invention is a feature descriptor and converts a neighborhood of raw pixel values into a single point in a high dimensional feature space.

Given this background, the creation of hybrid activations for a layer can be explained. Given the layer activations for one of the random input images, the goal is to traverse every pixel location in the layer and replace the current feature vector at that location with a new feature vector taken from some other pixel location in that layer or from some pixel location taken from another input image's neural activations at that layer. This can be done through a two-step process where the process introduces randomness or "jitter" and then "corrects" any artifacts or broken structures caused by the jitter. In certain embodiments, the process optionally pre-computes k-nearest neighbors between each input image and every other input image as a part of an acceleration strategy.

In the next phase, for each pixel in the image being synthesized, the process in accordance with many embodiments of the invention gathers k nearest neighbors from the input exemplars. In certain embodiments, the process divides up the k samples equally across all the exemplars. In a number of embodiments, the distance metric used for these KNNs is the L2 distance between feature vectors at the neural network layer of interest. This is equivalent to transforming all of the image data into points in high dimensional feature space. Around each synthesis feature point, the process in accordance with some embodiments of the invention gathers the cluster of exemplar feature points surrounding it, such that the process samples the same number of points from each exemplar. The next step is to sort these K nearest neighbors from smallest to largest distance.

In certain embodiments, the one parameter exposed to the user is a "jitter slider" that goes from 0-1 (or an equivalent linear or non-linear range), where 0 should produce one of the original inputs and 1 should be the maximum hybridization and mutation. Therefore, the 0-1 range is mapped to the min distance and max distance of the closest to farthest neighbors. Depending on the jitter setting, the process in accordance with many embodiments of the invention gathers the K nearest neighbors with distances less than the jitter value and randomly selects one of them to update the synthesis patch with. This is akin to constraining noise. Instead of starting from noise and trying to recover structure from it (which is very difficult), instead the process in accordance with a number of embodiments starts from pure structure (i.e. the input) and adds noise strategically and intelligently in order to not break the structure to a degree from which it cannot be recovered. To this end, the process in accordance with several embodiments of the invention adds noise or randomness in "feature space" rather than color space or image space as is typical for these types of algorithms. This strategy adds noise in feature space, which essentially allows the process to randomize the image in a way that preserves the important structures of the image. This operation can be performed at one or more convolution layers within the CNN.

After jitter is used to modify the details of the new image being synthesized, the second step "correction" then "fixes" the image so that it maintains statistical similarity to the exemplar input. For each n×n neighborhood of synthesized neural activation vectors (where n×n could be any size, including 1×1 e.g. a single element vector), correction seeks out the neighborhood of neural activation vectors in any exemplar that has the lowest L2 distance. The current synthesis neural activation vector is then replaced with that closest exemplar neural activation vector. The correction scheme is based on coherence (Ashikhmin, Michael. "Synthesizing natural textures." *Proceedings of the 2001 symposium on Interactive 3D graphics*. ACM, 2001—the relevant disclosure from which is hereby incorporated by reference in its entirety), which states that nearest neighbor selection is not always the best method for finding perceptual similarity. Rather coherence, or the relationship between neighboring pixels, plays a large role in structure and perceptual similarity. Therefore, the process in accordance with many embodiments of the invention introduces a bias so that exemplar activation vectors that form a coherent patch with the surrounding synthesis activation vectors are given a reduction in L2 distance. This incentivizes the formation of coherent patches from the exemplar.

For both jitter and correction, the process in accordance with various embodiments of the invention can either perform a nearest neighbor search from the synthesis layer to the exemplar layers during runtime of the algorithm, or could pre-compute a candidate list of k-nearest neighbors from every exemplar feature to every other k exemplar feature. Then, during synthesis, each activation vector also maintains a pointer to the exemplar activation vector that it is mimicking.

Whether pre-computing nearest neighbors, or finding them at runtime, a nearest neighbor searching algorithm that is designed with neural networks in mind is needed. To this end, several embodiments in accordance with the invention use a nearest neighbor algorithm as described in U.S. Provisional Application 62/528,372, entitled "Systems and Methods for Providing convolutional Neural Network Based Non-Parametric Texture Synthesis in Graphic Objects", filed on Jul. 3, 2017, the disclosure of which is incorporated herein in its entirety.

The synthesis process for an optimization based algorithm in accordance with some embodiments of the invention runs E input images through a dilated version of a CNN, resulting in a set of activation vectors for specific layers of interest (for the sake of VGG-19, these are RELU1_1, RELU2_1, RELU3_1 AND RELU4_1). The synthesis process runs a randomly selected input image through either a dilated or un-dilated version of the CNN to produce the starting point for the hybrid activations. The process runs a jitter pass and runs the standard neural optimization based synthesis method starting from some prior (typically noise) for several iterations of backpropagation until the prior has turned into a manifestation of the jittered activations at the deep layer. The process then runs a correction pass on the activations at the coarsest layer in the network (for VGG-19, this is RELU4_1), thus producing the hybrid activations for that layer. The process runs the standard neural optimization based synthesis method again for several iterations of back-propagation until the prior has turned into a manifestation of the hybrid activations at the deep layer. Once the current level has converged, the process moves to the next most shallow layer of interest in the network (e.g. RELU3_1 for VGG-19) and repeats the process, jitter and correct in order to find new hybrid activations for that layer to use as the target for hybrid loss and reruns the optimization process now only going to that layer and no farther down the network. Repeat this process until the shallowest layer of interest is optimized.

The synthesis process for feedforward networks in accordance with a number of embodiments of the invention runs all inputs through the encoder, producing the deep neural activations. Before running the decoder, the process runs the jitter pass on one of the exemplars in order to randomize the features. In order to correct, the process samples a neighborhood of activation vectors (at least 3×3) around each activation vector and performs the correction phase of the algorithm. The jitter and correction phase can either use pre-computed nearest neighbor sets or run a full nearest neighbor search during the algorithm. Once correction is finished, the process continues through the decoder, inverting the new hybrid layer. This process can be repeated for each layer moving through the decoder or only run at target layers. This is a tradeoff between algorithm speed and the scale at which features are hybridized. Optimization based synthesis is slower than feedforward, however it achieves superior quality.

On Model Image Synthesis Using Convolutional Neural Networks

In computer graphics, a 3D model is typically "texture mapped". For purposes of this discussion, "texture mapped," means an image is wrapped over the surface of the 3D shape as shown in FIG. 24. 3D models typically contain UV coordinates at each vertex which define the 2D parameterization of the 3D surface. In FIG. 24, the left image displays the underlying geometry of the mesh 2401, the middle image shows the geometry with a texture mapped over the mesh 2402 and the image on the right shows what that texture 2403 looks like as a 2D mapping of a 3D surface. We refer to synthesizing texture maps as "on-model synthesis."

Processes in accordance with many embodiments of the invention integrate an on-model synthesis approach into the CNN approach. To do so, these processes have to spread out atlas maps and build a gutter space of pointers re-directing to neighboring charts.

The CNN based synthesis approach in accordance with many embodiments of the invention relies on the process of convolution in which each pixel of the synthesis kernel is filtered based on a neighborhood of its surrounding pixels. On-model synthesis introduces two complications on top of the standard synthesis approach in image space:

(1) Flow field over a 3D model is generated using its curvature properties along with user guidance. That flow field can then be projected as a 2D vector field in the parameterized texture space. This flow field typically contains both directional components as well as scale components along each axis. Rather than convolving the neural network along the image x and y axis unit vectors globally, each pixel now has its own local coordinate frame and scale.

(2) Because an arbitrary 3D surface cannot be mapped to a single plane, UV texture space is typically broken up into a set of "charts" where each chart covers a relatively flat portion of the model. This adds another level of complication because texture colors that are coherent along the surface of the model are not coherent in texture space where we perform our convolutions. To accommodate this, the process in accordance with many embodiments of the invention adds a gutter space a few pixels in radius around each chart. These gutter pixels store pointers to other charts in texture space that encode coherent pixels along the model's surface. This additional pointer buffer is referred to as a "jump map". When performing convolution, rather than sampling directly from the image, the process in accordance with a number of embodiments first samples from the jump map which points to the image pixel that should be sampled. Because texture space might have tightly packed charts, as a pre-process, the process in accordance with some embodiments spreads out the charts so that there is a gutter space of at least two pixels around each chart at the coarsest synthesis pyramid level plus however many pooling layers are passed through in the CNN. Note that when using dilated convolution, the gutter space typically must be two to the power of the number of dilated convolutions.

Processes in accordance with some of these embodiments introduce an underlying vector field that frames the local orientation around each pixel. As CNNs work by performing convolution across an image, the vector field directs the local orientation of the convolution. Thus, these processes can bi-linearly interpolate sampling of neural activations from the previous layer. Where the convolution kernel extends beyond the scope of an atlas chart, the gutter space of pointers redirects to another atlas chart. During the back-propagation phase of the process, inverse mapping can be used in a manner similar to what is described above with respect to convolution. This allows these processes to perform CNN image synthesis directly in UV space for on-model synthesis.

Figure 25:
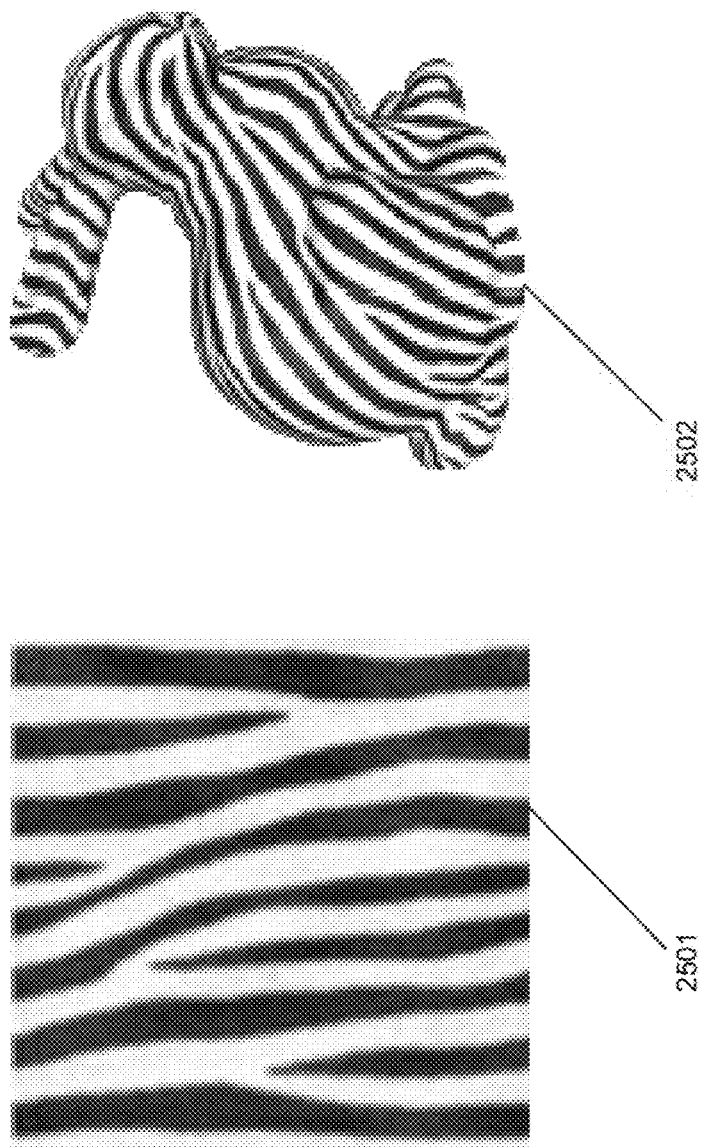
FIG. 25 is an illustration of a texture and the texture applied to a surface of a mesh by a filter process in accordance with an embodiment of the invention.

Thus far the algorithm described is designed to use a rectangular texture and a single model (with no relationship between the two) as input and synthesize a new image which maps into the model's unwrapped texture space, as shown in the FIG. 25, where texture 2501 is wrapped around mesh 2502. In this regard the input is still a rectangular image and the output uses the mesh as a canvas on which to paint over. In many instances, a pre-textured mesh is given as input and the textures already parameterized into some UV space are used as the source data to feed an image synthesis process.

Processes in accordance with some embodiments of the invention follow a similar approach. These processes take this concept a step further and produce textures that conform to geometric shapes and the feature contents of that texture are guided by the underlying shape itself. This results in image synthesis that can be applied on top of already textured meshes, and can also produce appearance transfer from one textured mesh onto another.

The goal of processes in accordance with some embodiments of the invention is to go one step further and provide an on-model texture synthesis scheme that allows the user to supply a fully textured model as the input exemplar (for example texture mapped mesh (2402)) instead of just a texture (2403), and apply that texture from the model onto a different untextured model. The advantage to this approach is that a lot of useful information is represented by a textured mesh, including (but not limited to) the relationship between varying texture features and the underlying geometric shape on which they would typically exist. Texture and shape are often not independent. Instead, texture and shape are related. Thus, by learning or associating the relationships between a texture and a shape to which the texture is applied, processes in accordance with some embodiments of the invention can provide artists with more powerful and convenient tools.

There are two key ideas behind this approach in accordance with some embodiments of the invention. The first is that deep neural activation features and their resulting parametric models for UV mapped textures should be calculated using the same vector field and jump map approach proposed above for the purposes of synthesis. The second is to find a shape descriptor that is both effective as well as compatible with an image descriptor maintained by the system and the image based GPU accelerated framework upon which the system is built.

A key insight is that geometric shape information can be projected onto an image (i.e. a regular grid) and the shape descriptor is able to work by sampling patches from this grid in order to maintain compatibility with the GPU framework. Because it is desirable that geometric neighborhoods correspond to texture neighborhoods, it makes sense that the geometric projection into image space should match the texture unwrapping. The only issue is that texture information can map to multiple portions of a single mesh. As such, processes in accordance with some embodiments of the invention utilize a texture parameterization that provides a 1-to-1 mapping between points on a model and pixels in a texture image. This amounts to simply making copies of charts or chart regions that are pointed to from multiple polygons so that each polygon maps to its own region in texture space. Once each point on the 3D surface of a mesh points to a unique pixel in image space, any arbitrary shape description, ranging from point location in 3D space to more sophisticated descriptors, can be fed into a CNN framework in order to learn local shape features using a CNN training process. One such training approach could be mesh categorization, however, other training approaches such as mesh compression, feature clustering or upres could also be viable training strategies for learning meaningful shape features.

Condensed Feature Extraction Networks

In several embodiments, a learning strategy for condensing networks that have been trained for purposes other than image synthesis allows for the production of new networks that are more efficient at extracting image features used for image synthesis. Typically, VGG-19 pre-trained for image classification is used as a high quality, learned image descriptor for extracting out meaningful image features for the purposes of image synthesis. Many networks designed for classification have been designed for a different and more difficult problem than texture feature extraction and often require more capacity than is needed for feature extraction. VGG, for example, is computationally expensive to run, which can result in small images, long wait times and a reliance on expensive hardware. One of the benefits of systems in accordance with various embodiments of the invention is to improve memory/speed performance, without sacrificing synthesis quality.

Again, for the purposes of image synthesis, VGG or some other network architecture trained on classification can be of interest on the basis that the kernels that were produced as a byproduct of the learning process for image classification can be useful in image synthesis. For image synthesis, not all activation maps produced by a network are needed, only a small subset of those feature maps. As such, there are layers in the network that are not used directly for image synthesis, rather blocks of layers are run between layers of interest. In many embodiments, the number of hidden layers in a previously trained CNN can be reduced and/or the capacity of those hidden layers can be reduced. The simplest strategy is to train a new network on image classification. Unfortunately, if a new set of kernels for classification on a lower capacity network is learned, there's a good chance that there won't be enough capacity to perform classification as well as VGG and if the classification isn't as good then the resulting kernels might not do as good a job at feature extraction.

Rather than learning a leaner feature extraction network by reproducing the classification learning process, the learning strategy in accordance with many embodiments of the invention uses the activation maps produced by VGG (or some other artificial neural network) as the ground truth (since they will produce good synthesis results) and a network is trained to try and reproduce the input/output pairings using fewer neurons then VGG.

The assumption behind this condensed network learning strategy is that a reduction in network capacity has a larger effect on the quality of classification performance than it does on feature extraction for the purposes of image synthesis. For example, if a small network approximates a VGG convolutional block at 95% accuracy at 25% VGG's neurons, that would introduce so much error that the classification results would be dramatically affected. However, for the purposes of image synthesis, 95% accuracy would still find very good image features and synthesis quality would not be noticeably effected. Stated another way, systems and methods in accordance with many embodiments of the invention utilize an artificial neural network with a specific number of neurons to learn a network that approximates the intermediate neural activations of a different network with a larger number (or the same number) of artificial neurons for the purposes of efficient image synthesis.

Although various processes for generating a geometric description map for convolutional neural network based texture synthesis are discussed above, many different systems and methods can be implemented in accordance with various embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for generating a synthesized image comprising:
   one or more processors;
   memory readable by the one or more processors; and
   instructions stored in the memory that when read by the one or more processors direct the one or more processors to:
      receive a set of one or more source images and a target image;
      process the set of source images and the target image through a convolutional neural network (CNN);
      identify a set of feature vectors for a set of locations for at least one layer of the CNN by identifying a feature vector for at least a portion of a source image of the set of source images by combining feature vectors for the portion of the set of source images into a single parametric model, wherein identifying the feature vector for the portion of the source image comprises:
         multiplying each feature vector for the portion of the source image by its transpose to form a co-activation matrix; and
         combining the co-activation matrices into the single parametric model;

determine, based on the identified set of feature vectors, a set of one or more loss functions that restrict the distribution of features mapped from the set of source images to the target image; and generate the synthesized image based on the determined set of loss functions.

2. The system of claim 1, wherein the co-activation matrix is computed in the form of a Gram matrix.

3. The system of claim 1, wherein the co-activation matrix is computed in the form of a Covariance matrix.

4. The system of claim 1, wherein the set of loss functions comprises a localized loss function for a location of the layer of the CNN that restricts at least one of (1) sampling to a set of pixel locations of the set of source images and (2) targeting to a set of pixel locations of the target image.

5. The system of claim 4, wherein the instructions to determine the localized loss function for the location direct the one or more processors to:

receive a mask that identifies a set of sub-regions of the set of source images;

determine a group of one or more pixel locations in the set of source images that are included in at least one of the sub-regions identified by the mask and associated with the location; and determine the localized loss function for one of the sub-regions from the group of pixel locations.

6. The system of claim 4, wherein the instructions to determine a localized loss function for the set of pixel locations in the set of source images direct the one or more processors to:

receive a 2D array of pointers that links a set of pixels in the target image to a set of pixels in the set of source images, wherein the 2D array of pointers is of the same resolution as the target image; and determine a localized loss function between each pixel location in the target image and each linked pixel location in the set of source images, wherein the synthesized image is a hybridized image.

7. The system of claim 1, wherein the set of loss functions comprises a localized loss function that places restrictions on pixel locations that can be targeted to in the target image.

8. The system of claim 1, wherein the set of loss functions comprises a localized loss function that restricts pixel locations that can be sampled from the set of source images to a first sub-region of the set of source images and restricts pixel locations that can be targeted to from the target image to a second sub-region of the target image.

9. The system of claim 1, wherein the synthesized image is generated through an optimization based training process performed by iterative back propagation through the CNN.

10. The system of claim 1, wherein the synthesized image is generated through a single feed-forward inference pass of the CNN.

11. The system of claim 1, wherein the synthesized image is a texture image.

12. A system for generating a synthesized image comprising:

one or more processors;

memory readable by the one or more processors; and instructions stored in the memory that when read by the one or more processors direct the one or more processors to:

receive a set of one or more source images and a target image;

process the set of source images and the target image through a convolutional neural network (CNN);

identify a set of feature vectors for a set of locations for at least one layer of the CNN;

determine, based on the identified set of feature vectors, a set of one or more loss functions that restrict the distribution of features mapped from the set of source images to the target image, wherein the set of loss functions comprises a localized loss function for a location of the layer of the CNN that restricts at least one of (1) sampling to a set of pixel locations of the set of source images and (2) targeting to a set of pixel locations of the target image, wherein the instructions to determine the localized loss function for the set of pixel locations in the set of source images direct the one or more processors to:

determine a group of neighbor pixel locations in the target image associated with a location in the CNN layer;

determine a group of corresponding pixel locations in the set of source images associated with the group of neighbor pixel locations in the target image, wherein each corresponding pixel location of the group of corresponding pixel locations corresponds to a neighbor pixel location of the group of neighbor pixel locations; and determine a localized loss function for the group of corresponding pixel locations; and generate the synthesized image based on the determined set of loss functions.

13. A system, for generating a synthesized image comprising:

one or more processors;

memory readable by the one or more processors; and instructions stored in the memory that when read by the one or more processors direct the one or more processors to:

receive a set of one or more source images and a target image;

process the set of source images and the target image through a convolutional neural network (CNN);

identify a set of feature vectors for a set of locations for at least one layer of the CNN;

determine, based on the identified set of feature vectors, a set of one or more loss functions that restrict the distribution of features mapped from the set of source images to the target image, wherein the set of loss functions comprises a histogram loss function that maintains equal statistical distributions of activation values between the set of source images and the target image; and generate the synthesized image based on the determined set of loss functions.

14. The system of claim 13, wherein the histogram loss function is determined for a collection of pixel locations within the target image and a collection of pixel locations within the set of source images, wherein the instructions to determine the histogram loss function comprise instructions that direct the processors to:

determine a collection of histograms for a set of convolutional layers of the CNN, wherein each convolutional layer comprises a plurality of channels and each channel in a convolutional layer produces a single histogram that represents the distribution of values for all values in that channel;

transform the identified feature vectors of the target image, such that the histograms of the target image match the corresponding histograms of the set of source images; and add a histogram loss between the identified feature vectors and the transformed feature vectors.

15. A system for generating a synthesized image comprising:
one or more processors;
memory readable by the one or more processors; and
instructions stored in the memory that when read by the one or more processors direct the one or more processors to:
receive a plurality of source images and a target image;
process the set of source images and the target image through a convolutional neural network (CNN);
identify a set of feature vectors for a set of locations for at least one layer of the CNN, wherein the identified feature vectors comprise a first source image feature vector from a first source image of the plurality of source images that contains style features and a second source image feature vector from a second source image of the plurality of source images that contains content features, wherein determining the set of loss functions comprises:
  determining a global style loss function for the source style image from the pixels of the first source image that follows a desired feature distribution, wherein the synthesized image is a style transferred image; and
  determining a global content loss function for the second source image from the pixels of the second source image that follow a desired feature distribution;
determine, based on the identified set of feature vectors, a set of one or more loss functions that restrict the distribution of features mapped from the set of source images to the target image; and
generate the synthesized image based on the determined set of loss functions.

16. A system for generating a synthesized image comprising:
one or more processors;
memory readable by the one or more processors; and
instructions stored in the memory that when read by the one or more processors direct the one or more processors to:
receive a set of one or more source images and a target image;
process the set of source images and the target image through a convolutional neural network (CNN);
identify a set of feature vectors for a set of locations for at least one layer of the CNN;
determine, based on the identified set of feature vectors, a set of one or more loss functions that restrict the distribution of features mapped from the set of source images to the target image; and
generate the synthesized image based on the determined set of loss functions wherein generating the synthesized image comprises generating the synthesized image in a coarse-to-fine manner using image pyramids, said generating comprising:
  synthesizing a first image at a coarse resolution at a first level of the image pyramid;
  for each level in the image pyramid starting from a second level and ending at a finest level, increasing the resolution of the synthesized image at the previous level of the image pyramid to generate a higher resolution image that matches the resolution of the current level of the image pyramid; and
  generating the synthesized image based on the higher resolution generated at the finest level of the image pyramid.

17. A system for generating a synthesized image comprising:
one or more processors;
memory readable by the one or more processors; and
instructions stored in the memory that when read by the one or more processors direct the one or more processors to:
receive a set of one or more source images and a target image;
process the set of source images and the target image through a convolutional neural network (CNN);
identify a set of feature vectors for a set of locations for at least one layer of the CNN;
determine, based on the identified set of feature vectors, a set of one or more loss functions that restrict the distribution of features mapped from the set of source images to the target image; and
generate the synthesized image based on the determined set of loss functions, wherein generating the synthesized image comprises:
  modifying a pixel-wise convolution operation to include a per-pixel location and orientation transform;
  redirecting each pixel location in the target image to another location in the target image to sample the feature vector based on a pointer map; and
  redirecting the sampling locations for a neighborhood of pixels in a convolution operation based on a local coordinate frame around each location in the target, wherein the synthesized image is generated in a UV space of a 3D model.

* * * * *